United States Patent [19]

Masunaga et al.

[11] 4,305,657
[45] Dec. 15, 1981

[54] RANGE FINDING DEVICE

[75] Inventors: Makoto Masunaga, Tokyo; Kazuya Hosoe, Machida; Tokuichi Tsunekawa, Yokohama; Yukichi Niwa, Yokohama; Mitsutoshi Ohwada, Yokohama; Noriyuki Asano, Kawasaki, all of Japan

[73] Assignee: Canon Kabushiki Kaisha, Tokyo, Japan

[21] Appl. No.: 944,974

[22] Filed: Sep. 22, 1978

[30] Foreign Application Priority Data

Sep. 29, 1977 [JP] Japan .................. 52-117235

[51] Int. Cl.³ .................. G01C 3/00; G01C 5/00; G01C 3/08; G03B 7/08
[52] U.S. Cl. .................. 356/1; 250/201; 354/25; 356/4
[58] Field of Search ........... 356/1, 4; 354/25, 195; 250/201

[56] References Cited

U.S. PATENT DOCUMENTS

| 3,274,914 | 9/1966 | Biedermann et al. | 354/25 |
|---|---|---|---|
| 3,435,744 | 4/1969 | Stimson | 356/1 |
| 3,713,371 | 1/1973 | Kurihara et al. | 250/209 |
| 3,813,679 | 5/1974 | Hasegawa et al. | 250/209 |
| 3,898,676 | 8/1975 | Hosoe | 354/25 |
| 4,002,899 | 1/1977 | Stauffer | 250/201 |
| 4,004,852 | 1/1977 | Pentecost | 356/1 |
| 4,078,171 | 3/1978 | Stauffer | 354/25 |
| 4,079,387 | 3/1978 | Kawamura et al. | 354/23 D |
| 4,135,815 | 1/1979 | Masunaga et al. | 356/1 |

FOREIGN PATENT DOCUMENTS 52-55658  5/1977  Japan ................. 356/1

Primary Examiner—S. C. Buczinski
Attorney, Agent, or Firm—Fitzpatrick, Cella, Harper & Scinto

[57] ABSTRACT

This invention presents a range finding device when 1st and 2nd detection images of an object are scanned by signal storing type image sensing means to obtain image scan signals, which are quantized by quantization means to produce quantized image data for said 1st and 2nd detection images. On the basis of the thus obtained quantized image data, the location within the 2nd detection images of one set of M successive elements of the 2nd detection image which is most similar to M successive elements of the 1st detection image is detected, and with the aid of the data of this location, the distance between the device and the object is determined. According to this improved device, sequence control means, which controls a series of operations for range finding, will firstly cancel the signals stored in said image sensing means as unnecessary signals, when said series of operations is initiated, and then enables proper storing of image signals in the image sensing means so as to properly control the device.

40 Claims, 54 Drawing Figures

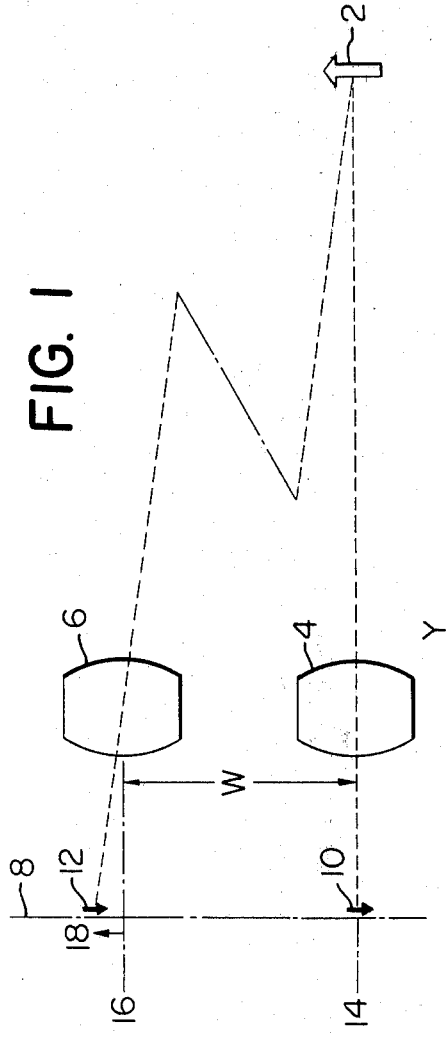

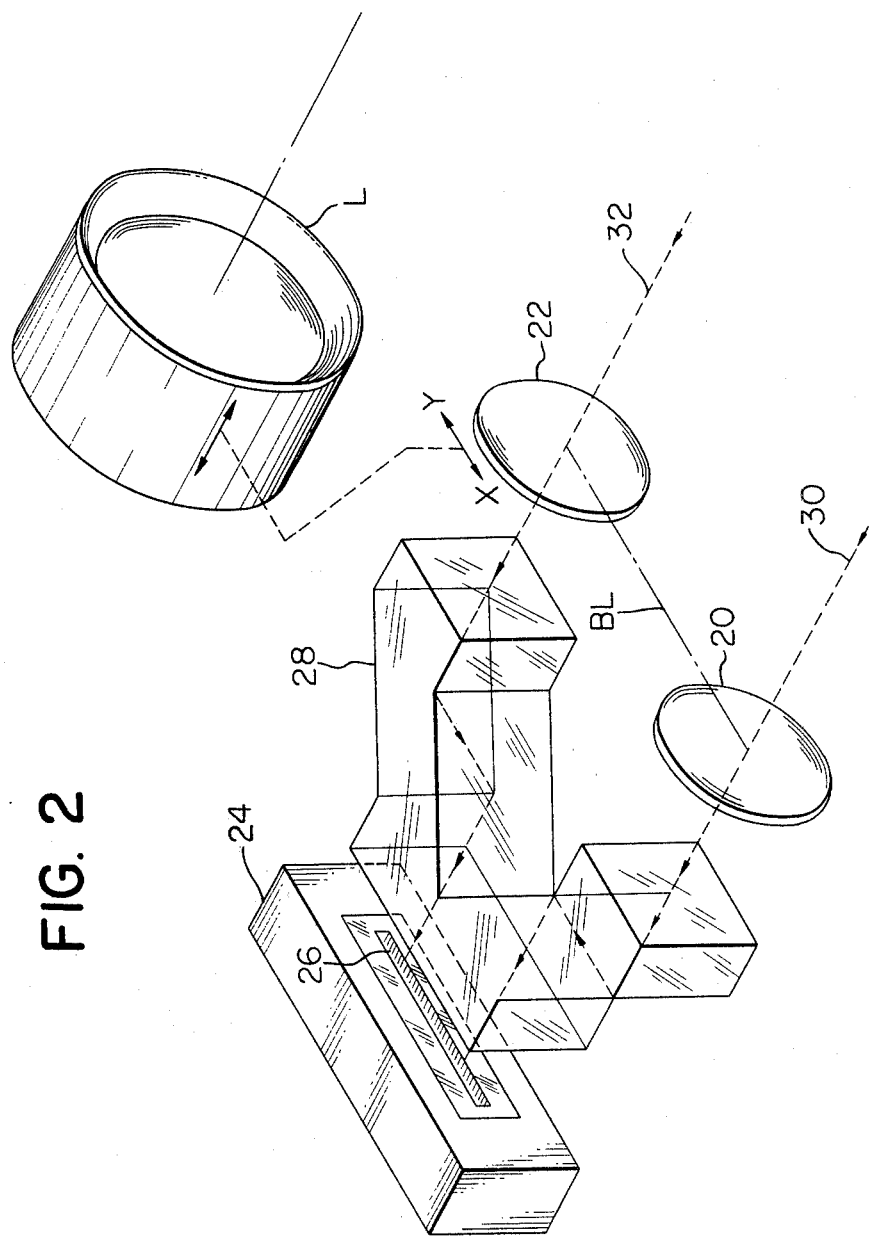

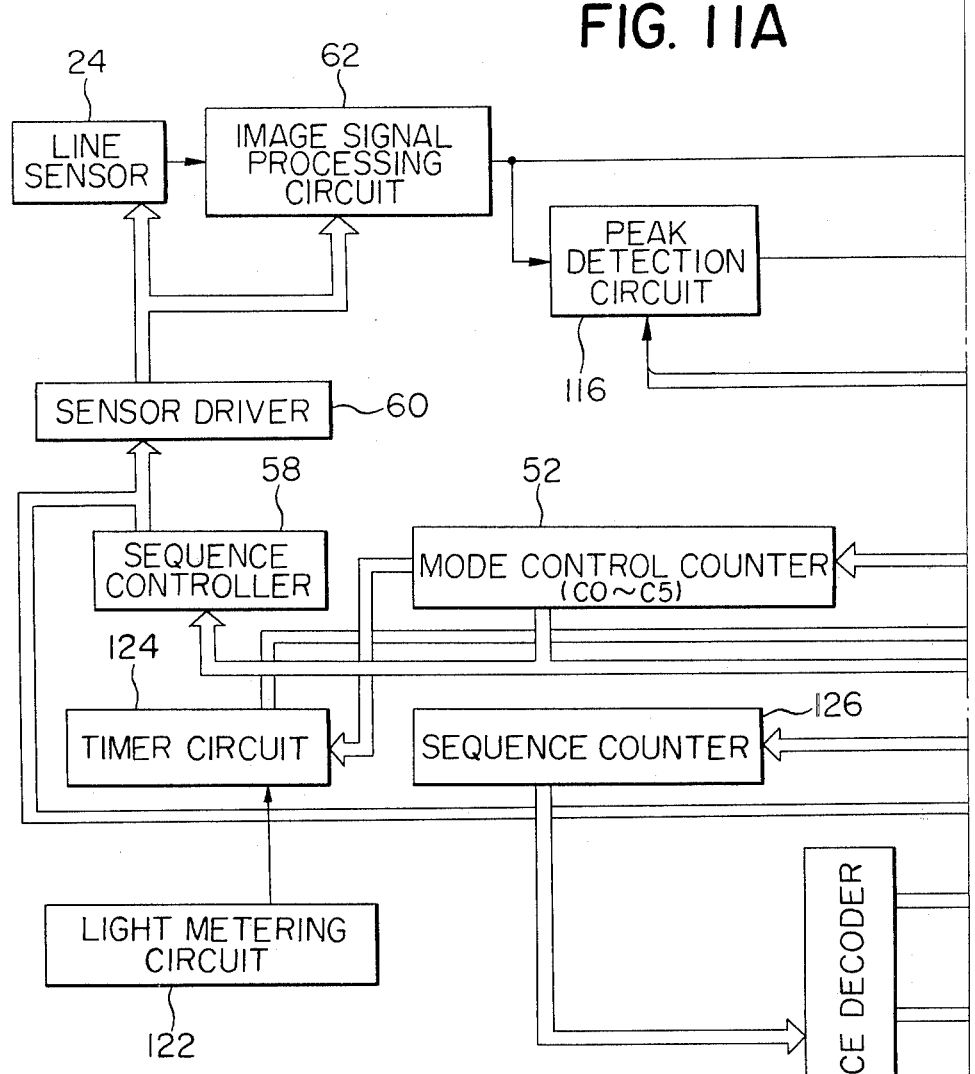
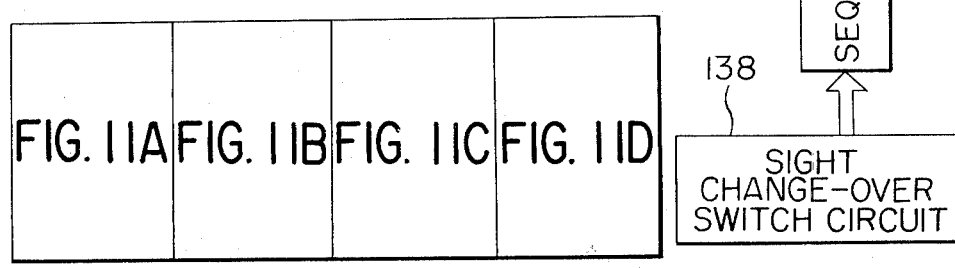

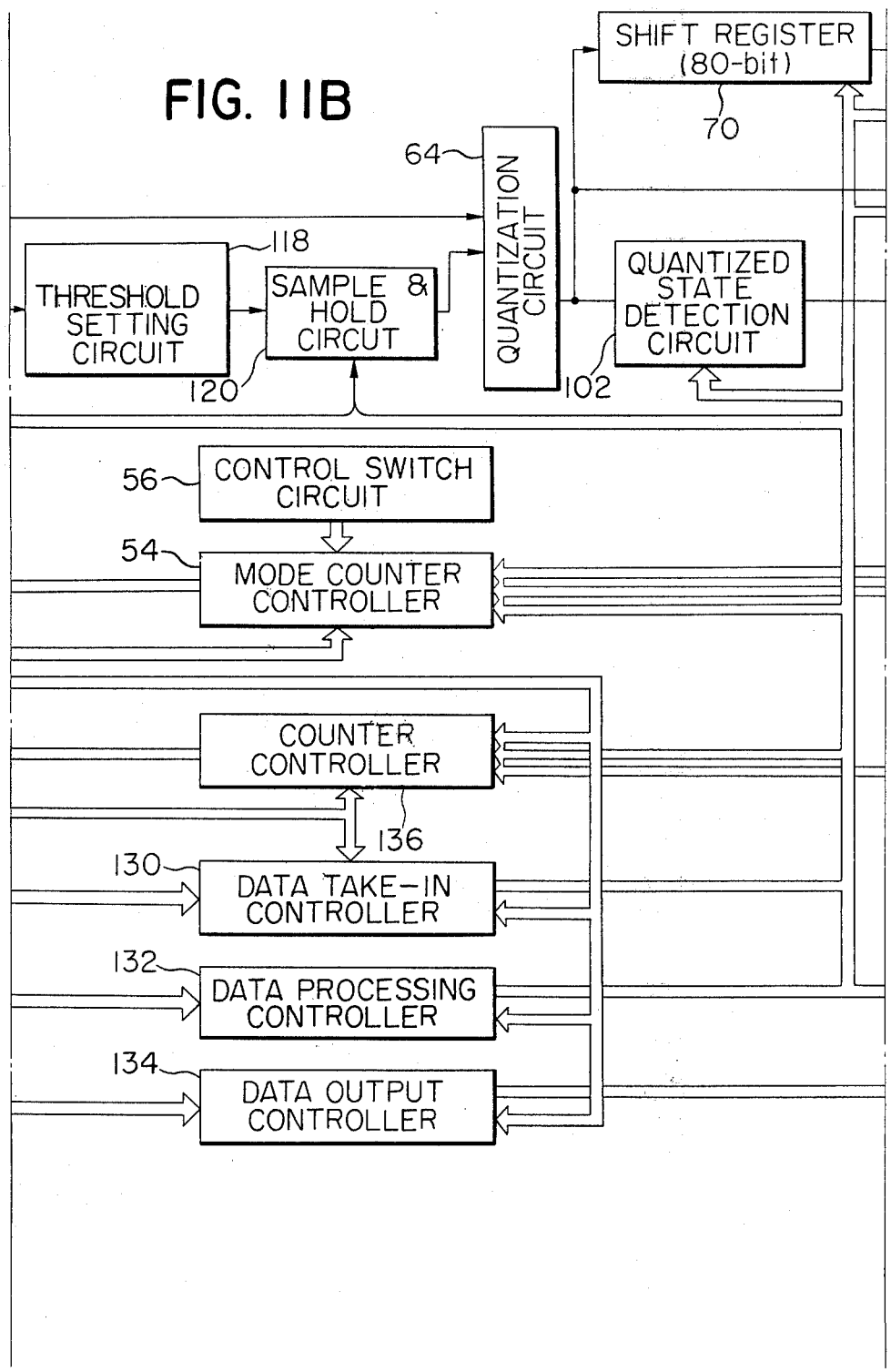

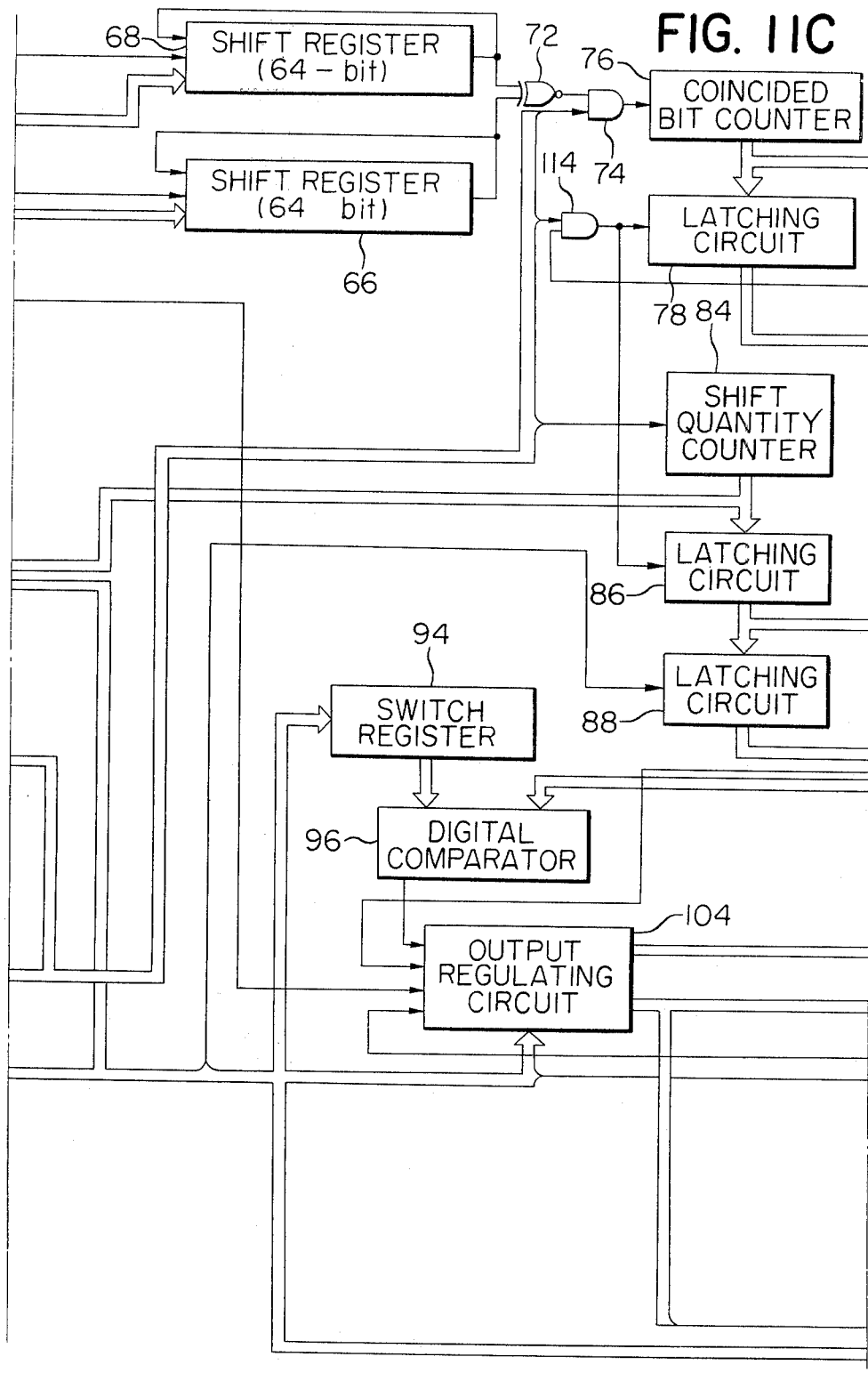

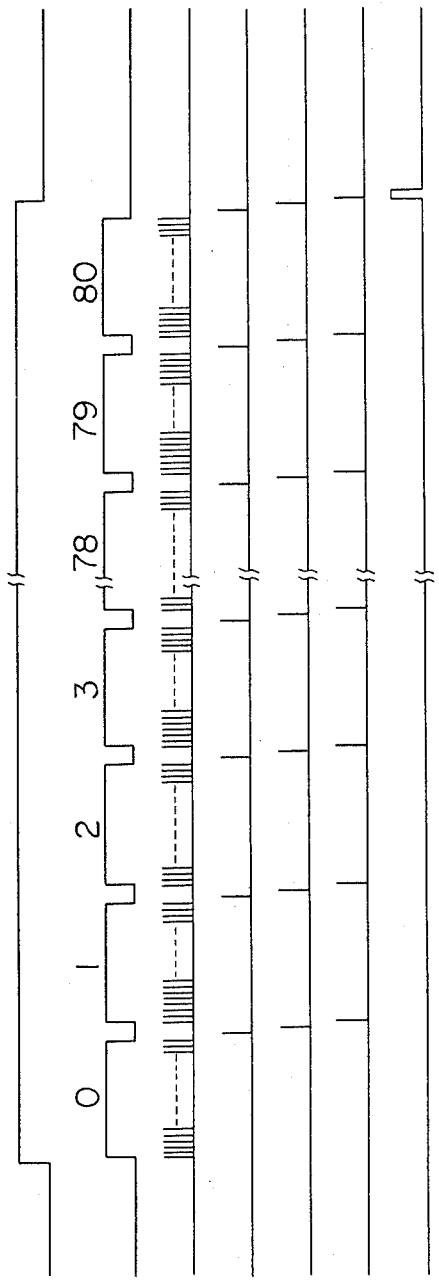
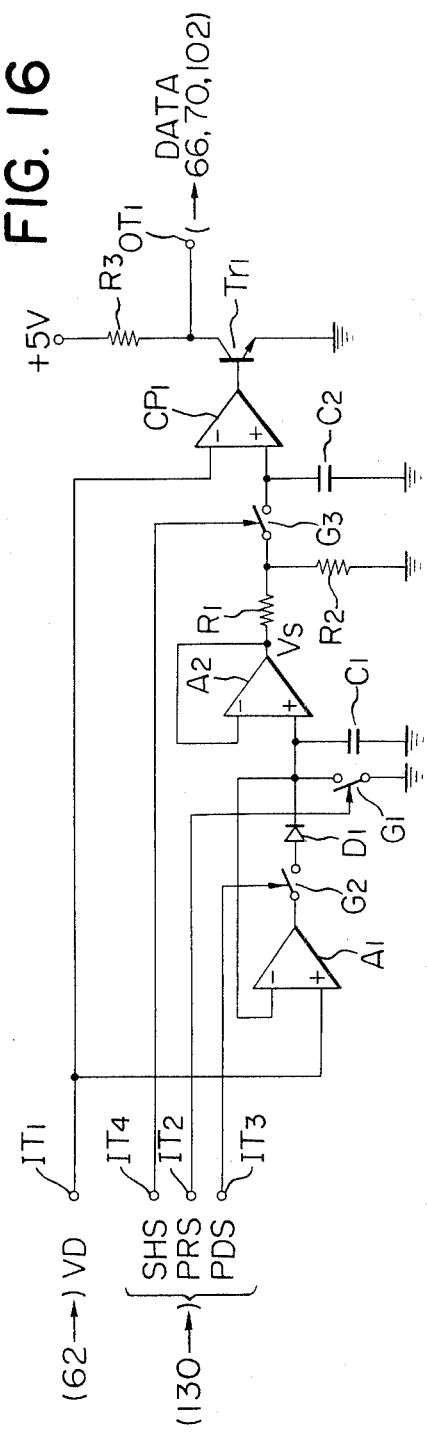
FIG. 14A
FIG. 14B
FIG. 14C
FIG. 14D
FIG. 14E
FIG. 14F
FIG. 14G
FIG. 16

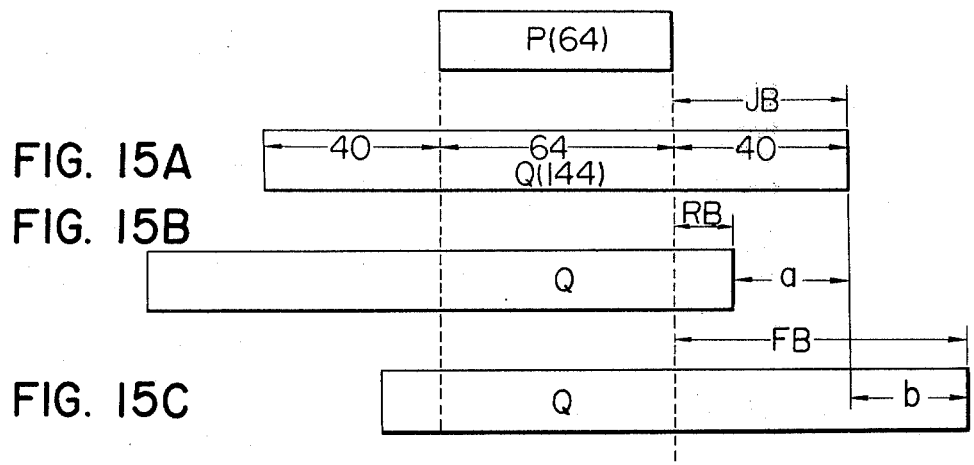
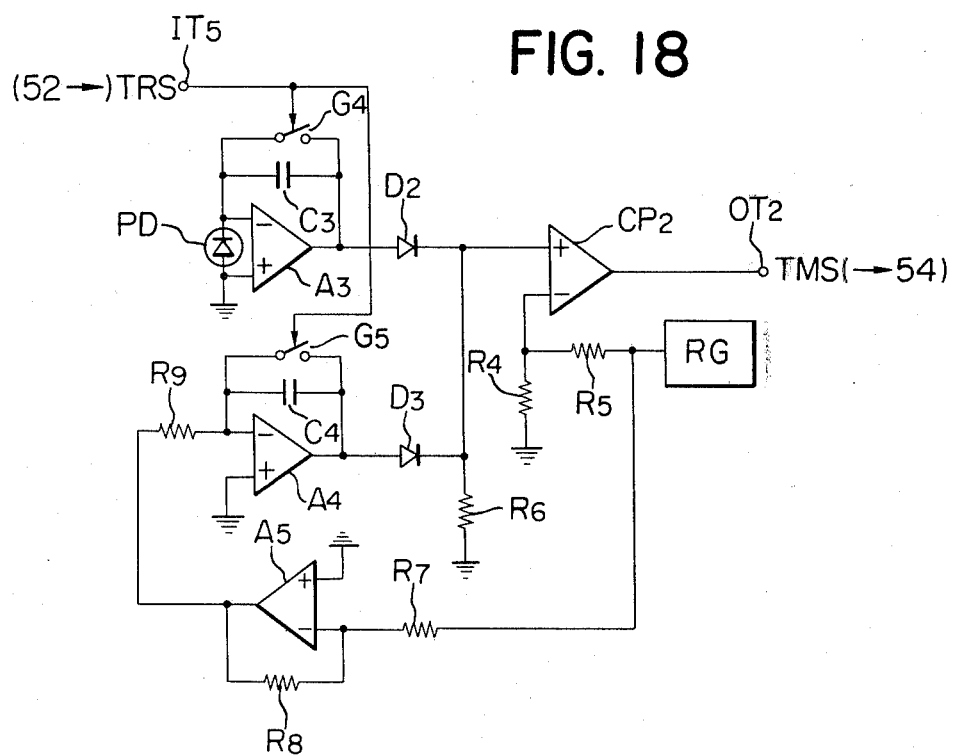

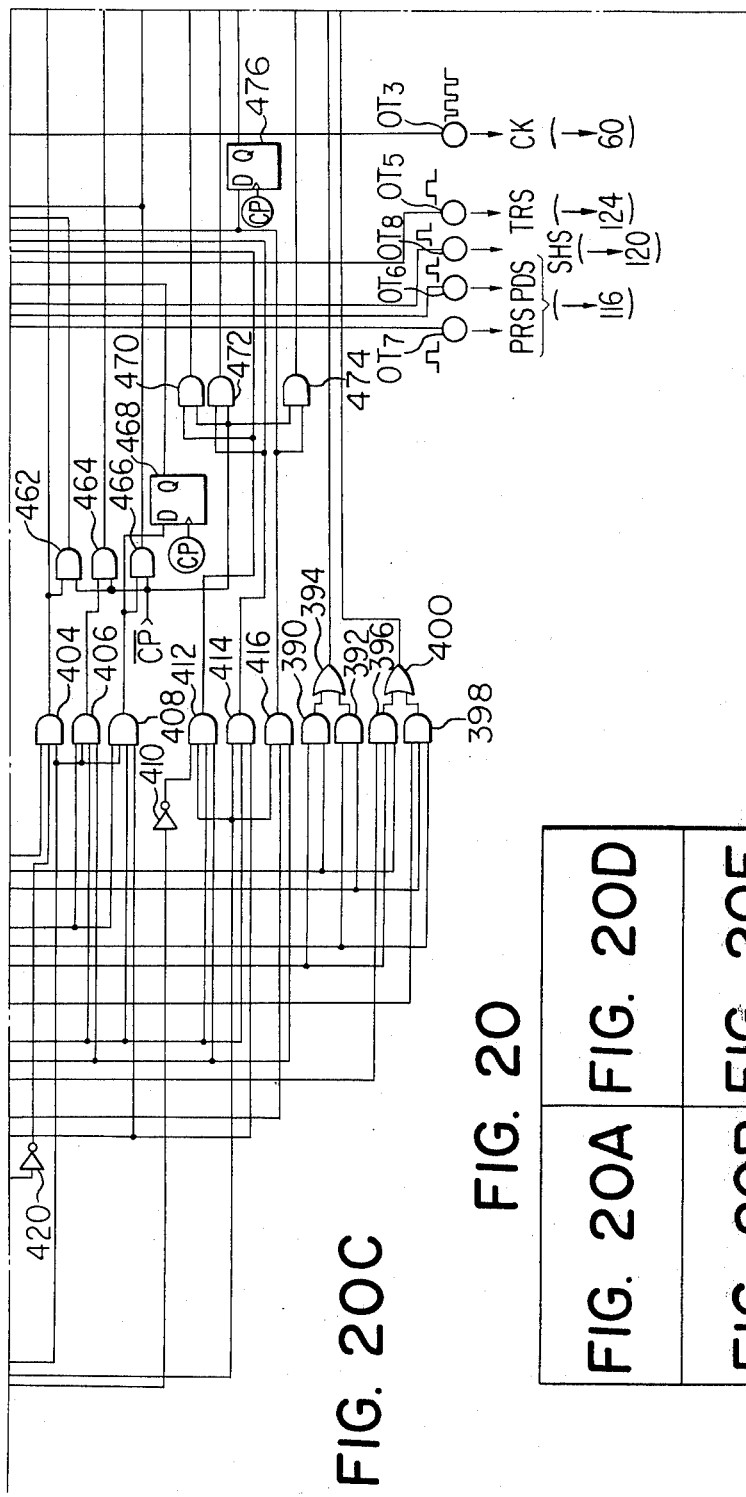

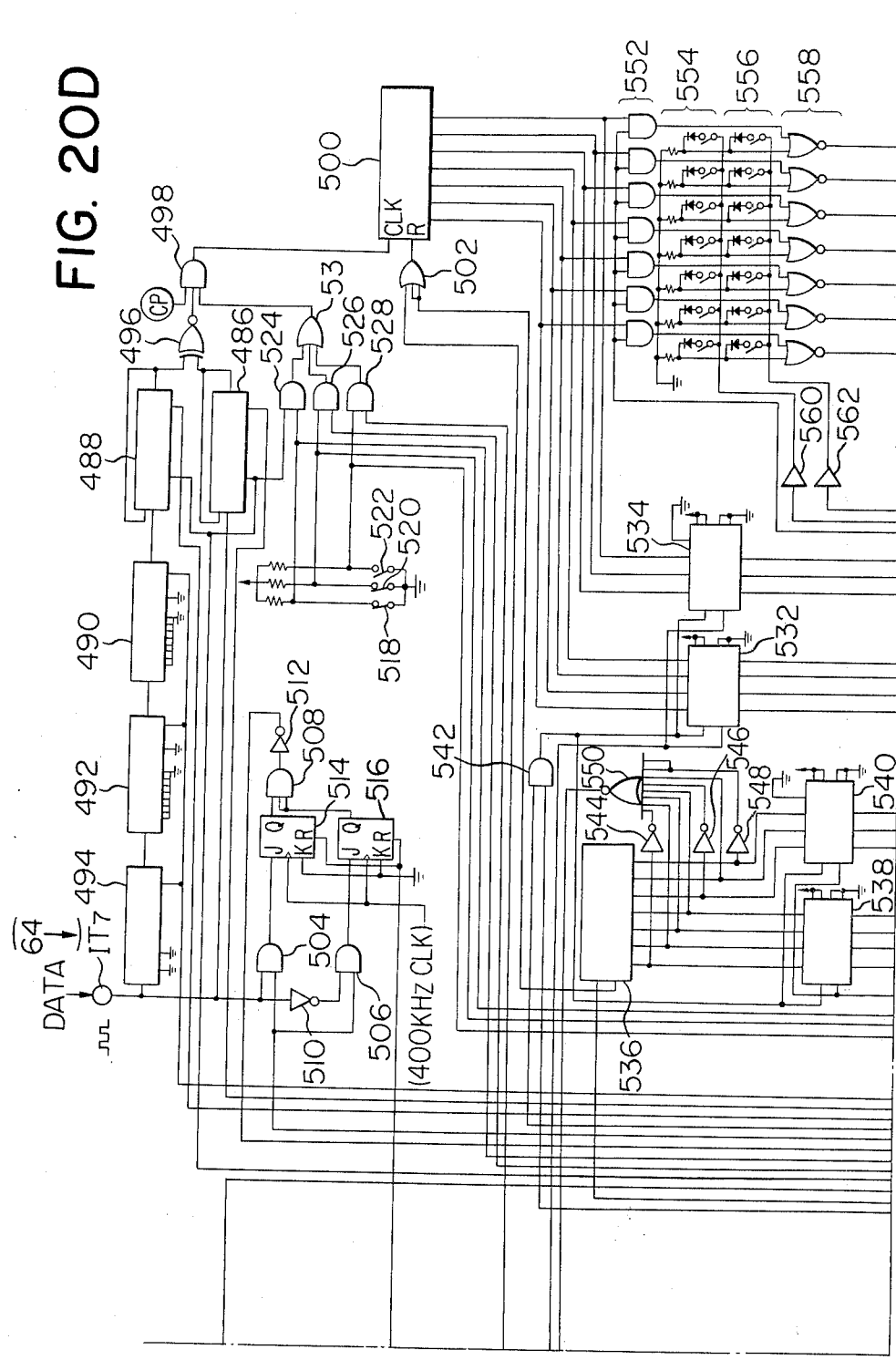

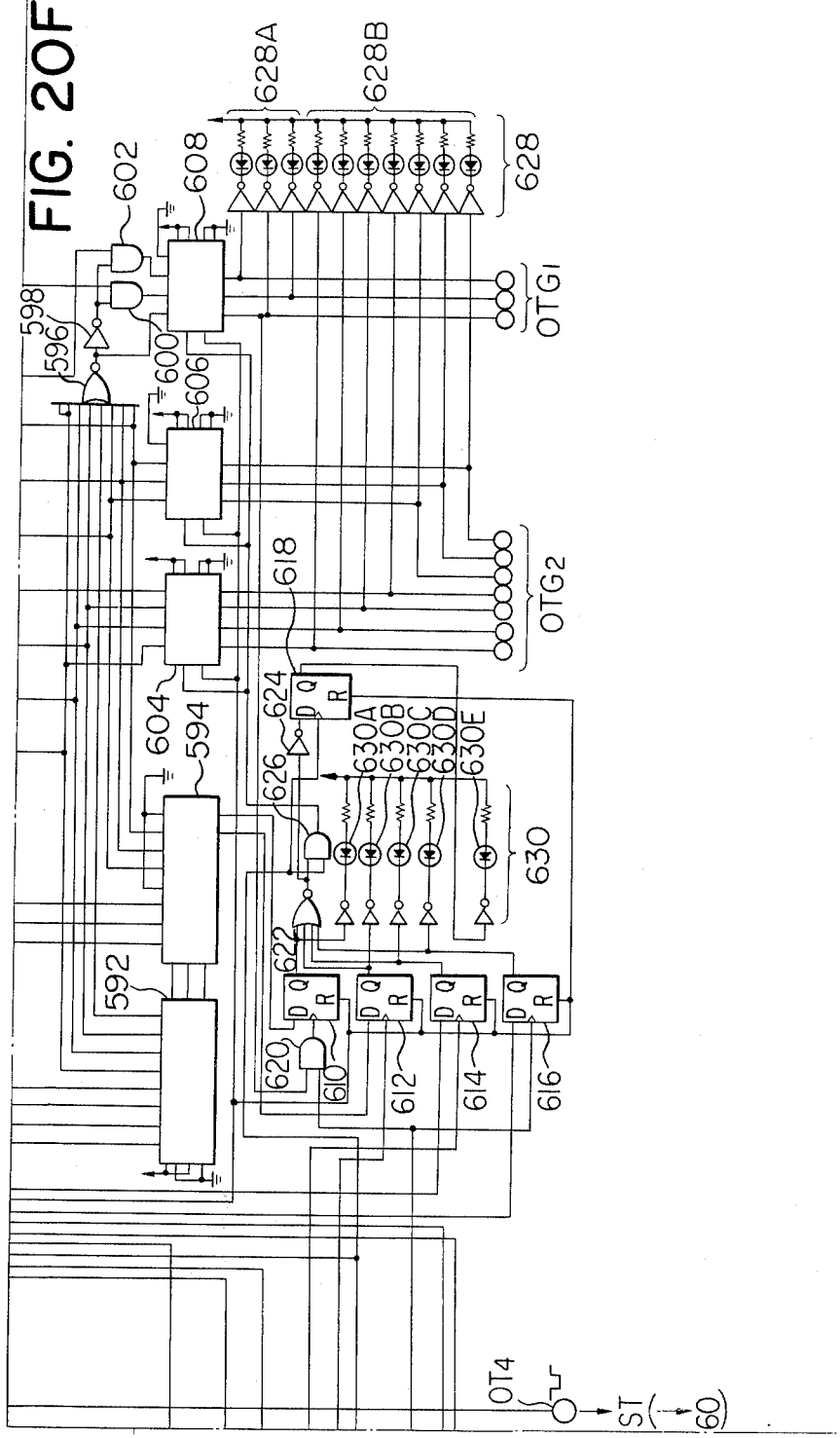

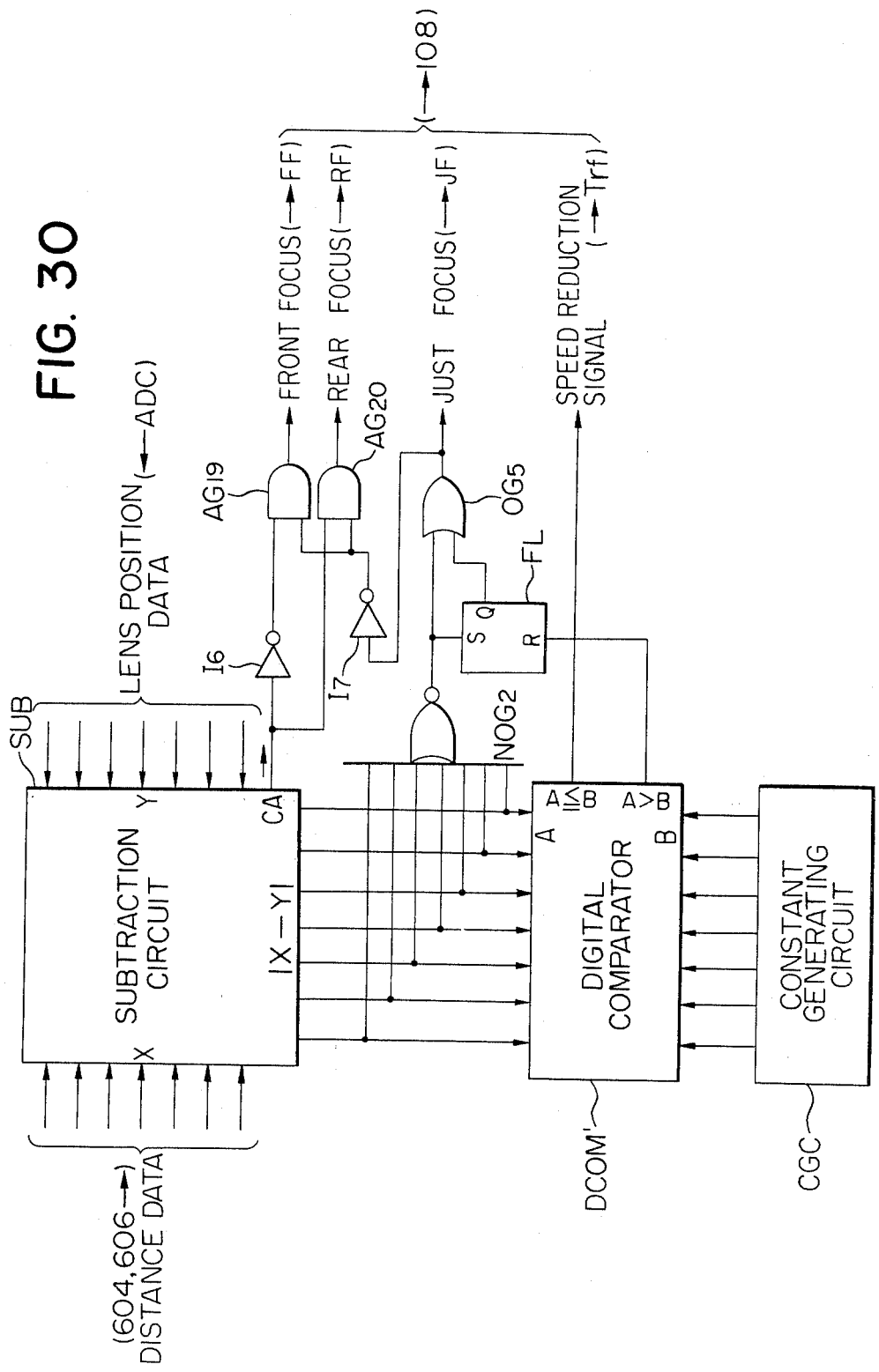

RANGE FINDING DEVICE

BACKGROUND OF THE INVENTION

1. Field of the Invention

This invention relates to a range finding device, and more particularly, it is connected with the range finding device of a type such that a distance to an object is measured by electrically detecting a relative positional difference between two images in utilization of the distance measurement principle in a base line distance measurement water. More specifically, the invention relates to a range finding device of a type, in which image scanning signals concerning the two images are obtained by scanning the above-mentioned two images, based on which signals a relative positional difference between the two images may be detected.

2. Description of the Prior Art

There have so far been proposed various types of electric or electronic range finding device as outlined in the preceding, or automatic focus detecting or adjusting devices for photographic cameras, etc. using such range finding devices. Described more specifically, this range finding device is of such type that two images of an object to be formed by a range finding optical system with a relative positional difference corresponding to the object distance are received by photo-electric light receiving means, and quantities of relative positional difference in these two images are found from outputs of the light receiving means obtained at this time, thereby calculating a distance to the object for the range finding.

For example, according to Japanese Patent Publication No. 48-5733 (Published Feb. 20, 1973, for the invention of "An Automatic Focus Adjusting Device in a Camera" in the name of Canon Kabushiki Kaisha), there is proposed a range finding device in the form of an automatic focus adjusting device, wherein a pair of photo-conductive elements which are so constructed that their resistance values may vary in accordance with positional changes in an image on the light receiving surfaces thereof are juxtaposed, and then images of the one and the same object are formed on these elements by means of a range finding optical system comprising a pair of focusing lenses fixedly disposed at a certain length on the base line so that a distance to the object may be detected by finding a difference in the resistance values between these two elements by utilizing the principle that the quantity of the relative difference in the image forming position on each element corresponding to a distance to the object.

In this disclosed device, however, the photo-conductive element per se is of a very peculiar structure, on account of which there inevitably takes place various inconveniences in using a pair of these elements such that coincidence of the response characteristics in both elements in an ideal state becomes highly difficult, as the result of which precision in the detection becomes deteriorated due to increase in error signal, and false determination in distance will arise in the range detection due to coincidence of the resistance values in both elements in spite of the relative positions of the images on both elements being actually discrepant.

With a view to solving such problem, there has been proposed a range detecting device, or an automatic focus detecting or adjusting device, in which image scanning signals on the two images are obtained by scanning them in utilization of a photo-electric light receiving means, and then by finding a quantity of relative positional difference in these two images from the two image scanning signals, the object distance is calculated, or the focus detection or adjustment of the objective lens system in a camera with respect to the object is automatically attained by utilizing informations concerning a relative positional difference in these two images.

For example, U.S. Pat. No. 3,898,676, (filed Dec. 20, 1973 and issued Aug. 5, 1975, granted to Hosoe et al. for an invention entitled "Distance Detecting Device" assigned to Canon Kabushiki Kaisha) teaches an automatic focus adjusting device of a construction, wherein arrays of photo-sensors are used as the photo-electric light receiving means for receiving the two images, and, by driving these photo-sensor arrays simultaneously, a photo-electric output of each photo-sensor in the arrays is obtained in a timed sequence to thereby scan the two images simultaneously in a purely electrical manner, and image scanning signals to be obtained on these two images at this time are converted to wave form signals through low pass filters, after which these wave form signals are introduced into a phase discriminator to detect a phase difference between these image scanning signals, and a servo-motor is actuated by an output from the phase discriminator to cause an objective lens system to shift along its optical axis, in association with which one of the two images is shifted with respect to the other, whereby "in-focus position" of the objective lens system to the object is determined with a point where the phase difference between the image scanning signals for the two images becomes zero, in other words, a point where the relative positional difference of the two images becomes zero.

Also, according to Laid-Open Japanese Patent Application No. 51-45556 (Laid-Open on Apr. 19, 1976 for the invention of "Method and Apparatus for Distance Detection"), there is proposed a method and an apparatus for detecting the distance of an object, which is constructed in such a manner that self-scanning image sensors (a kind of photo-sensor array) are utilized as the photo-electric light receiving means for receiving two images, that the two images are repeatedly scanned by these image sensors, at which time coincidence and non-coincidence of the image scanning signals on the two images to be obtained from the image sensors are detected by means of a coincidence detection circuit, while a timing for commencing scanning of one of the image sensors is varied by a variable delay circuit against a timing for commencing the scanning of the other image sensor, and that the quantity of the relative positional difference of the two images, i.e., the object distance is made known directly from a lagged quantity between the timings for starting the scanning operations by the two image sensors which has been found upon detection of the coincidence of the abovementioned image scanning signals by the abovementioned coincidence detection circuit.

In the methods and devices as disclosed in these U.S. Pat. No. 3,898,676 and Laid-Open Japanese Patent Application No. 51-45556, the two images of an object to be formed by the range finding optical system are scanned purely electrically in utilization of photo-sensor arrays or image sensors known as, in particular, Photo-Diode Array, CCD (Charge Coupled Device), or BBD (Bucket Brigade Device), and so on, and the image scanning signals concerning the two images to be obtained at this time are used for the distance detection or focus detection. In particular, since the image is scanned in a purely electrical manner utilizing the photo-sensor arrays or image sensors, accurate signal corresponding exactly to the image pattern can be used, on account of which further improvement in precision of the distance detection or the focus detection can be expected.

However, these methods and apparatuses as have heretofore been proposed contain therein many problems still to be solved such as, for example, concrete method for processing of the abovementioned image scanning signals as one aspect, hence their reduction in practice is far-reaching.

For example, in the device proposed in the abovedescribed U.S. Pat. No. 3,898,676, as already mentioned above, the image scanning signals are converted to the waveform signals by causing them to pass through low pass filters, after which the waveform signals are introduced into the phase discriminator, where detection is conducted to find whether any phase difference has occurred between the two signals. In this case, since the phase discriminator deals with the waveform signals, in particular, the overall construction of the device becomes complicated, and, since its reliability is lacking, it is not possible to accurately detect the phase difference when it is extremely small, on account of which the operation of the phase discriminator as the automatic focussing device is unavoidably inaccurate.

Also, in the device as proposed in the above-discussed Laid-Open Japanese Patent Application No. 51-45556, there is merely adopted a differential amplifier or a combination of the differential amplifier and a comparator as the circuit for detecting coincidence and non-coincidence of the two image scanning signals. Considering, however, that the signals which the circuit deals with are time-sequential signals to be produced, as an output, from the image sensors, it is almost impossible to carry out detection of the coincidence and non-coincidence of the image scanning signals with such simple circuit construction.

Furthermore, in the method and apparatus as proposed here, the scanning start timing of one of the image sensors is caused to vary with respect to the scanning start timing of the other image sensor by the use of a variable delay circuit, and a discrepant quantity between the scanning start timings for these two image sensors is taken as the object distance. However, as has so far been well recognized, in utilizing the self-scanning type image sensors such as the photo-diode array of the charge accumulation type, CCD, or BBD, etc., if the scanning start timing, i.e., the timing for imparting the start pulse, is varied, the integration time, i.e., the effective light receiving time, also varies with the result that the level of the output signal varies. Accordingly, in the proposed method and device, since the scanning start timing of one of the image sensors is caused to vary by the variable delay circuit with respect to the scanning start timing of the other image sensor, the two image scanning signals to be obtained there are resulted from extreme level variations, so that, even if it is attempted to compare these two image scanning signals for detection of coincidence, such as apparently impossible. After all, it is not at all certain to attain accurate distance detection.

On the other hand, quite recently, there has been a proposal of range finding device on the basis of a quite new idea, one of such device is shown, for example, in U.S. Pat. No. 4,004,852 issued Jan. 25, 1977 to Eugene E. Pentecost for an invention entitled "Integrated Automatic Ranging Device for Optical Instrument". According to this patent, 1st and 2nd images of an object formed by a range finding optical system are scanned by an image sensor to obtain image signals for said two images, and after these image signals have been quantized by quantization means, quantized data on M successive elements of the 1st image and quantized data on $N(N>M)$ successive elements of the second image are stored in data storing means, and by the successive comparison of the thus stored M and N quantized data, the location within the 2nd image of one set of M successive elements of the 2nd image which is most similar to the M successive elements of the first image is detected. And from the data of this location, distance between the device and object is determined. According to this proposed range finding device, the above mentioned defects in the conventional range finding devices has been eliminated, the accuracy of range finding is assured so that correct range finding information is obtained. Especially, since analog signals of two images are quantized, data processing of two images becomes easy and accuracy of the detection is improved. Further, digital processing of image data enables to make major parts of the circuit system of the device digitalized, and with the aid of the present technique in the field of semiconductors, the device can be minimized by using integrated circuits which can be easily adapted as an automatic focus detection or adjustment device for a small size optical device such as cameras. By using this device in cameras, high precision focus adjustment can be attained.

However, for realizing such type of device as disclosed in said U.S. Patent, various kinds of various improvements are required. For example, in such device, a signal storing type image sensor of photo-diode array, CCD or BBD is used, and as is well-known in this field, this kind of image sensor has a predetermined amount of signals to be stored, so that if an integrated value of the signals represented by "intensity of signal light X light receiving time (=integration time)" exceeds the level of the amount of storable signals, there occurs saturation phenomenon, and scan signals properly corresponding to images can no longer be obtained. This necessitates to control integration time of the image sensor. This is generally achieved by for example, utilizing the time until the data regarding the distance between the device and the object is finally obtained after image scan signals from the image sensor have been processed. However, this time is relatively a long time, and when this processing time is utilized as a part of the integration time of the image sensor to control the integration time of the image sensor, in case of relatively low object brightness, in which the required integration time becomes longer than said processing time, it is possible to attain the satisfactory control of the integration, however, in case of relatively high object brightness, in which the required integration time becomes shorter than said processing time, there happens said saturation phenomenon so that scan signals properly corresponding the images can not be obtained. Especially, when the device is firstly operated or operated only one time, there is no assurance that the signals previously stored in the image sensor would properly correspond to the images, which frequently results in erroneous detection. Consequently, for solving this problem, firstly, it is necessary to provide with an improved method.

Further, there is an additional problem to note. In this kind of device, since range determination is made on the basis of the quantized data for the 1st and 2nd images of the object, the accuracy of the range determination depends on output data from quantization means which quantize image signals from the image sensor. If, for example, by any reason, all of the quantized data for the M successive elements of the 1st image become one and the same value, this may be well happened, there would be the case where, in the quantized data for the N successive elements of the 2nd image, the quantized data for the successive elements more than M number become the same as said quantized data for the M successive elements of the 1st image, and in this case, there exist in the 2nd image a plurality of sets of M successive elements identical with the M successive elements of the 1st image so that it is not possible to identify the specified one set. As the result, range determination becomes impossible, so that even if range data is obtained, this is an erroneous data on the basis of the erroneous detection. Consequently, it becomes sometimes necessary to provide with means to solve this problem.

In this kind of device, on the basis of quantized image data, one set of M successive elements of the 2nd image which is most similar to the M successive elements of the 1st image is detected, and from the location of this one set of M successive elements of the 2nd image, the range is determined. If, during range determination processing, a noise is mixed in the data, it becomes difficult to detect one set of M successive elements of the 2nd image which truly correspond to the M successive elements of the 1st image. In spite of this difficulty, there happens to detect one set of M successive elements of the 2nd image which may not truly correspond to the M successive elements of the 1st image. This is caused by adapting the means to detect one set of M successive elements of the 2nd image which is "most similar" to the M successive elements of the 1st image. For solving this problem, for example, with respect to the one set of M successive elements of the 2nd image which has been deemed to be the most similar one to the M successive elements of the 1st image, it is preferable to evaluate the "degree of similarity", and on the basis of this evaluation, to judge whether said one set would be deemed to be the most similar one set.

Furthermore, when said device is adpated for servo focus control in motion picture cameras, and during the repetitive operations of range finding, if the range data obtained at a certain time of operations is apparently different from the range data obtained at the next operation, it is quite reasonable to make the focus control of the camera on the basis of said range data. On the other hand, when the range data obtained at the next operation is very slightly different from the range data obtained at the previous operation, and focus control is made on the basis of this range data, there happens so-called hunting phenomenon of servo system, which causes trouble in the actual photography. For dealing with these problems, it becomes necessary to control, for example, the output of the device so as to make the focus control system not to respond to the range data.

As mentioned, above, in taking various situations into consideration, it is necessary to make many kinds of improvement for realizing said device.

SUMMARY OF THE INVENTION

The present invention provides a range finding device of the type mentioned above but adapting improvements to overcome the defects.

According to this invention, 1st and 2nd detection images of an object are scanned by signal storing type image sensing means to obtain image scan signals, which are quantized by quantization means to produce quantized image data for said 1st and 2nd detection images. On the basis of this quantized image data, the location within the 2nd detection images of one set of M successive elements of the 2nd detection image which is most similar to M successive elements of the 1st detection image is detected, and with the aid of this location data, the distance between the device and the object is determined.

The primary object of this invention is, by using said system, range detection operation is sufficiently assured and reliable correct range information is always obtained, so that if the device is adapted for the automatic focus control of cameras, reliable focus detection is always attained.

More concretely explaining the invention, the object of the invention is, when range finding is processed from signal storing type image sensing means on the basis of image scan signals, only the image scan signals which properly correspond to images and the level of which are properly controlled for range finding, is obtained so that range detection is sufficiently assured and the reliable range information is always obtained.

For achieving the purpose, according to this invention, sequence control means, which controls a series of operations for range finding, will firstly cancel the signals already stored in the image sensing means as unnecessary signals when said series of operations is initiated, and then enables proper storing of image signals in the range sensing means so as to properly control the device. This is very advantageous for obtaining only image signals for range finding from image sensing means, which correspond to images and the level of which is properly controlled.

The device of this invention is controlled by said sequence control means to processing successively at least the following modes of operations.

(a) 1st mode to control the signals already stored in the image sensing means;

(b) 2nd mode to control image signals storing in the image sensing means;

(c) 3rd mode to read out image signals from the image sensing means and after image signals have been quantized by quantization means, to store in data storing means quantized data for the M successive elements of the 1st detection image and quantized data for the N successive elements of the 2nd detection image; and (d) 4th mode to detect, on the basis of the quantized data stored in said data storing means, the location within the 2nd detection image of one set of M successive elements of the 2nd detection image which is most similar to the M successive elements of the 1st detection image.

The other object of the invention is, when range detection is made on the basis of the quantized data from quantization means, to preliminarily detect quantized data from quantization means whether it is proper or not as the data for processing range detection, so as to control the output and/or operation of the device on the basis of the detected result, which assures the range detection and enables the output only of the reliable range formation. For achieving this object, among quantized data derived from said quantized means, it is detected by quantization state detection means in said 3rd mode step that whether or not all of the quantized data for the M successive elements of the 1st image, and on the basis of the output of said quantization state detection means, for example, it is determined whether or not to generate output of final data of the device obtained at the end of said 4th mode or whether or not to return the data to the 1st mode without processing it in the 4th mode from the 3rd mode, which assures range detection and correct range information.

A further object of this invention is to generate only reliable and correct range information by judging whether or not the one set of the M successive elements of the 2nd detection which has been deemed in said 4th mode as most similar to the M successive elements of the 1st detection image is the truly corresponding one set and controlling by said result of the judgment the output of the device and operation of the device. For this purpose, according to this invention, on the basis of quantized data from said quantization means, upon detecting the one set of M successive elements of the 2nd detection image which is the most similar set to the M successive elements of the 1st detection image, the evaluation of "degree of similarity" of the said one set of M successive elements of the 2nd detection image to the M successive elements of the 1st detection image, and according to the result of this evaluation, it is determined to generate or not to generate output of the final data at the end of the 4th mode or to return or not to return the data to the 1st mode without generating output. This prevents, for example, an erroneous range data due to the mixing of a noise in image signals from occurring so as to improve the accuracy of range detection and to generate output of the correct and reliable range data. In explaining more concretely, according to the embodiment of this invention explained later, an integral number $M-\alpha$, for example, which is about 90% of number M is preliminary set, and coinciding number of elements in the one set of M successive elements of 2nd detection image which has been determined as most similar to the M successive elements of the 1st detection image is compared with said value $M-\alpha$, and when said coinciding number exceeds $M-\alpha$, said one set is deemed as the proper set, while said coinciding number is less than $M-\alpha$, said one set is deemed not to correspond to the M successive elements of the 1st detection image.

Another object of this invention is, in specifically considering the case where the device is adapted for servo focus control in motion picture cameras, to make a reliable focus control by preventing improper focus control in the case where the range data obtained in the next range finding operation is quite different or is too slightly different from the range data obtained in the preceding range finding operation when the repetitive range finding operations are made. For this purpose, according to this invention, in the case of repetitive range finding operations, an allowable difference value is preliminarily set, and it is judged whether the difference between the range data obtained in the next range finding operation and that obtained in the preceding range finding operation exceeds or is below said pre-set difference value, and then under AND condition of the judged result, it is determined whether or not to generate output of the range data to be obtained in a next range finding operation. This is very advantageous to attain proper servo focus control of the camera.

A further object of this invention is to present such kind of device as mentioned above with other various improvements in realizing the device and furthermore, to present the improved device to be applied to automatic focal control.

The above mentioned and other objects and features of this invention is apparent from the following description in conjunction with the drawings.

DESCRIPTION OF THE DRAWING

FIG. 1 shows the principle of the range finding of this invention;

FIG. 2 is a perspective view of an embodiment of an optical system adapted for the range finding device of this invention;

FIG. 3 shows a plan view showing the focusing state according to the device of FIG. 2;

FIGS. 12, 13, 14A, 14B, 14C, 14D, 14E, 14F and 14G illustrate timing relations of the control signals from the essential circuit blocks in the circuit system;

FIGS. 15A, 15B and 15C illustrates focusing detection with the aid of the comparison between standard and reference fields;

FIG. 16 shows circuit connections of an embodiment of analogue circuitry including peak detection circuit, threshold level setting circuit, sample hold circuit and quantization (coding) circuit;

FIG. 18 shows circuit connections of an analogue circuitry including range finding circuit and timer circuit in the circuit system of FIG. 11;

FIG. 20 and FIGS. 20A through 20H show circuit connections of an embodiment of digital circuits in the circuitry of FIG. 11;

FIGS. 25, 26, 28, 30 and 31 show blocks of the other various modifications of the servo focus control of the phototaking lens;

DETAILED DESCRIPTION OF THE PREFERRED EMBODIMENTS

Figure 4:
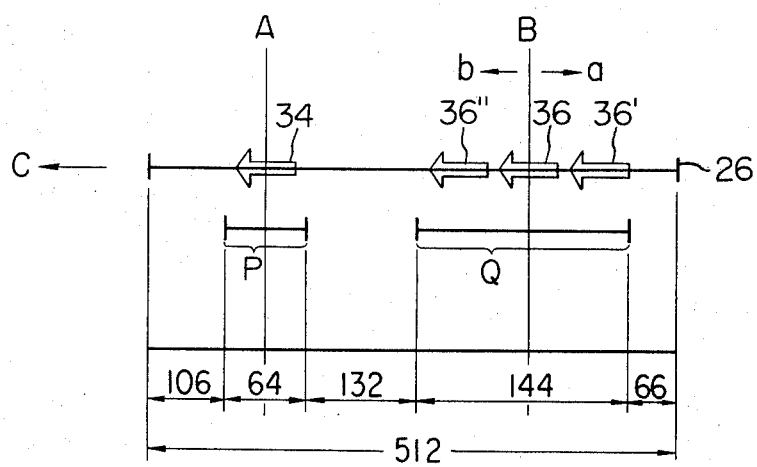
FIG. 4 shows an image forming surface of FIG. 3.

In the following, the present invention will be explained in detail in reference to the accompanying drawing.

FIG. 1 is an explanatory diagram of the principle of the range finding for the range finder according to the present invention.

In the drawing, a reference numeral 2 designates an object for the range finding, numerals 4 and 6 refer to a pair of lenses mutually disposed with a certain definite basic line length W being provided, and a reference numeral 8 designates an image forming plane, on which images 10 and 12 of the range finding object 2 to be obtained by the lenses 4 and 6. For simplicity of the explanation, the size of the object 2 can be regarded as being substantially a spot with respect to the distance to be measured.

If it is now assumed that the object 2 is on the optical axis 14, the image 10 of the object 2 due to the lens 4 is formed on the intersection of the image forming plane 8 and the optical axis 14 of the lens 4 on the plane irrespective of the distance between the object 2 and the lens 4. In this instance, if the object 2 is at infinity to the lens 4, it can be regarded as being substantially on the optical axis 16 with respect to the lens 6, so that the image 12 of the object 2 due to the lens 6 is formed on the intersection between the image forming plane 8 and the optical axis 16 of the lens 6 on that plane. Therefore, the respective positional relationship between the images 10 and 12 with respect to the optical axes 14 and 16 of the lenses 4 and 6 can be regarded as being substantially the same. For instance, when the optical axes 14 and 16 of the lenses 4 and 6 are perfectly superposed upon each other, the images 10 and 12 can be regarded as being coincided. Accordingly, from the positional relationship of the images 10 and 12 with respect to the optical axes 14 and 16 of the lenses 4 and 6, it can be known conversely that the object 2 is at infinity.

Next, if it is assumed that the object 2 comes closer toward the lens 4 on the optical axes 14 of the lens 4, the image 10 of the object 2 due to the lens 4 does not move from the intersection of the image forming plane 8 and the optical axis 14 of the lens 4 on the plane, while the image 12 of the object 2 due to the lens 6 moves in the direction of an arrow 18 from the intersection of the image forming plane 8 and the optical axis 16 of the lens on that plane. This moving quantity becomes larger as the object 2 comes closer to the lens 4. Theoretically, it has such a characteristic that, when the distance between the object 2 and the lens 4 is zero, the moving quantity becomes infinite. Consequently, the positional relationship of the images 10 and 12 on the image forming plane 8 with respect to the optical axes 14 and 16 of the lenses 4 and 6 is of such a nature that it becomes remarkably different as the object 2 comes closer to the lenses. For example, if it is considered that the optical axes 14 and 16 of the lenses 4 and 6 are mutually superposed, the images 10 and 12 are not in coincidence, and the difference or discrepancy between the two images can be regarded as the information for the distance to be found. Therefore, depending on the positional relationship of the images 10 and 12 with respect to the optical axes 14 and 16, the distance up to the object 2 can be made known.

The foregoing explanations are exactly the principle of the trigonometric survey per se, which is the same as that of the range finder type double-image coincidence type range finder.

Accordingly, if the positional relationship of the two images 10 and 12 on the image forming plane 8 with respect to the optical axes 14 and 16 of the lenses 4 and 6 can be found out in some form or other, the distance to the object 2 can be made known, and this principle can also be applied to focus detection in photographic cameras, and so forth.

The present invention has been made by paying attention to such point, according to which the positional relationship between two images formed by a first optical system and a second optical system disposed with a certain basic line length being provided therebetween with respect to the optical axes of the respective optical systems (this will hereinafter be termed as "measurement of discrepancy between two images") is compared digitally through an electrical digital system, thereby detecting the focus position of the optical systems with respect to the object, or the distance to the object.

FIG. 2 is a perspective view showing one embodiment of the optical system applicable to one embodiment of the range finding device according to the present invention. In the drawing, a reference numeral 20 designates a first optical system to collimate the range finding object on its optical axis 30, 22 a second optical system disposed at a position away from the first optical system 20 with a predetermined basic line length, and having its optical axis 32 in parallel with the optical axis 30 of the first optical system 20, 24 a line sensor having photosensor arrays 26 disposed linearly on a plane containing the optical axes 30 and 32 of the first and second optical systems 20 and 22, 28 a prism to lead the two images of the range finding object to be obtained by the first and second optical systems 20 and 22 to the photosensor arrays in the line sensor 24. The line sensor 24 is a photoelectric conversion means known as CCD photosensor or photo-diode array, which is well known element capable of taking out electrical signals corresponding to the luminosity distribution of the image focussed on the sensor arrays 26 in the form of a serial signal, i.e., a time sequential signal. A reference letter L designates a photo-taking lens of a camera, etc., which is so constructed that the second optical system 22 may be moved in the direction of X-Y along the basic line BL through an interlocking mechanism (not shown) which is associated with focus adjustment of the lens L. With such construction, the optical axis 32 of the second optical system 22 can be moved parallelly in the direction of the arrow X-Y.

In the following, explanations will be made as to the light path in the construction shown in FIG. 2 will be given in reference to FIG. 3. In the drawing, the sensor arrays 26 in the abovementioned line sensor 24 is replaced by a linear image forming plane 26'.

In the above-described construction, a light beam from the object 2 by the first optical system 20 is guided onto the image forming plane 26' through the prism 28 to form a standard image 34, while light beam from the object 2 by the second optical system 22 is guided onto the image forming plane 26' through the prism 28 to form a reference image 36. Here, if the first optical system is made a collimating optical system, the standard image 34 is always formed at a position A on the extension of the optical axis 30 of the first optical system 20 through the prism 28 irrespective of the distance upto the object 2. On the other hand, the reference image 36 is formed at a position away from the extension of the optical axis 32 of the second optical system 22 through the prism 28, which is discrepant either in the arrow direction a or b in accordance with the position of the second optical system 22 and the distance upto the object 2.

When the photo-taking lens L is focussed on an infinite distance, the second optical system 22 is adjusted to a position shown with a solid line in FIG. 3. In this instance, the position of the optical axis 32 of the second optical system 22 on the image forming plane 26' at the extension of the optical axis 32 through the prism 28 is regarded as B. If the object 2 is at infinity the light flux from the object 2 can be considered to go along the optical axis 32 of the second optical system 22. Accordingly, the positional relationship of the reference image 36 with respect to the position B is exactly the same as the positional relationship of the reference image 34 to the position A. That is to say, there is no discrepancy at all between the standard image 34 and the reference image 36. When these two image are exactly coincided, the phototaking lens L is focussed at infinity as already mentioned, hence it is also focussed on the object 2 which is at the infinite distance. In contrast to this, when the photo-taking lens L is focussed on the infinite distance and the object 2 is on the nearest distance to the lens, the reference image reaches the image forming plane 26' from a light path 38', and is formed as an image 36' at a position away from the position B in the arrow direction a. On the other hand, since the positional relationship of the reference image 34 by the first optical system 20 to the position A on the image forming plane 26' is invariable, the positional relationship of the reference image 36' to the position B is different from the positional relationship of the standard image 34 to the position A. That is to say, the standard image 34 is discrepant from the reference image 36'. When the two images are discrepant in such a state, the photo-taking lens L is focussed on the infinite distance as mentioned previously, so that it is in the back focus state with respect to the object 2 which is in the nearest distance to the lens.

From such condition, when the photo-taking lens L is brought to the nearest position to the object, the second optical system 22 is moved in the arrow direction X to be adjusted to a position represented by a dot-and-dash line in FIG. 3. In this case, the reference image reaches the image forming place 26' from a light path 38" to be formed in an image 36. In order to obtain such result, the photo-taking lens L is, of course, adjusted properly in an interlocked relationship with the sec;ond optical system 22. Thus, the positional relationship of the reference image 36 to the position B is exactly the same as the positional relationship of the standard image 34 to the position A, whereby the two images are perfectly coincided. Incidentally, the photo-taking lens L is focussed on the nearest distance as previously mentioned, hence it is focussed on the object 2 which is at the nearest distance to the lens.

In contrast to the above, when the photo-taking lens L is focussed on the nearest distance and the object 2 is at the infinite distance, the reference image reaches the image forming plane 26' and formed as an image 36" at a position discrepant in the arrow direction b with respect to the position B. On the other hand, since the positional relationship of the standard image 34 by the first optical system 20 to the position A on the image forming plane 26' is invariable, the positional relationship of the reference image 36" to the position B differs from the positional relationship of the standard image 34 to the position A. When the two images are different in such condition, the photo-taking lens is focussed on the nearest distance, hence it is in a front focus state to the object 2 which is at the infinite distance.

Considering the foregoing situations as a whole, the inter-relationship between the positional relationship of the image forming position of the reference image obtained by the second optical system 22 with respect to the position B and the positional relationship of the standard image with respect to the position A is affected by the inter-relationship between the position of the second optical system 22 on the base line BL, i.e., the focus position of the photo-taking lens 34, and the distance upto the object 2. Therefore, by properly setting a function of moving quantity of the second optical system 22 which displaces along the base line BL in association with focus adjustment of the photo-taking lens L, it becomes possible to determine the back focus state when the reference image 36 by the second optical system 22 is discrepant in the arrow direction a with respect to the standard image 34 by the first optical system 20, the front focus state when it is discrepant in the arrow direction b, and the focussed state when it is discrepant in the neither direction a or b. In other words, so far as the interlocked relationship can be established between the preperly adjusted photo-taking lens L and the second optical system 22, it is possible to know whether the photo-taking lens L is in the front focus, or back focus, or exact focus state by observing the positional relationship between the standard image 34 and the reference image 36 on the image forming plane 26' with respect to the positions A and B, i.e., discrepancy between the two images, and also a deviation of the adjustment position of the photo-taking lens L from the regular focussing position to the object 2 by observing magnitude of the discrepancy.

FIG. 4 is a schematic diagram of the image forming plane 26', in which there is adopted such a method to clarify the relative positional relationship between the standard image 34 and the reference image 36 on the image forming plane 26' that a certain definite range with the position A as the center is designated as a standard sight P and a certain definite range with the position B as the center is designated as a reference sight Q to detect at which position in the reference signal Q the images (36, 36', 36") which correspond to the standard image 34 obtained in the standard sight P are formed. Incidentally, the standard sight P is determined by a sight of the range finding object collimated by the first optical system 20, and the reference sight Q is determined by the moving range of an image corresponding to the standard sight P in the directions a and b with the position B as the center, when the second optical system 22 displaces in the X-Y direction along the base line BL.

In the present embodiment as shown in FIG. 4, the image data are processed in such a manner that the image forming plane 26' is divided into 512 pieces of image element sensing sections arranged linearly for detecting the image elements of the standard and reference images. (Accordingly, the abovementioned line sensor 24 to be used has the linearly arranged photo-sensors of 512-bit construction, i.e., 512 pieces of the photo-sensors). Of these 512 image element sensing sections, 64 pieces are appropriated for the standard sight P and 144 pieces are appropriated for the reference sight Q.

In addition, as regards the operations of the signal processing system to be explained later, there are provided 106 pieces of invalid image element sensing sections outside the standard sight P, 132 pieces between the standard sight P and the reference sight Q, and 66 pieces outside the reference sight Q, although such is merely a matter of selection. Incidentally, the number of image election sensing sections to be alloted to the standard sight P and the reference sight Q can be aribitrarily selected by various conditions such as resolution of the image to be formed in each of the sights, precision in the range finding, and so forth, which number is determined by required performance of the device. In this case, an output from the line sensor 24 is read out in the arrow direction C in the drawing.

Figure 5:
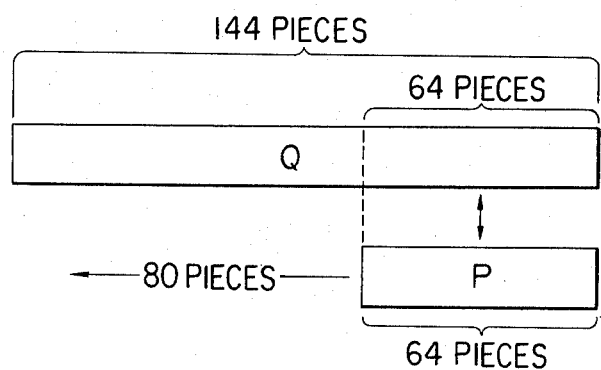
FIG. 5 shows the range finding principle comparing standard field and reference field in the range finding device of this invention.

In the above-described setting, when the image obtained in the standard sight P is coincided with the center image portion of the three images obtained in the reference sight Q, the photo-taking lens L is the just focus state; when it is coincided with the image portion at a position to the side of the arrow a, the lens is in the rear focus state; and when it is coincided with the image portion at a position to the side of the arrow b, the lens is in the front focus state. These focussing states can be detected by comparing the 64 image elements in the standard sight P and 144 image elements in the reference sight Q side by side. In more detail, as shown in FIG. 5, the 64 image elements in the standard sight P are first compared with 64 image elements at one end part of the 144 image elements in the reference sight Q, and then the 64 image elements are shifted for one image element in the arrow direction to effect the same comparison. This comparison operation is repeatedly performed until the 64 image elements in the standard sight P are completely compared with 64 image elements at the other end part of the 144 image elements in the reference sight Q. As the result, it becomes possible to detect with which image formed on the 64 image elements in which portion of the reference sight Q the image formed in the 64 image elements in the standard sight P is coincided, whereby it becomes possible to know whether the adjustment position of the photo-taking lens L is in the front focus state, or the rear focus state, or the just focus state with respect to the object within the standard sight which the photo-taking lens L is collimating.

Figure 6A:
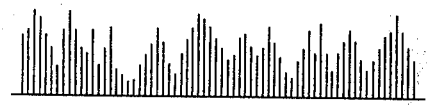
FIGS. 6A, 6B, and 6C shows wave forms illustrating quantization of image signals in the range finding device of this invention.
Figure 6B:
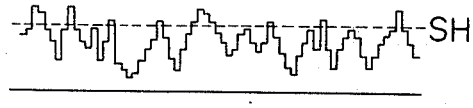
Figure 6C:
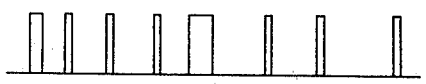

The above-described comparison and detection are carried out with a digital system, for which purpose the outputs from the line sensor 24, i.e., image scanning signals are converted to digital signals of "1" or "0" level for each image element. It is well known that the image output from the line sensor 24 is produced as a non-continuous signal as shown in FIG. 6(A). Such non-continuous signal is converted into a continuous signal as shown in FIG. 6(B) by means of a sample and hold circuit, etc. to obtain a digital signal of "1" or "0" as shown in FIG. 6(C) which has been quantized or two-valued on the basis of a threshold level SH set in accordance with a predetermined condition.

Incidentally, comparison between the standard sight P and the reference sight Q based on the signals converted into "1" or "0" for each image element can be done by counting the numbers of the image elements among the 64 corresponding image elements which are mutually coincided, the level "1" and "1" between the corresponding image or "0" and "0" between them being taken as the coincidence, and the level "1" and "0" between them being taken as the non-coincidence. More concretely, the coincided numbers of the corresponding image elements between the standard sight P and the reference sight Q are counted, while comparing such corresponding image elements, as shown in FIG. 5, and by conducting this comparison sequentially by shifting the image element one by one, it becomes possible to know the corresponding position of the 64 image elements in the reference sight Q when the coincided number reaches the maximum. On the basis of this corresponding position in the 64 image elements in the reference sight at this time, it becomes possible to know the focus adjusting state of the photo-taking lens to the range finding object. The reason for finding out the maximum coincidence numbers of the image elements in the above-described correspondence and comparison, without finding the total coincidence among the entire 64 image elements, is that possible erroneous detection in the coincidence number should be avoided, which takes place when mixing of noises to the image outputs from the line sensor 24, quantization (or two-value) errors at the time of digital signalization, and so forth occur, and the entire image elements are not necessarily coincided, even if the comparison is done by corresponding the standard sight P to the coincided position in the reference sight Q.

Based on the abovementioned setting, one embodiment of the range finder according to the present invention is so constructed that an image to be formed by the optical system as shown in FIG. 2 is scanned by the line sensor 24, and the focus adjustment state of the photo-taking lens is detected by a digital signal processing system on the basis of the image signals obtained from the line sensor 24 at this time.

The line sensor 24 to be used for the present invention is of such construction that, as already mentioned, 512 photosensors are arranged in the linear form. One example of such line sensor is the photo-diode array of 512-bit construction manufactured and sold by Reticon Corp., U.S.A. under the model designation RL512C. Besides this, there may of course be utilized CCD photo-sensor, CCD photo-diode consisting of CCD and photo-diode in combination, and other linear type image sensor devices. As is well known, these image sensor devices perform accumulation of electric charge in each photo-sensor in accordance with luminosity of light projected into the light receiving section thereof, or discharge of the electric charge accumulated to its full level. The accumulated electric charge in each photo-sensor, or electric charge remaining in the photo-sensor after the discharge, or electric charge corresponding to that as discharged is sequentially taken out through an analog gate of an FET, etc. (in the case of the photo-diode array—MOS image sensor), or is simultaneously taken in an analog shift register such as CCD, etc., after which it is transferred sequentially to an output section through the analog shift register, and finally taken out of the output section (in the case of the CCD photo-sensor, or CCD photo-diode), whereby the signal corresponding to the luminosity distribution of the image formed on the sensor array, i.e., scanning signal of the image, can be taken out time-sequentially.

Figure 7:
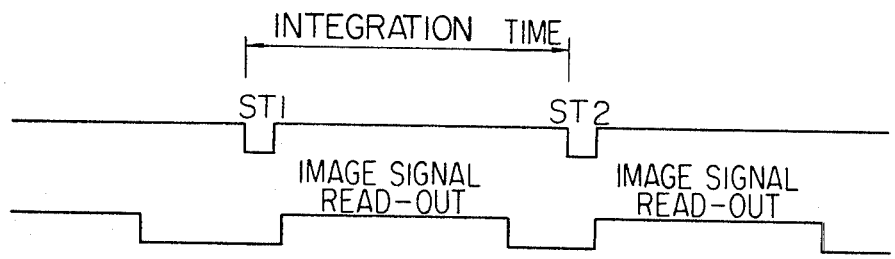
FIGS. 7 and 8 show timing relation for sequential processing of image signals of the range finding device of this invention.

In such image sensor devices, a time for the charge accumulation in or discharge from each photo-sensor (i.e., a time for integration of light signal, which will be called hereinafter as "integration time") and luminosity of light at the light receiving section have close relationship therebetween. That is, a short integration time is sufficient for high luminosity, and a long integration time for low luminosity. On the other hand, it has been well known that a long integration time for high luminosity would inevitably invite saturation or empty phenomenon in the photo-sensor to make it unable to obtain a signal well suited for the luminosity distribution. This integration time also has close relationship with a clock pulse to drive the sensor device. In more detail, as shown in FIG. 7, a time interval from one signal readout operation to the next read-out, i.e., a time interval from application of a start pulse ST1 to application of the subsequent start pulse ST2, corresponds to the integration time. From the time instant when the start pulse ST1 is applied, it is necessary to take out an image signal corresponding to the luminosity distribution obtained within the integration time prior to application of the start pulse ST1. In addition, since this image signal must be taken out before application of the subsequent start pulse SR2, the clock pulse for read-out operation should inevitably be at a high speed, if a short integration time is to be obtained for a bright object. In contrast to this, there may be contemplated such a method of obtaining low speed clock pulse by constructing the sensor device in such a way that brightness of the optical system to be used for this system is reduced to secure a long integration time. In so doing, however, the prolonged integration time inevitably invites deterioration in S/N due to dark current, and an extremely prolonged integration time to a dark object remarkably protracts the signal reading time and the signal processing time to be accompanied thereby, hence such method is not favorable. Accordingly, it is unavoidable to depend on the high speed clock pulse for the bright object. From such standpoint, therefore, the present embodiment is so constructed that the minimum integration time of 1.28 m sec. may be obtained from the clock pulse of 400 KHz. However, this relatively high speed clock pulse of 400 KHz raises various problems in power consumption and circuit design of the sensor system, particularly, in case of forming the integrated circuit, hence it is not desirable to control a large-scaled circuit wth a high speed clock pulse. In the present embodiment, therefore, a relatively low speed clock pulse of 50 KHz is used for controlling most of the sensor system, except for the line sensor 24 and a part of the circuit which co-operates therewith. By the use of the low speed clock pulse, however, the signal processing time for the image signal obtained from the line sensor 24 becomes eventually longer than the output time interval of the image signal, inasmuch as the line sensor 24 is driven with the high speed clock pulse. As a result, there occurs a large difference between the output time interval of the image signal and the signal processing time, owing to which the image signal output is produced for several tens of times for one signal processing, of which only one image signal is used, and the remainder is not used at all. Operation of the sensor system in such form amounts to constant demand for the high speed clock pulse of 400 KHz which is unfavorable from the point of power consumption, etc., and causes the line sensor 24 to waste power, so that such construction is not suitable for use in photographic cameras with limited power supply. Accordingly, the present embodiment is so constructed that the high speed clock pulse of 400 KHz is supplied to the line sensor 24 only when the image signal is required to carry out production of the image signal output so that the power consumption is kept minimum.

Figure 8:
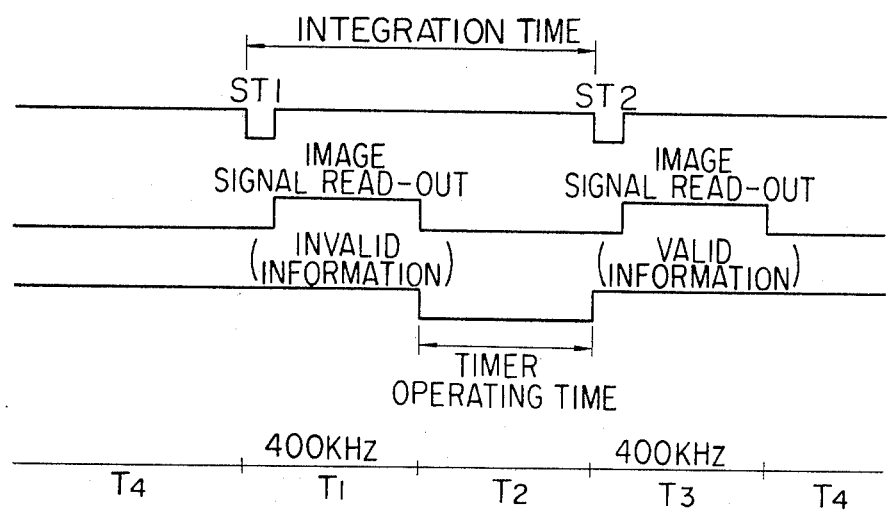

Explaining such construction in further detail, a time, in which the system operating with a low speed clock pulse is conducting the signal processing corresponds to an extremely prolonged integration time for the line sensor 24, so that, after termination of the information processing, even when the image signal is taken out by supplying the start pulse and the clock pulse to the line sensor 24 which has been in stoppage upto that time, the image signal is in saturation, and it is not possible to use the image signal as a valid signal. In the present embodiment, therefore, as shown in FIG. 8, when a signal processing period $T_4$ is terminated in the previous operating cycle and the subsequent operating cycle is entered, the clock pulse of 400 KHz and the start pulse ST1 are imparted to the line sensor 24 during the initial period $T_1$, discarding the saturated invalid image information. When the subsequent period $T_2$ is entered after termination of this operation, the clock pulse of 400 KHz is stopped, and a timer is operated in accordance with a signal from the light receiving element which observes brightness of the object. In other words, the period $T_2$ is established for adjusting the integration time in the line sensor 24 in accordance with the brightness of the object, which is adjusted in a range of from 0 to approximately 100 m sec. in accordance with the brightness of the object which varies from illuminated brightness to darkness. In this way, when an output is produced from the timer to notify termination of the integration time, the clock pulse of 400 KHz and the start pulse ST2 are again supplied to the line sensor 24 during the subsequent period of $T_3$ to cause a valid image signal output to be produced, which is applied to the signal processing circuit. Thus, when the output of the image signal is terminated, the clock pulse of 400 KHz is stopped, and the signal processing period $T_4$ is entered. Incidentally, as shown in the timing chart, the integration time in the line sensor 24 is determined by a sum of the periods $T_1$ and $T_2$, and the integration time is adjusted in a range of from 1.28 m sec. to approximately 101 m sec.

Figure 9:
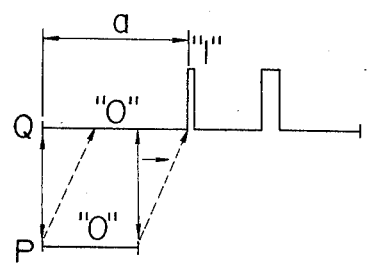
FIG. 9 illustrates disadvantages in case of improper quantization of the image signals.
Figure 10:
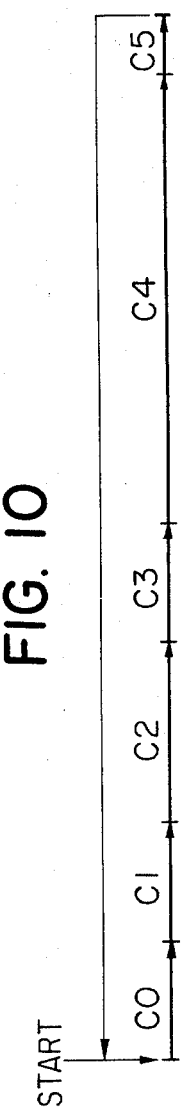
FIG. 10 illustrates the sequence of the operational modes of the range finding device of this invention.

In the following, explanations will be made as to the method for converting the signal obtained from the line sensor 24 into digital two-value signal. As stated in the foregoing, the image signal output of a waveform as shown in FIG. 6(A) is produced from the line sensor 24, and is converted to a continuous signal waveform as shown in FIG. 6(B) through a sample and hold circuit. A threshold level SH for quantizing this signal in two-value signal is established on the basis of the peak value during production of signal output in accordance with the standard sight P in the image signals to be obtained from the line sensor 24. More concretely, an image signal corresponding to the standard sight P is extracted through a gate circuit from the valid image signals obtained from the line sensor 24, and the peak value thereof is detected by use of a peak detection circuit. The thus detected peak value is transferred to the sample and hold circuit at a time instant when the image signals from the line sensor 24 are totally read out, and is stored therein until a time instant when the processing operation of the valid image signals in this batch is terminated, and the valid image signals are again read out of the line sensor 24. At the time of read-out of the valid image signals for the subsequent batch from the line sensor 24, this stored peak value is multiplied by a constant of a predetermined value of below 1 to be subjected to a level down for a few percent, and is applied to a comparison circuit for quantization (two-value) to be utilized as the threshold level SH for converting the image signals into digital signal of "1" or "0". At the time of quantization of the image signals into two-value, if the outputs from the comparison circuit for quantization, for example, are found to be entirely "1" or "0", as the result of checking the state of the outputs during reading of the standard sight P, it seems impossible to find out the image in the standard sight P from within the reference sight Q, or, if possible, the probability of erroneous detection is high, so that it is desirable to take some measures against such erroneous detection. Such erroneous detection is caused by the following situation. That is, as shown in FIG. 9, when the two-value image data for the standard sight P are entirely "0", and the two-value image data for the reference sight Q are such as shown in the drawing, there are many portions within a section a, in which the 64 image elements in the data for the reference sight Q are all "0" with the consequence that the entire 64 image elements are totally coincided at any portion thereof at the time of correspondence and comparison of the data for the 64 image elements, and no particular portion of the coincidence can be found out. Incidentally, the signal processing system of the present embodiment to be described hereinbelow is so constructed that detection is first made as to whether the two-value data are entirely "1" or "0" for the abovementioned standard sight P at the time of quantization of the image signal from the line sensor 24, and the focus control signal output and the focus indication signal output as the final output signals of the signal processing system are regulated on the basis of the detected result. Stating further about the output control of the focus control signal and the focus indication signal as the final output signals, the signal processing system of the present embodiment is so constructed that a discrimination is first made as to whether the maximum number of coincidence, which was obtained as the result of correspondence and comparison between the two-value data about the standard sight P and the data for 64 image elements out of the two-value data about the reference sight Q, is larger or smaller than the predetermined minimum allowable number of coincidence, and that regulation of the abovementioned outputs is carried out by the result of this discrimination. Further the system compares the data relative to the position within the reference sight Q with the data for position obtained in the same manner as in the previous time, and regulates this output by a state of this difference between the two positional data. More detailed explanations will be given about these controls in the signal processing system to be described hereinbelow.

The signal processing system which is applicable to the present embodiment is divided into the following six principal sequence modes designated by C0 to C5 so as to sequentially and adequately carry out various operations as explained in the foregoing.

In the sequence mode C0, the system is in its waiting condition, and it can shift to the next sequence mode C1, only when the operating instruction is output as the result of discrimination between the operating instruction or stopping instruction.

In the sequence mode C1, feeding of the clock pulse of 400 KHz and the start pulse is effected to the line sensor 24, and an invalid image output is discarded. Incidentally, in the sequence modes C0 and C1, a timer for measuring the integration time is maintained in a set condition. When the invalid image output is produced in the sequence mode C1, there comes the next sequence mode C2.

When the system enters into the sequence mode C2, resetting of the timer is released, and the timer starts the time measurement in accordance with brightness of the range finding object. As already mentioned in the foregoing, the total time of the previous sequence mode C1 and this sequence mode C2 corresponds to the integration time in the line sensor 24. As soon as the time measurement by the timer is terminated and a predetermined signal output is produced from the timer, the system enters into the next sequence mode C3.

In the sequence mode C3, the feeding of the clock pulse of 400 KHz and the start pulse to the line sensor 24 is resumed and reading of the valid image signal is performed. At this time, the image signal read out of the line sensor 24 is quantized, of which only the two-value data about the standard sight P and the reference sight Q are stored. On the other hand, this sequence mode C3 performs detection of the peak value out of the image output corresponding to the standard sight P among the image outputs from the line sensor 24, or performs detection as to whether the entire two-value signals of the outputs are in the level "0" or "1". When the image output from the line sensor 24 is terminated from the sequence mode C3, the system enters into the subsequent sequence mode C4.

In the sequence mode C4, the data about the standard sight P as quantized and stored in the previous sequence mode C3 are compared one by one with the data about the reference sight Q, and, by this comparison of each of the 64 image elements, the maximum of the coincided number of the image elements and the positions within the reference sight Q of the 64 image elements, where the maximum coincided number of image elements are present, are detected. As the result of this, there can be obtained data about the maximum coincided number of image elements and the positions within the reference sight Q of the 64 image elements where the coincided numbers are detected. When this sequence mode is completed, the signal processing system enters into the sequence mode C5.

In the sequence mode C5, the results obtained in the previous sequence mode C4 is evaluated, and various outputs such as indication of the focus adjusting condition of the photo-taking lens L, i.e., front focus, back focus, and just focus, indication of control of the photo-taking lens L to the just focus position, indication of failure of the focus detection, and various others. As soon as the sequence mode C5 is terminated, the system return to the initial sequence mode C0 to perform discrimination of the operating instruction or the stoppage instruction. When the operating instruction output is produced, the signal processing system again repeats the same operations as mentioned in the foregoing starting from the sequence mode C1, and, when the stoppage instruction output is produced, it is kept in the waiting condition in the sequence mode C0.

Figure 11D:
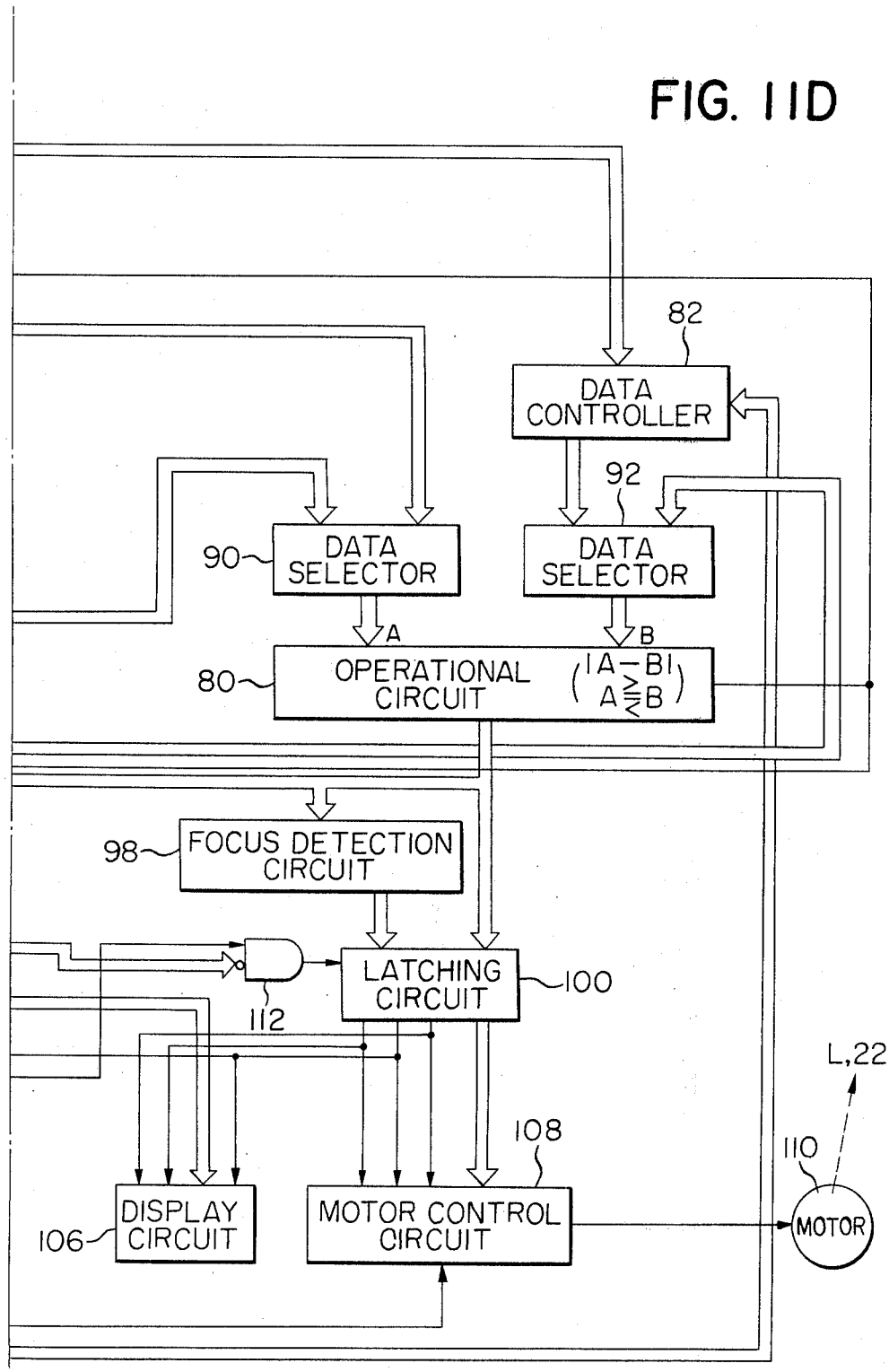
FIG. 11 shows block connections illustrating one embodiment of the circuit structure of the range finding device of this invention.

One example of the signal processing system which performs processing of the image signals in accordance with the above-described sequence modes is shown in FIG. 11. In the drawing, a reference numeral 52 designates a mode control counter which produces the sequence signal outputs to denote each of the sequence modes C0 to C5 and controls the sequence of the entire system; 54 a mode counter controller which imparts to the mode control counter 52 various instructions such as step-forward, reset, etc.; 56 a control switch circuit which imparts to the mode counter controller 54 the operating instruction or stoppage instruction; 58 a sequence controller for the line sensor which imparts to the line sensor 24 the clock pulse of 400 KHz and the start pulse; 60 a driver for the line sensor which drives the line sensor 24 by the abovementioned start pulse and the clock pulse; 62 an image signal processing circuit which amplifies an image signal output from the line sensor 24, and samples and holds non-continuous image output signals, thereby converting them into continuous image output signals; 64 a two-value (or quantization) circuit which converts the image signals from the image signal processing circuit 62 into the two-value signal of "1" or "0"; 66 a shift register which stores therein the two-value signals of the 64 image elements corresponding to the standard sight P out of the quantized image signals from the abovementioned two-value circuit 64; and 68 and 70 refer to shift registers which store therein the two-value signals for the 144 image elements corresponding to the reference sight Q out of the quantized image signals from the abovementioned quantization circuit 64. These shift registers 66, 68 and 70 are the serial-in-serial-out type shift registers. The shift registers 66 and 68 are of the circulating type 64-bit construction, while the shift register 70 is of the non-circulating type 80-bit construction. A reference numeral 72 designates an exclusive "nor" logic circuit 72 with the clock pulse to produce the same as a countable pulse signal; 76 a coincidence bit counter which counts the number of pulse signals from the gate circuit 74; 78 a latch circuit to latch a count output of the coincidence bit counter 76 by the latching instruction; 80 an operational circuit to process data applied to an input A and data applied to an input B in parallel operation, and to produce in parallel these data outputs relative to the absolute value of a difference between both data and data relative to magnitude of these data; 82 a data controller which selectively outputs, on the basis of a control signal to be applied, the bit numbers from one of the end parts of the reference sight Q denoting the position of the particular 64 image elements in the reference sight Q to be a standard for determining the just focus state of the photo-taking lens L (the position is, for example, such one as shown by B in FIGS. 3 and 4); 84 a shift quantity counter to count the shifting quantity when comparing the two-value data about the standard sight P and the two-value data about the reference sight Q, while relatively shifting them for each image element; 86 a latch circuit to latch the content of the shift quantity counter 84 by the latching instruction when the coincided numbers of the 64 image elements becomes the maximum in comparing the two-value data about the standard sight P and the data about each of the 64 image elements in the reference sight Q; 88 a shift quantity memory latch circuit to store the data latched in the latch circuit 86 in one operating cycle, when the sequence modes C0 to C5 are made one operating cycle, upto the subsequent operating cycle; 90 a data selector to selectively apply each output of the latch circuit 78 and 86 to the input terminal A of the operational circuit 80; 92 a data selector to selectively apply the output from the data controller 82 and the output from the shift quantity memory latch circuit 88 to the input B of the operational circuit 80; 94 a switch register to selectively output, based on a control signal to be applied, data for a permissible difference to be a standard for detecting as to whether a difference between the focus detection result data which have been detected between the two operating cycles are above a certain definite value or not, and data about a permissible width of variation in order not to be sensitive to variations in the just focus of a small width at the detection of the just focus state; 96 a digital comparator to compare the output from the operational circuit 80 with the output from the switch register 94, based on which an information output relative to magnitude thereof is produced; 98 a just focus detection circuit to detect whether the photo-taking lens L is at the just focus position to the object, or not, based on the output from the operational circuit 80; 100 a latch circuit to store therein the output form the just focus detection circuit 98 and the output from the operational circuit 80; 102 a two-value state detection circuit to detect whether the two-value signals corresponding to the standard sight P out of the two-value signal outputs produced from the two-value circuit 64 are all "1" or all "0"; 104 an output regulating circuit to effect the output control of the focus control signal and the focus indication signal as the final output signals, on the basis of the outputs from the operational circuit 80, the digital comparator 96 and the two-value state detection circuit 102; 106 a display circuit to perform display of the focus adjusting state of the photo-taking lens L and of failure in detecting the just focus state thereof, on the basis of the outputs from the latch circuit 100 and the output regulating circuit 104; 108 a servo-motor control circuit to control a servo-motor 110 to drive the photo-taking lens L, on the basis of the outputs from the latch circuit 100 and the output regulating circuit 104; 112 is a gate circuit to impart a latching instruction to the latch circuit 100; 114 a gate circuit to impart a latching instruction to the latch circuit 78; 116 a peak detection circuit to detect a peak value of a signal corresponding to the standard sight P among the image outputs from the line sensor 24; 118 a threshold level setting circuit to determine a threshold level SH which is a standard for quantizing the image signals by multiplying the peak value detected by the peak detection circuit 116 with a predetermined number small than 1, e.g., 0.8; and 120 a sample and hold circuit to store the threshold level SH determined by the threshold level setting circuit 118 upto the subsequent operating cycle. The output from the sample and hold circuit 120 is applied to the two-value circuit 64, and the two-value circuit 64 quantizes the output from the image signal processing circuit 62, i.e., the image signals, on the basis of the output from the sample and hold circuit 120. In this instance, the two-value circuit 64 compares the output from the image signal processing circuit 62 compares the output from the image signal processing circuit 62 with the output from the sample and hold circuit 120, i.e., the threshold level SH, and renders those values which are above the level to be "1", or renders those values which are below the level to be "0", thereby quantizing the image signals (vide: FIGS. 6(B) and 6(C)). This will be described in more detail later.

A reference numeral 122 designates a light measurement circuit to measure brightness of the object; 124 a timer for counting a time based on an output from the light measurement circuit 122; 126 a sequence counter to produce a standard signal output to be a standard for controlling a sub-sequence in each of the sequence modes C0 to C5; 128 a sequence decoder to decode an output signal from the sequence counter 126 and to produce a sub-sequence control signal necessary for each of the sequence modes C0 to C5; 130 a data take-in controller to produce data take-in control signal outputs for the peak detection circuit 116, the two-value state detection circuit, and the shift registers 66, 68 and 70, and so on in the sequence mode C3; 132 a data processing controller to process the image signals as taken thereinto and to generate various control signals to detect the focus adjusting state of the photo-taking lens L; 134 a data output controller to generate control signals for evaluation of the final detection results and for output of the detected results; 136 a counter controller to apply a counted pulse, reset pulse, etc. to the sequence counter 126; and 138 a sight change-over switch circuit to effect change-over of the range finding sight by changing over the number of the image elements to be set in the standard sight P.

The operations of the signal processing system of the above-described construction will now be explained in detail in the following.

Figure 12:
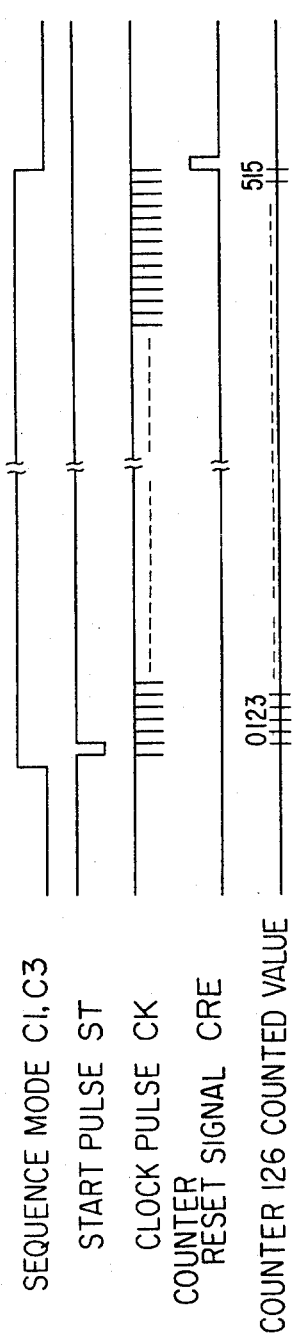

In the sequence mode C0, a state set by the control switch circuit 56, i.e., a state of the operating instruction or the stoppage instruction, is determined by the mode counter controller 54. When the stoppage instruction is issued, the mode control counter 52 maintains a state of the sequence control signal output representing the sequence mode C0 being produced. On the other hand, when the operating instruction is issued, the output from the mode control counter 52 is changed over to the sequence control signal representing the sequence mode C1 by the instruction from the mode counter controller 54. When the signal processing system enters into the sequence mode C1, the clock pulse CK of 400 KHz is output from the sequence controller 58 for the line sensor, as shown by the time chart in FIG. 12, and is applied to the sensor driver 60, the counter controller 136, and the data take-in controller 130. Subsequently, after lapse of a certain definite time, the start pulse ST is output from the sequence controller 58, and is applied to the sequence counter 126 as a count starting pulse through the counter controller 136, and also to the driver 60 as the image output instruction signal to the line sensor 24.

Figure 13:
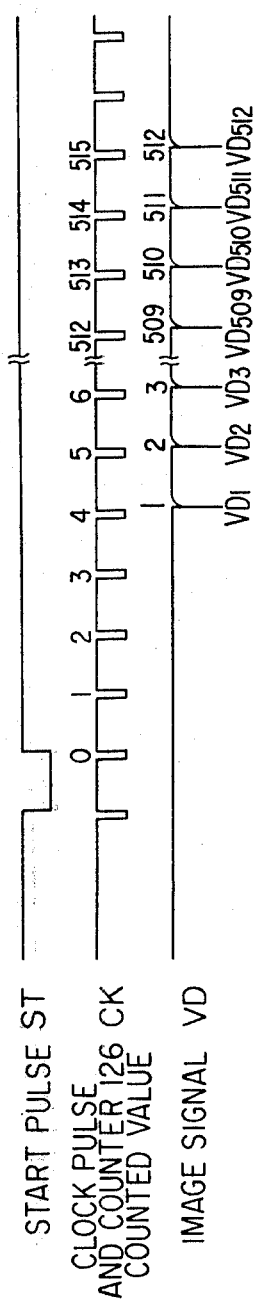

FIG. 13 shows a relationship of the image signal outputs from the line sensor 24 with respect to the start pulse ST and the clock pulse CK. After application the start pulse ST, there is produced an image signal $VD_1$ output of the first image element delayed for about 100 n sec. from the trailing of the fourth clock pulse CK. Thereafter, there are sequentially produced the image signal for each image element upto the image signal $VD_{512}$ of the 512th image element with a delay of about 100 n sec. from the trailing of each clock pulse CK.

And, on the basis of output correspondence between the output from the sequence counter 126 and the image signals $VD_1$ to $VD_{512}$ at this time, when an output signal showing completion of the output correspondence is produced from the sequence decoder 128 at the time instant when the output of the image signal $VD_{512}$ of the 512th image element is completed, a reset signal CRE(-FIG. 12) to the sequence counter 126, and a count-up signal to the mode control counter 52 are applied from the data take-in controller 130 based on this completion signal output through the counter controller 136 and the mode counter controller 54, respectively, whereby the sequence mode shifts to C2. By the above-described operations, invalid image signals accumulated in the line sensor 24 are discarded.

In the sequence mode C2, the timer circuit 124 commences its operation to perform counting of time in accordance with an output from the light measurement circuit 122 representing brightness of the object in a time instant of between 0 and about 100 m sec. This timing is set short when the object is bright, and long is the object is dark. As soon as the timer circuit 124 terminates the timing, a time counting completion signal output is produced from the timer circuit 124 to the mode counter controller 54, and an output of the mode control counter 52 is changed over to the control signal representing the sequence mode C3 by a signal from the mode counter controller 54 at this time. As already stated in the foregoing, the integration time in the line sensor 24 is determined in accordance with a time of this sequence mode C2.

In the sequence mode C3, the clock pulse CK of 400 KHz is again output from the sequence controller 58 for the line sensor, which is applied to the sensor driver 60, the counter controller 136, and the data take-in controller 130. Subsequently, after lapse of a certain definite time, the start pulse ST is output and applied to the sequence counter 126 as the count starting pulse through the counter controller 136, and, at the same time, to the sensor driver 60 as the image output instruction signal to the line sensor 24, as is the case with the previous sequence mode C1. In this sequence mode C3, however, the image signals $VD_1$ to $VD_{512}$ output from the line sensor 24 is quantized by the two-value circuit 64, after which the two-value signal to the standard sight P and the two-value signal to the reference sight Q are taken into and memorized in the shift register 66 and the shift registers 68 and 70, respectively. Also, in this sequence mode C3, there are performed a detection as to the state of the two-value of the two-value signal corresponding to the standard sight P by the two-value state detection circuit 102, i.e., whether the signals are totally "0" or "1", and a determination of the threshold level SH to be the basis for quantizing the image signals in the subsequent operating cycle, by the peak detection circuit 116 and the threshold level setting circuit 118.

More detailed explanations will be given hereinbelow as to the sequence mode C3. In this sequence mode C3, valid image signal outputs are produced from the line sensor 24. The output timings of the image signals $VD_1$ to $VD_{512}$ at this time are in a corresponding relationship with the counted outputs of the sequence counter 126. As will be understandable from the explanations on FIG. 4, the image signals corresponding to the standard sight P among the image signals $VD_1$ to $VD_{512}$ to be output from the line sensor 24 are the image signals $VD_{107}$ to $VD_{170}$, while the image signals corresponding to the reference sight Q are the image signals $VD_{303}$ to $VD_{446}$. Therefore, in order that the two-value signals corresponding to the standard sight P may be taken into the shift register 66 to be stored therein, and that the two-value signals corresponding to the reference sight Q may be taken into the shift registers 68 and 70 to be stored therein, the clock pulse for the data take-in can be applied to the shift register 66 while the image signals $VD_{107}$ to $VD_{170}$ corresponding to the standard sight P are being output from the line sensor 24, and then the clock pulse for the data take-in can be applied to the shift registers 68 and 70 while the image signals $VD_{303}$ to $VD_{446}$ corresponding to the reference sight Q are being output. In other words, the shift registers 66 and 68 are the circulating type 64-bit serial shift registers, and the shift register 70 is the 80-bit serial shift register. Accordingly, by application of the 64 clock pulses for the data take-in to the shift register 66, while the image signals $VD_{107}$ to $VD_{170}$ are being output from the line sensor 24, and by application of 144 clock pulses for the data take-in to the shift registers 68 and 70, while the image signals $VD_{303}$ to $VD_{446}$ are being output, the two-value signals corresponding to the standard sight P and the two-value signals corresponding to the reference sight Q are taken into the shift register 66 and the shift registers 68 and 70, respectively. On account of this, the data take-in controller 130 detects the timing for commencement and termination of the output image signals $VD_{107}$ to $VD_{170}$ corresponding to the standard sight P, and the timing for commencement and termination of the output image signals $VD_{303}$ to $VD_{446}$ corresponding to the reference sight Q on the basis of the output from the sequence decoder 128 which decodes out the counted output of the sequence counter 126. Based on this detection results, the clock pulses for the data take-in which is capable of extracting the two-value signal outputs from the two-value circuit 64 with a timing factor are applied to the shift registers 66, 68 and 70. It goes without saying that this clock pulse is one which is synchronized with the clock pulse of 400 KHz.

As stated in the foregoing, in the sequence mode C3, the two-value signals of the 64 image elements of the standard sight P are taken into the shift register 66 and stored therein, and the two-value signals of the 144 image elements of the reference sight Q are taken in and stored therein.

Incidentally, when the two-value signals corresponding to the standard sight P is to be taken into the shift register 66, there is performed by the two-value state detection circuit 102 as to whether the two-value signals corresponding to this standard sight P are all in the level "0" or "1". For this purpose, the data take-in controller 130 applies, on the basis of the output from the sequence decoder 128, a gate-on signal to the two-value state detection circuit 102, while the image signals $VD_{107}$ to $VD_{170}$ corresponding to the standard sight P is being output from the line sensor 24. By this signal application, the two-value state detection circuit 102 is caused to take thereinto the two-value signals corresponding to the standard sight P out of the outputs from the two-value circuit 64, and to perform detection of the state of the two-value, i.e., whether the values are totally "0" or "1". The result of the detection is stored in the two-value state detection circuit 102 for evaluation in the sequence mode C5.

Further, in this sequence mode C3, when the image signals are to be read out of the line sensor 24, there is also performed determination of the threshold level SH to be the standard for quantization of the image signals in the subsequent operating cycle by means of the peak detection circuit 116 and the threshold level setting circuit 118, based on the peak values of the image signals $VD_{107}$ to $VD_{170}$ corresponding to the standard sight P. For this purpose, the data take-in controller 130, at the time of reading of the image signals $VD_1$ to $VD_{512}$ from the line sensor 24 based on the output from the sequence decoder 128, is caused to clear the peak value detected at the time of reading of the image signals from the line sensor 24 during the previous operating cycle by applying the clear signal to the peak detection circuit 116 while the output image signal $VD_{106}$ of the 106th image element is produced after the start pulse ST is applied to the line sensor 24. Subsequently, this data take-in controller 130 is caused to take thereinto the image signals corresponding to the standard sight P out of the outputs from the image signal processing circuit 62 by application of the gate-on signal while the output image signals $VD_{107}$ to $VD_{170}$ corresponding to the standard sight P are being produced, thereby performing detection of the peak value. At this time, there is produced from the threshold level setting circuit 118 an output voltage resulted from multiplication of the peak value detected by the peak detection circuit 116 with a predetermined number which is smaller than 1, e.g., 0.8, as the threshold level SH to be the base for quantization of the image signals. As soon as the entire image signals are completely read out of the line sensor 24, the data take-in controller 130 applied the sample and hold signal to the sample and hold circuit 120 to store therein the output from the threshold level setting circuit 118 at this time instant. The output from this sample and hold circuit 120 at this instance is applied to the two-value circuit 64 to be utilized as the threshold level SH for quantization of the image signal from the line sensor 24 in the subsequent operating cycle.

In the abovementioned manner, when the processing of the image signal outputs for the 512 image elements from the line sensor 24 is terminated, a control signal is imparted to the mode counter controller 54 from the data take-in controller 130 so as to step-forward the mode control counter 52, and, at the same time, a control signal is imparted to the counter controller 136 to reset the sequence counter 126. By such operations, the output from the mode control counter 52 is changed to a signal representing the sequence mode C4, whereby the sequence mode is shifted to C4.

In the sequence mode C4, the clock pulse of 50 KHz is imparted to the sequence counter 126 from the counter controller 136. On account of this, the sequence counter 126 starts counting of this clock pulse. In this case, the counting period of the sequence counter 126 from 0 to 63 is detected by the sequence decoder 128, and, during this period, the shift registers 66 and 68 are brought to the circulating mode to circulate the data through the data processing controller 132. At the same time, 64 shift clock pulses are imparted to the shift registers 66 and 68 from the data processing controller 132, whereby the data of each of the 64 bits in both shift registers 66 and 68 are sequentially output and circulated. Each output of these shift registers 66 and 68 at this time is compared in the exclusive "nor" logic circuit 72, and an output level "1" is produced, if the contents of both outputs are same, and an output level "0" is produced, if the contents of both outputs are different. The output from the logic circuit 72 is taken for a logic product with the pulse signal from the data processing controller 132 in the gate circuit 74, and is applied to the coincided bit counter 76 as the countable pulse signal. Accordingly, during one circulation of the date of both shift registers 66 and 68, the coincided bit counter 76 counts up when there is found a coincided bit in the 64 sets of data for each bit corresponding to both shift registers 66 and 68, whereby the coincided bit numbers remain finally in the coincided bit counter 76. The output from this coincided bit counter 76 is applied to the input B of the operational circuit 80 through the data controller 82 and the data selector 92, and, at the same time, is introduced as an input to the latch circuit 78. On the other hand, the output from the latch circuit 78 is introduced as the input into the input A of the operational circuit 80 through the data selector 90. At this time, the data controller 82, and the data selectors 90 and 92 should be properly controlled to control the flow of the data as mentioned above, which can be performed by the output from the mode control counter 52. On the other hand, in the operational circuit 80, the inputs A and B are compared, and when a relationship of the input B is equal to or larger than the input A (B=A), i.e., in case the output of the coincided bit counter 76 is above the output from the latch circuit 78.

When the counting period from 0 to 63 in the sequence counter 126 is finished, the circulation instruction from the data processing controller 132 to the shift registers 66 and 68 is released, and the supply of the shift clock pulse is also stopped. In this state, a single pulse output is produced to the gate circuit 114 from the data processing control 132, and a latch pulse is applied to the latch circuit 78 from the gate circuit 114, only when the "1" signal output is produced from the operational circuit 80, whereby the latch circuit 78 latches the output from the coincided bit counter 76 at this time instant. On the other hand, the latch pulse output from the abovementioned gate circuit 114 at this time is also applied to the latch circuit 86, whereby this latch circuit latches the output at this time instant. Incidentally, at the initial stage, the contents of the latch circuit 78 and the shift quantity counter 84 are both at "0" level.

Next, a pulse output is produced from the data processing controller 132 to the shift registers 68 and 70 so as to shift the content thereof for one bit. As the result, the contents of the shift registers 68 and 70 are shifted for one image element, and the data to be stored in the shift register 68 becomes the data for 64 bits which have been shifted for one bit out of the data for 144 bits in the reference sight Q with respect to the data for 64 bits in the standard sight P. At the same time, counted pulses are applied to the shift quantity counter 84 from the data processing controller 132, whereby the counter 84 counts up one pulse. The counting by this counter 84 at this time corresponds to the shift bit quantity of the contents of the shift registers 68 and 70.

After the abovementioned operations, the reset pulse outputs are produced to the coincided bit counter 76 and the sequence counter 126 from the data processing controller 132, whereby both counters 76 and 126 are reset, and the sequence counter 126 thereafter resumes its counting from "0". Thereafter, the exactly same operations are carried out in relation to various processings during the period of the sequence counter 126 counting from 0 to 63, and the period subsequent thereto. When these operations are completed, the sequence counter 124 and the coincided bit counter 76 are again reset and the same operations will thereafter be repeated.

FIG. 14 shows time charts of the principal control signals necessary for carrying the abovementioned operations. FIG. 14(A) shows the sequence control signal representing the sequence mode C4, which is output from the mode control counter 52; FIG. 14(B) shows the control signal output to be produced from the data processing controller 132 to establish the shift registers 66 and 68 into the circulating mode during counting of the sequence counter 126 from 0 to 63; FIG. 14(C) indicates 64 shift clock pulses to be output from the data processing controller 132 to subject the contents of the shift registers 66 and 68 to one circulation; FIG. 14(D) shows the pulses to be applied to the gate circuit 114 from the data processing controller 132 so as to apply the latching pulses to the latch circuits 78 and 86 based on the state of the output from the operational circuit 80; FIG. 14(E) shows the output pulses produced from the data processing controller 132 to perform the bit shift of the contents to the shift registers 68 and 70 and to perform one count up to the shift quantity counter 84; and FIG. 14(F) shows the output pulses produced from the data processing controller 132 to reset the sequence counter 126 and the coincided bit counter 76.

As is apparent from FIG. 14, in this sequence mode C4, the counting of the coincided bit numbers based on the correspondence and comparison of the contents of the shift registers 66 and 68 is performed by the counter 76 on the basis of the output from the sequence counter 126, and this coincided bit numbers are compared by the operational circuit 80 with the coincided bit numbers obtained from the previously carried out correspondence and comparison. By this comparison, when it is determined that the new coincided bit numbers are greater then the previous ones, the data in the latch circuit 78 are rewritten into the new coincided bit numbers, and, at the same time, the contents of the shift quantity counter 84 are latched by the latch circuit 86. Thereafter, the contents of the shift registers 68 and 70 are shifted by one bit, and the shift quantity counter 84 is counted up by one pulse, followed by resetting of the coincided bit counter 76 and the sequence counter 126 to re-enter into the correspondence and comparison of the contents of the shift registers 66 and 68. Through the abovementioned operations, the output from the shift quantity counter 84 denotes the bit number of the data transferred from the shift register 70 to the shift register 68. However, after the counting of "80" by this shift quantity counter 84, i.e., after the last 64 data of the 144 data in the reference sight Q (i.e., from 81 to 144th image elements) are stored in the shift register 68, and, in this state, the correspondence and comparison of the contents of the shift registers 66 and 68 and evaluation of the results of such correspondence and comparison are performed, followed by further counting of "81" by the counter 84, it becomes necessary that the operations after this counting be ceased. For this purpose, the system is so constructed that, when the count output from the shift quantity counter 84 is detected by the mode counter controller 54 and the counting by the counter 84 reaches "81", a signal as shown in FIG. 14(g) is applied to the mode control counter from the mode counter controller 54, thereby changing the output from the mode control counter 52 to a signal representing the sequence mode C5 so that the system may enter in the sequence mode C5. In this instance, the sequence counter 126 is also reset by the control signal from the counter controller 136.

As will be understandable from the above description, in this sequence mode C4, there finally remain in the latch circuits 78 and 86 the maximum value of the count output of the coincided bit counter 76, i.e., the maximum coincided bit numbers, and the count output from the shift quantity counter 84 when the maximum coincided bit numbers are obtained, i.e., the shifting quantity of the contents of the shift registers 68 and 70 until the maximum coincided bit numbers are obtained (hereinafter referred to as "the shifting quantity at the maximum coincidence").

In the next sequence mode C5, the sequence counter 126 again starts its counting from "0". The signals to be obtained from the sequence decoder 128 at this time are converted into various signals for processing of the data obtained in the abovementioned sequence mode C4 in the data output controller 134. The detailed explanations of the sequence mode C5 will follow in the succeeding paragraphs.

In this sequence mode C5, there is first produced from the data controller 82 an output of a set value of the minimum permissible coincided number as established in the switch circuit of the data controller 82, e.g., "58", the set value being applied to the input B of the operational circuit 80 through the data selector 92. On the other hand, an output from the latch circuit 78 is applied to the input A of the operational circuit 80 through the data selector 90. In this case, controls of the data controller 82 and the data selectors 90 and 92 are effected by the control signals from the data output controller 134. By this setting, there is conducted comparison between the maximum coincided bit number as the output from the latch circuit 78 and the minimum permissible coincided numbers preset by the switch circuit in the data controller 82. As the result of the comparison, when the maximum coincided bit numbers are smaller than the minimum permissible coincided numbers, a signal output is produced from the operational circuit 80, and is stored in the output regulating circuit 104 by a pulse output from the data output controller 134. This stored signal in the output regulating circuit 104 when the maximum coincided bit numbers are smaller than the minimum permissible coincided number will hereinafter be called "the maximum coincided bit number small signal". Incidentally, such operation is to regulate a degree of the minimum permissible "match" (or "similarity") in determining the image portion in the reference sight Q which is regarded as being most corresponding to the image in the standard sight P to be coincided with the image in the standard sight P, as the result of the data processing in the sequence mode C4. The operation is extremely effective in detecting such a case wherein an image portion which is truly coincided with the image of the standard sight P cannot be found out at any position in the reference sight Q due to mixing of noises, etc., for example, according to which an erroneous output due to erroneous focus detection can be prevented beforehand. In this embodiment, "58" has been set as the minimum permissible coincided number. Such number can be arbitrarily selected within a range of "64" or below (i.e., the number of image element contained in the standard sight P) in accordance with the degree of the minimum required "match". The nearer the numeral is to "64", the higher becomes the degree of the minimum required "match". In the practical aspect, however, when considering the noises, etc. in the circuit, the coincidence of the set value with the number of the image element contained in the standard sight P is not realistic. Generally speaking, setting of the number corresponding to, for example, about 90% of the number of the image element contained in the standard sight P will be practical.

Upon completion of the abovementioned operations, an output from the latch circuit 88 is applied to the input B of the operational circuit 80 from the data selector 92, and, also, an output from the latch circuit 86 is applied to the input A of the operational circuit 80 from the data selector. On the other hand, a set value for a permissible difference, e.g., "8" is produced as an output from the switch register 94. In this case, controls of these data selectors 90 and 92 and the switch register 94 are effected by signals from the data output controller 134. By this setting, there is operated in the operational circuit 80 a difference between the shift quantity at the time of the maximum coincidence (stored in the latch circuit 86 in the current operating cycle and the shift quantity at the time of the maximum coincidence (stored in the latch circuit 88) in the previous operating cycle. The thus obtained difference data is introduced as an input into the digital comparator 96 together with the set value "8" for the permissible difference as an output from the switch register 94. When the difference as operated in the operational circuit 80 is greater than the permissible difference "8", a signal output is produced from the digital comparator 96. The output signal from the digital comparator 96 at this time is stored in the output regulating circuit 104 by the pulse output from the data output controller 134. The stored signal in the output regulating circuit 104, when the shift quantity at the time of the maximum coincidence obtained in the current operating cycle is apart from the shift quantity at the time of the maximum coincidence obtained in the previous operating cycle for more than the permissible difference, is called "a large signal of the difference". Incidentally, this operation is effective in preventing extreme instability of the focus detection signal from taking place due to random erroneous focus detecting operation by noises, etc. which sporadically generate when the normal focus detection operation is being performed.

Upon completion of the abovementioned operations, there is produced from the data controller 82 an output of the set value of the bit numbers (in this specification, this bit number is called "the central bit number", provided that the position indicated by B in FIGS. 3 and 4 is chosen as the position for the particular 64 image elements, i.e., $(144-64)/2=40-"40"$) representing the position of the particular 64 image elements in the reference sight Q to be the standard in determining the just focus of the photo-taking lens L, which is established in the switch circuit in the data controller 82. This output is applied to the input B of the operational circuit 80 through the data selector 92, and, at the same time, an output from the latch circuit 86 is applied to the input A of the operational circuit through the data selector 90. In this case, controls of the data controller 82 and the data selectors 90 and 92 are effected by the control signals from the data output controller 134. By this setting, it becomes possible to know the focus adjustment state of the photo-taking lens L and a quantity of devitation with respect to the just focus position such that in which position the photo-taking lens L is with respect to the just focus position, the front focus, the rear focus, or the just focus. That is, assume that as shown in FIG. 15, the position of the 64 image elements containing the highest number of the coincided bits within the reference sight Q is found to be at a or b or c as the result of correspondence and comparison between the standard sight P and the reference sight Q in the sequence mode C4. At first, when the maximum coincided number is obtained in the state of a, the shift quantity therefor is JB. Therefore, if the central bit is taken as JB (="40"), the difference is "0", hence, in this case, the photo-taking lens L is at the just focus position. In contrast to this, when the maximum coincided number is obtained in the state b, the shift quantity therefor is RB which is smaller than the central bit JB (RB<JB). In this case, therefore, the photo-taking lens L can be said to be in the rear focus state by a=|JB−RB| with respect to the just focus position. Further, when the maximum coincided number is obtained in the state c, the shift quantity therefor is FB which is larger than the central bit JB (FB>JB). In this case, therefore, the photo-taking lens L can be said to be in the front focus state by b=|JB−FB|.

Now, the operational output from this operational circuit 80 is introduced as an input into the digital comparator 96, at which time a set value for a permissible variation, e.g., "2", selectively produced from the switch register 94 as an output is applied to the other input terminal of the digital comparator 96. The control of the switch register 94 in this case is effected by the control signal from the data output controller 134. By this setting, determination of magnitude between the quantity of deviation and the permissible variation ("2") with respect to the just focus position of the photo-taking lens L is effected in the digital comparator 96. When the devitation quantity is smaller than the permissible variation width ("2"), a signal output showing this face is produced from the digital comparator 96, and is further applied to the output regulating circuit 104. The abovementioned signal is stored in the output regulating circuit 104 by the pulse output of the data output controller 134, only when the photo-taking lens L is detected to be at the just focus position. The stored signal in the output regulating circuit 104 when the deviation quantity is smaller than the permissible variation width is called "the just focus lock signal". This operation is effective when such an instable state as the case wherein signals representing the front focus, rear focus and just focus are alternately produced as the outputs due to very fine variations, when the photo-taking lens L is detected to be at the just focus position, whereby the servo system can be prevented from its mincing reciprocating motions when such servo-control mechanism for the photo-taking lens L is included in the output means. In other words, when the just focus position is once detected, there can be produced thereafter the stable just focus detection output by causing the system not to respond to small variations of 1 to 2 bits, or so. Therefore, setting of the permissible variation width should be done properly taking into consideration the necessary stability and range finding precision.

In a certain time period during this sequence mode C5, the two-value state detection signal which has been stored in the abovementioned two-value state detection circuit 102 is taken into and stored in the output regulating circuit 104. This is done by the pulse output from the data output controller 134. At the termination of the abovementioned entire operations in the sequence mode C5, there are stored in the output regulating circuit 104 various signals as "the maximum coincided but number small signal", "difference large signal", "just focus lock signal", and "two-value improper signal". The output regulating circuit 104 produces an output regulating signal based on the logic summation condition of the abovementioned various stored signals, and applies these output signals to the gate circuit 112 connected to the latch pulse input terminal of the latch circuit 100.

On the other hand, the final operational output of the operational circuit 80 is applied to the just focus detection 98 where every state of the front focus, rear focus and just focus is detected on the basis of the output from the operational circuit 80, i.e., a signal representing magnitude of the shift quantity with respect to the central bit number. This detected signal is imparted to the latch circuit 100. At the same time, the deviation quantity to the photo-taking lens L with respect to the just focus position as operated by the operational circuit 80 is also applied to the latch circuit 100.

Subsequently, a latch instruction signal is imparted to the abovementioned latch circuit 100 from the data output controller 134 through the gate circuit 112. This latch instruction signal is applied to the latch circuit 100, only when the output regulating signal is not produced from the output regulating circuit 104, whereby the latch circuit 100 latches the output from the just focus detection circuit 98 and the deviation quantity output from the operational circuit 80.

Upon completion of the abovementioned operations, reset pulses are applied to the mode control counter 52 and the sequence counter 124 from the data output controller 134, whereby the sequence mode returns to C0.

On the other hand, the output from the latch circuit and the output from the output regulating circuit 104 are displayed on a light emitting diode (LED) or a indicator meter, or else, through the output indicating circuit 106. Also, those signals representing the front focus, rear focus and just focus as well as the deviation quantity signal from the latch circuit 100, and the output regulating signal from the output regulating circuit 104 are applied to the motor control circuit 108 as the control signals for controlling the servomotor 110 provided for carrying out the servo-control of the photo-taking lens L.

In the abovementioned motor control circuit 108, there are applied the control signals of forward rotation, reverse rotation and stoppage to the servo-motor 110 depending on the state of the signals for the front focus, rear focus and just focus as well as the output regulating signal.

When the signal processing system returns to the sequence mode C0, there is conducted again the detection of the state set by the control switch circuit 56, i.e., whether it is in the operating instruction or stoppage instruction. When the stoppage instruction is given, the mode control counter 52 stops in its state of producing the signal output representing the sequence mode C0. When the operating instruction is given, the system repeats again the same operations as mentioned above.

In the foregoing explanations of the operations, the sight for the 64 image elements have been secured as the standard sight P, although there takes place sometimes such a demand that the range finding sight be narrowed. Such demand takes place when the range finding object is extremely small and this should be clearly distinguished against the background. In the present embodiment, therefore, the system is a constructed that the data processing can be done with the narrowed standard sight P of "32 image elements" or "16 image elements" depending on necessity.

More concretely, the system is so constructed that the function of producing the output from the sequence decoder 128, i.e., the function of changing the peak detection instruction signal so as to carry out detection of the peak value by the peak detection circuit 116 only for a half (½) or a quarter (¼) sight portion in the standard sight P, when the output image signals are produced from the line sensor 24, and the function of limiting the output signal from the data output controller 134 which operates in accordance with the output from the sequence decoder 128 so as to neglect the results of correspondence and comparison carried out in other portions than a half (½) or a quarter (¼) portion of the standard sight P in performing the correspondence and comparison of the contents of the shift registers 66 and 68 may be obtained by changing over of the sight change-over switch circuit 138 in FIG. 11.

In the following, detailed explanations will be given for the construction of each circuit block in the circuit system shown in FIG. 11.

First of all, FIG. 16 shows a detailed construction of an analog circuit system for quantization of the image signals in the circuit system in FIG. 11. This analog circuit system consists of the peak detection circuit 116, the threshold level setting circuit 118, the sample and hold circuit 120, and the quantization circuit 64. In the illustration, a circuit consisting of buffer operational amplifiers $A_1$ and $A_2$, analog gates $G_1$ and $G_2$, a diode $D_1$ and a capacitor $C_1$ corresponds to the peak detection circuit 116. A voltage dividing circuit consisting of resistors $R_1$ and $R_2$ corresponds to the threshold level setting circuit 118, so that the threshold level SH here is determined by the voltage dividing ratio of the resistors $R_1$ and $R_2$. A circuit consisting of an analog gate $G_3$ and a capacitor $C_2$ corresponds to the abovementioned sample and hold circuit 120. The last circuit consisting of a comparator $CP_1$, a transistor $Tr_1$ and a resistor $R_3$ corresponds to the two-value or quantization circuit 64, in which the two-value output of the image signal is obtained from the collector side of the transistor $Tr_1$. A reference letter $IT_1$ designates an input terminal, to which an image signal output VD from the image signal processing circuit 62 in FIG. 11 is applied. The image signal output VD introduced as an input to the two-value circuit 64 through the input terminal $IT_1$ is applied to the operational amplifier $A_1$ and the comparator $CP_1$. $IT_2$ refers to an input terminal, to which a gate control signal (peak reset signal PRS) to the analog gate $G_1$ is applied. $IT_3$ designates an input terminal, to which a gate control signal (peak detection instruction signal PRDS) to the analog gate $G_2$ is applied. $IT_4$ denotes an input terminal, to which a gate control signal (sample and hold instruction signal SHS) to the analog gate $G_3$ is applied. Each of the gate control signals to be applied to each of these input terminals $IT_2$, $IT_3$ and $IT_4$ are produced as the output from the data take-in controller 130.

Figure 17:
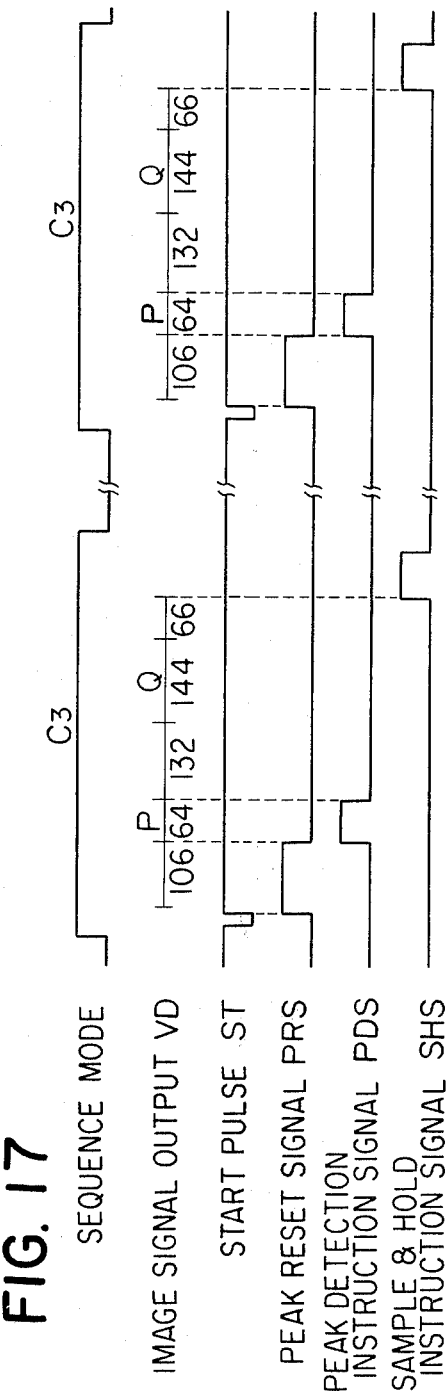
FIG. 17 shows timing relation of the control signals necessary for controlling analogue circuitry of FIG. 16.

In the following, the operations of the analog circuit system shown in FIG. 16 will be explained in reference to a timing chart in FIG. 17.

In the sequence mode C3, when the start pulse ST is applied to the line sensor 24 and reading of the valid image signal is commenced, the peak reset signal PRS which is applied to the input terminal $IT_2$ from the data take-in controller 130 assumes a high level until the image signal $VD_{106}$ of the 106th image element is read out after the start pulse ST output is produced, whereby the analog gate $G_1$ is turned on during this period, and the stored value of the capacitor $C_1$ is cleared. Next, reading of the image signals $VD_{107}$ to $VD_{107}$ of the 64 image elements corresponding to the standard sight P in the line sensor 24 is started, the peak detection instruction signal PDS already applied to the input terminal $IT_3$ from the data take-in controller 130 assumes the high level during reading of the image signals $VD_{107}$ to $VD_{170}$ of the 64 image elements corresponding to this standard sight P, whereby the analog gate $G_2$ is turned on during this period, and the peak value of the output from the operational amplifier $A_1$ is stored in the capacitor $C_1$. That is, the capacitor $C_1$ used in this circuit is for storing the peak value. By the abovementioned operations, therefore, the peak value of the image signals $VD_{107}$ to $VD_{170}$ corresponding to the standard sight P is stored in the capacitor $C_1$. On the other hand, the output from the capacitor $C_1$ is applied to the voltage dividing circuit (i.e., the threshold level setting circuit 118) consisting of the resistors $R_1$ and $R_2$ through the buffer amplifier $A_2$. Accordingly, when the output from the operational amplifier $A_2$ is taken Vs, there emerges in the voltage dividing point of the resistors $R_1$ and $R_2$ a voltage represented by Vs. $R_2/(R_1+R_2)$. Accordingly, when $R_2/(R_1+R_2)=0.8$, for example, the threshold level to be the standard for quantization of the image signals becomes a value corresponding to 80% of the peak value of the image signals $VD_{107}$ to $VD_{170}$ corresponding to the standard sight P. Now, upon termination of the reading of the image signals from the line sensor 24 in this state, the sample and hold instruction signal SHS which has been applied to the input terminal $IT_4$ from the data take-in controller 130 assumes the high level during a predetermined time period, whereby the analog gate $G_3$ is turned on, and the output from the voltage dividing point of the resistors $R_1$ and $R_2$ is stored in the capacitor $C_2$. This stored signal in the capacitor $C_2$ is applied to the input (+) of the comparator $CP_1$ and is utilized as the threshold level SH for quantization of the image signals from the line sensor 24 in the subsequent operating cycle of the sequence mode C3.

In the sequence mode C3 of the subsequent operating cycle, when the image signal output from the image signal processing circuit 62 is applied to the (−) input of the comparator $CP_1$, it produces a low level signal for those image signals which is above the threshold level SH, and a light level signal for those below the threshold level SH. The outputs from this comparator $CP_1$ are applied to the base of the transistor $Tr_1$, the collector side of which produces an output signal of "0" for the image signals below the threshold level SH, and an output signal of "1" for the image signals above the threshold level SH. As the result, the two-value data of the image signals are obtained from the output terminal $OT_1$ connected to the collector side of the transistor $Tr_1$.

In the above explanations, when the sustaining voltage of the capacitor $C_2$ is higher than a potential at the voltage dividing point of the resistors $R_1$ and $R_2$, excessive electric charge in the capacitor $C_1$ is discharged through the resistor $R_2$. On the contrary, when the sustaining voltage of the capacitor $C_2$ is lower than the potential at the voltage dividing point of the resistors $R_1$ and $R_2$, the capacitor $C_2$ is charged for that shortage with the consequence that the analog gate $G_3$ is turned on, and the sustaining voltage of the capacitor $C_2$ is constantly coincided with the potential of the voltage dividing point of the resistors $R_1$ and $R_2$ at that time instant.

As is understandable from the foregoing explanations, in the system shown in FIG. 11, the threshold level SH for the quantization of the image signals is not determined at the initial operating cycle. Accordingly, at the time of reading of the valid image signals in the initial operating cycle (i.e., the sequence mode C2), the outputs from the above-mentioned two-value circuit 64 are all "1", and the inappropriate state for the quantization in this case is detected by the two-value state detection circuit 102, and, finally, in the sequence mode C5, the output control of the detected output is carried out by the output regulating signal from the output regulating circuit 104. More concretely, stoppage of the motor 110 is instructed to the motor control circuit 108 by the output regulating signal from the output regulating circuit 104 at this time, while stoppage instruction for the focus adjusting state of the photo-taking lens L, i.e., stoppage instruction of indication of the front focus, rear focus, and just focus states, is given to the display circuit 106, in place of which warning indication of impropriety of the focus detection is instructed.

Incidentally, the image signal processing circuit 62 in the circuit system in FIG. 11 is of a well known construction including an amplifying circuit to amplify the outputs from the line sensor 24, and a sample and hold circuit to sample and hold the output from the amplifying circuit on the basis of the drive clock to the line sensor 24, hence no detailed construction of this circuit is shown herein.

FIG. 18 shows the details of the light metering circuit 122 and the timer circuit 124. In the drawing, a circuit consisting of a light metering element PD and an operational amplifier $A_3$ corresponds to the abovementioned light metering circuit 122. The other circuit elements than the above, i.e., a circuit consisting of operational amplifiers $A_4$ and $A_5$, a comparator $CP_2$, resistors $R_4$ to $R_9$, diodes $D_2$ and $D_3$, a constant voltage source RG, integrating capacitors $C_3$ and $C_4$ and analog gates $G_4$ and $G_5$ corresponds to the timer circuit 124. In this timer circuit 124, the circuit portion consisting of the operational amplifiers $A_4$ and $A_5$, the resistors $R_7$ to $R_9$, the diode $D_3$, the integrating capacitor $C_4$ and the analog gate $G_5$ is an integration circuit having a constant integration time. This circuit is additionally provided for determining the upper limit of the integration time to be established in the line sensor 24, i.e., the limitation at the side of the long integration time. A reference symbol $IT_5$ designates an input terminal, to which a gate signal (a timer reset signal IRS) to the analog gates $G_4$ and $G_5$ is applied. The timer reset signal applied to an input terminal TRE is produced from the mode control counter 52.

Figure 19:
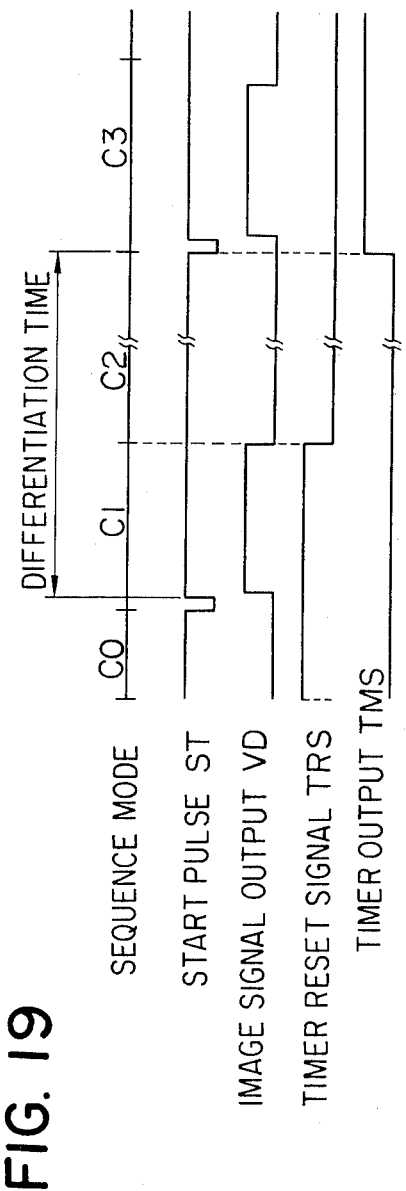
FIG. 19 shows timing relation of the control signals and timer output signals necessary for the control of analogue circuitry of FIG. 18.

In the following, the operations of this circuit system in FIG. 18 is explained in reference to the time chart shown in FIG. 19.

In the sequence modes C0 and C1 in every operating cycle, the timer reset signal TRS is at the high level and the analog gates $G_4$ and $G_5$ are maintained in the "on" state. During this period, therefore, the capacitors $C_3$ and $C_4$ are maintained in the cleared state. When the sequence mode C1 terminates and the sequence mode C2 follows, the timer reset signal TRS applied from the mode control counter 52 assumes the low level, and the analog gates $G_4$ and $G_5$ are turned off. On account of this, the capacitor $C_3$ starts integration of the output from the operational amplifier $A_4$. At this time, the capacitor $C_4$ is charged with a definite current determined by the resistor $R_9$ when the output voltage of the constant voltage source RG is taken as $V_{RG}$, i.e., a definite electric current represented by $V_{RG}/R_9$.

Now, when the capacitors $C_3$ and $C_4$ start the integration, and the charge voltage in one of the capacitors reaches a potential at the voltage dividing point of the resistors $R_5$ and $R_6$, i.e., $V_{RG} \cdot R_4/(R_4+R_5)$, the output from the comparator $CP_2$ at this time instant changes from the low level to the high level. The output from the comparator $CP_2$ at this time is applied to the mode counter controller 54 in FIG. 11 as the timer output TMS through the output terminal $OT_2$, and the mode counter controller 54 counts up the mode control counter 52 in response to the timer output TMS to shift the sequence mode from C2 to C3. As the result, the start pulse ST is applied to the line sensor 24 from the sensor driver 60 and reading of the valid image signals commences.

In the above-describe manner, the integration time at the line sensor 24 is controlled by the output timing of the timer output TMS at the total time of the sequence modes C2 and C3.

In the foregoing explanations of the operations, when the charged voltage of the capacitor $C_3$ reaches the potential $V_{RG} \cdot R_4/(R_4+R_5)$ at the voltage dividing point of the resistors $R_4$ and $R_5$ earlier than the charged voltage of the capacitor $C_4$, the integration time of the line sensor 24 is controlled on the basis of the light metering output. On the other hand, when the charged voltage of the capacitor $C_4$ reaches the potential $V_{RG} \cdot R_4/(R_4+R_5)$ at the voltage dividing point of the resistors $R_4$ and $R_5$ earlier than the charged voltage of the capacitor $C_3$, the integration time of the line sensor 24 is controlled to the longest integration time by the integration circuit having a definite integration time and consisting of the operational amplifiers $A_4$ and $A_5$, the resistors $R_5$ to $R_9$, the diode $D_3$, the capacitor $C_4$ and the analog gate $G_5$.

Figure 20A:
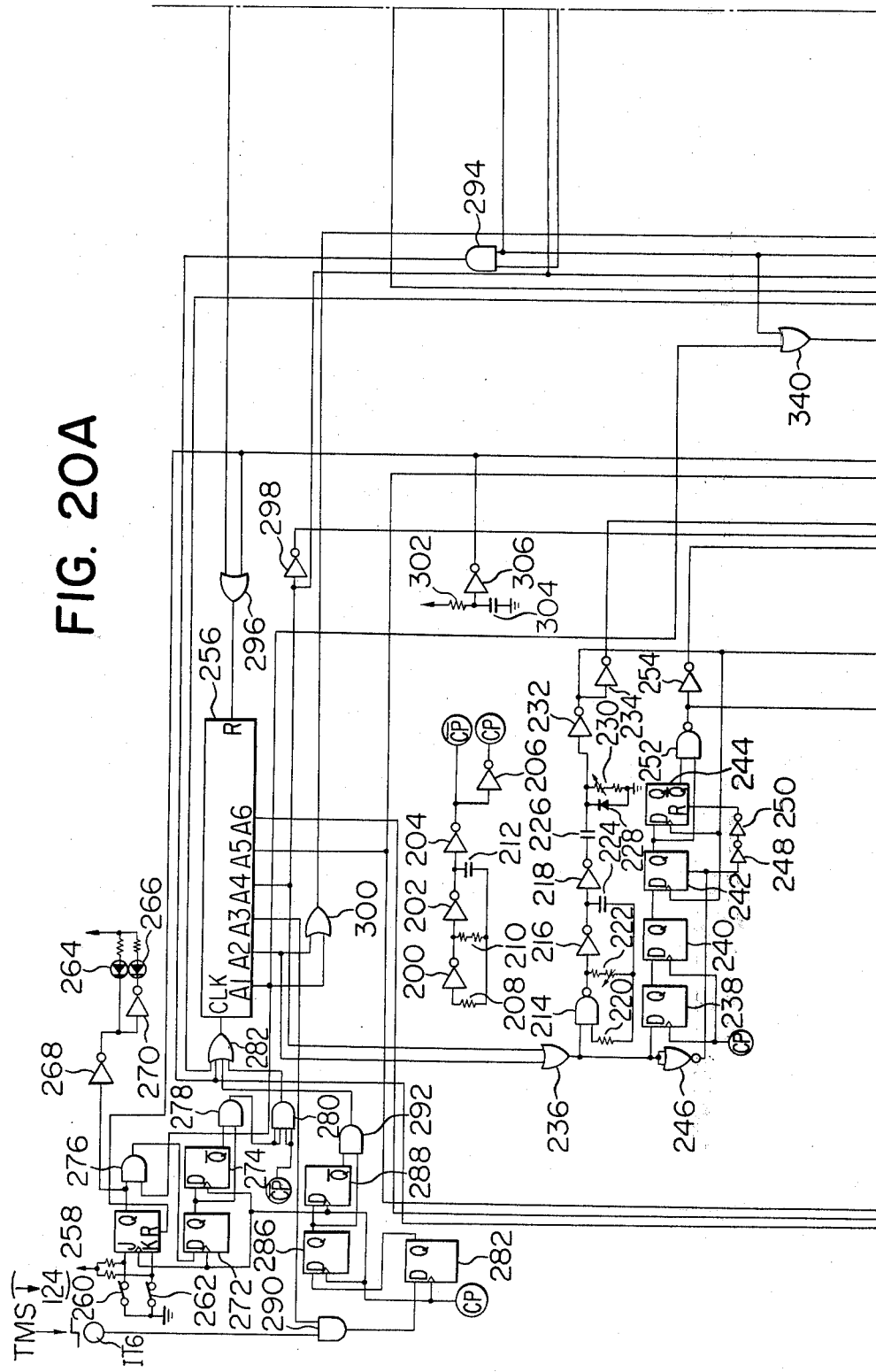
Figure 20B:
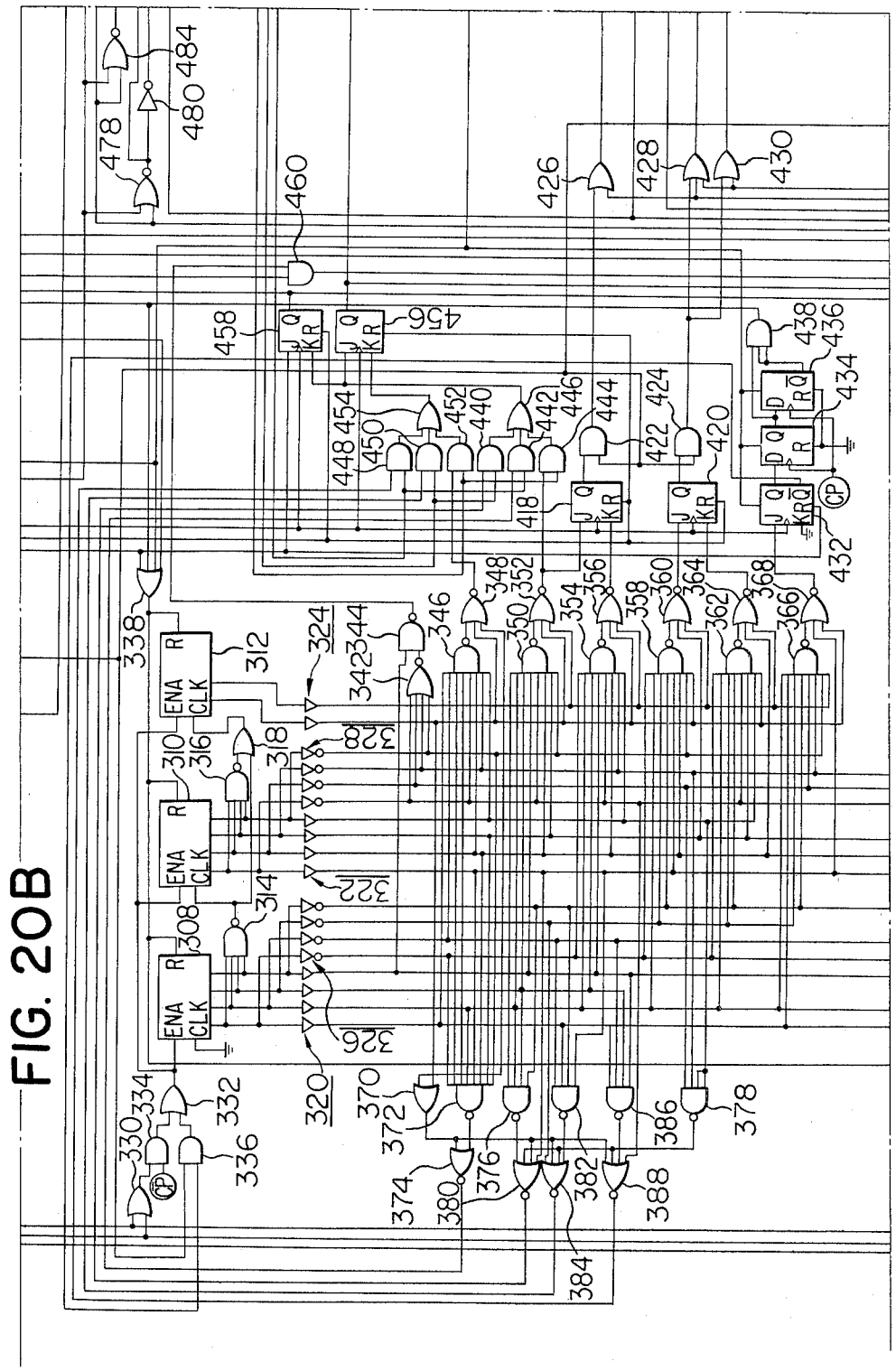
Figure 20E:
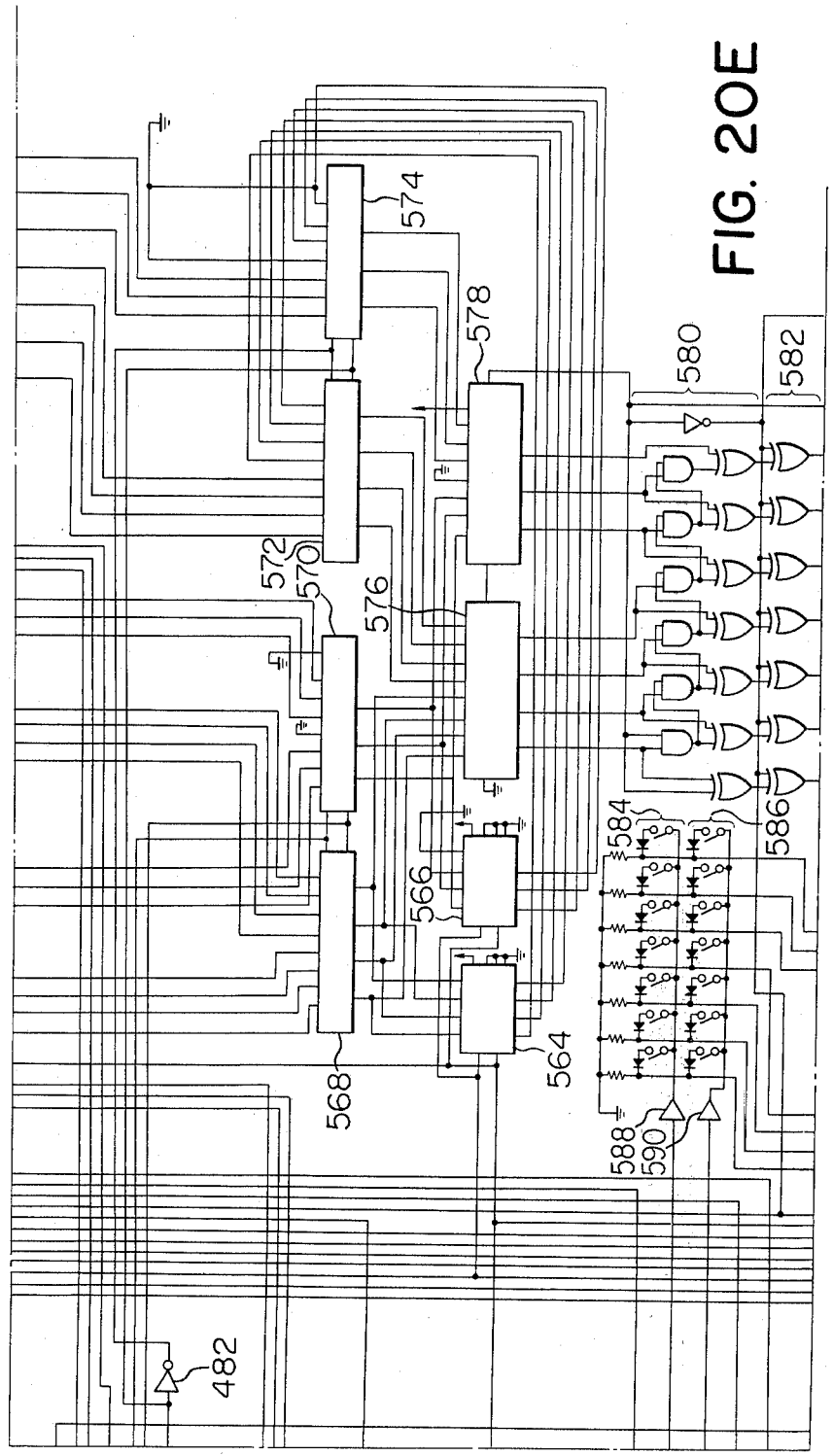

FIG. 20 shows a combination of FIGS. 20A to 20H illustrating the details of the digital circuit system shown in the circuit system of FIG. 11, wherein the left half (including FIGS. 20A to 20D) shows the details of the sequence control section, and the right half (including FIGS. 20E to 20H) shows the details of the data processing section.

Each portion of the circuit construction in FIGS. 20A to 20H will be explained as follows.

First of all, FIG. 20A shows the details of the mode control counter 52, the mode counter controller 54, control switch circuit 56 and the sequence controller 58 for the sensor for the circuit system shown in FIG. 11.

In the drawing, inverters 200, 202, 204 and 206, resistors 208 and 210, and a capacitor 212 construct a pulse generator which generates clock pulses CP and $\overline{CP}$ of 50 KHz. The clock pulses generated in this pulse generator are all applied to the circuit system in FIG. 11.

A "nand" circuit 214, inverters 216 and 218, resistors 220 and 222, and a capacitor 224 construct a pulse generator to generate a clock pulse of 400 KHz, the oscillation and stoppage of which are controlled by the input conditions of the "nand" circuit 214. The output pulse of the pulse generator is differentiated by a differentiation circuit consisting of a capacitor 226, a diode 228 and a resistor 230, shaped by inverters 232 and 234 for buffer, and is applied to the sensor driver 60 as the line sensor drive clock CK (FIGS. 12 and 13) through an output terminal $OT_3$(FIG. 20). A reference numeral 236 designates an "or" circuit to cause the pulse generator of 400 KHz to oscillate by applying an input to the "nand" circuit 241. The output from the "or" circuit 236 is applied to D-type flip-flops 242 and 244 which are operated with the clock pulse of 400 KHz, after it is delayed by D-type flip-flops 238 and 240. The flip-flops 242 and 244 are constantly in their reset condition by an output from a "nor" circuit which functions as an inverter. When the output is produced from the "or" circuit 236, the reset condition of the flip-flops 242 and 244 is released. Incidentally, the flip-flops 238 and 240 are inserted to produce a waiting time for rising of the pulse generator of 400 KHz. Reference numerals 248 and 250 are inverters for the buffer. 252 refers to a "nand" circuit to produce pulse outputs only during 1 clock out of the clock pulse of 400 KHz by receiving therein an output Q of the flip-flop 242 and an output $\overline{Q}$ of the flip-flop 244. The output of the "nand" circuit 252 is applied to the sensor driver 60 as the line sensor start pulse ST (shown in FIGS. 12 and 13) through the output terminal $OT_4$(shown in FIG. 20D). 254 designates an inverter to reverse the output from the "nand" circuit 252. The abovementioned group of circuits constitute the line sensor sequence controller 58 in FIG. 11.

The sensor driver 60 merely takes a construction of a buffer circuit for applying the clock pulse CK and the start pulse ST, which are applied thereto through the output $OT_3$ and $OT_4$(shown in FIG. 20D), to the line sensor 24 after the waveform shaping. Since this is the well known construction, the detailed constructions thereof will not be shown in the drawing.

A reference numeral 256 designates a counter which produces outputs in the sequence of A1 to A6 in accordance with the clock pulse applied to the clock input terminal CLK, the output of which returns to A1 by application of the reset pulse to the reset terminal R. This counter corresponds to the mode control counter 52 in FIG. 11, and the outputs of A1 to A6 respectively correspond to the sequence modes C0 to C5. An example of the counter 256 for use in the present invention, a counter manufactured and sold by RCA Co., U.S.A. (Model C-MOS CD4022) can be used.

A reference numeral 258 designates a J-K type flip-flop which is reset by temporarily opening a constantly closed type start switch 260, and is set by temporarily opening a constantly closed type stop switch 262. These start switches constitute the control switch circuit 56 in FIG. 11, and the output Q of the flip-flop 258 is utilized as the control signal for shifting the sequence mode from C0 to C1.

Although not shown in the circuit system in FIG. 11, a reference numeral 264 designates a light emitting diode to indicate that the circuit system is in operation. The display is done by the light emitting diode 264 being turned on by a signal from a buffer driver (inverter) 268, when the flip-flop 258 is set. Also, a reference numeral 266 designates another light emitting diode to indicate that the circuit system is in stoppage. The display is done by the light emitting diode 266 being turned on by a signal from a buffer driver (inverter) 270.

D-type flip-flops 272, 274 and "and" gates 276 and 278 constitute the pulse output circuit which produces a pulse signal during 1 clock in the sequence mode C0, when the flip-flop 258 is set. This pulse output circuit detects by the "and" circuit 276, in particular, and, by producing 1 pulse output, causes the counter 256 to be counted up by one from A1 to A2 through the "and" circuit 280 and the "or" circuit 282, to which the clock pulse CP is applied, to thereby shift the sequence mode from C0 to C1.

D-type flip-flops 284, 286, 288 and "and" circuits 290 and 292 constitute the pulse output circuit to produce a pulse signal output during 1 clock in response to the timer output TMS (FIG. 19) from the timer circuit 124 (FIG. 18) which is applied through an input terminal $IT_6$. The pulse signal from the pulse output circuit is applied to the counter 256 through the "or" circuit 282, whereby the counter 256 is counted up by one pulse from A3 to A4, and the sequence mode is shifted from C2 to C3.

"And" circuit 294 is to regulate the condition for counting up the counter 256 by one pulse from A5 to A6 (i.e., to shift the sequence mode from C4 to C5), and the "or" circuit 296 is to regulate the condition to reset the counter 256.

By the abovementioned group of circuits, the mode counter controller 54 shown in FIG. 11 is constructed.

Incidentally, a reference numeral 298 designates an inverter for reversing the A4 output of the counter 256, and 300 refers to an "or" circuit to receive therein the A1 and A2 outputs of the counter 256. The output from the "or" circuit 300 is applied to the timer circuit 124 (FIG. 18) as the timer reset signal TRS (FIG. 19) through the output terminal $OT_5$ (FIG. 20D). A resistor 302, a capacitor 304 and an inverter 306 constitute a power-up clear circuit which produces a power-up clear signal output by turning on of the power source. At the time of turning on of the power source, the flip-flop 258 and the counter 256 are reset by a power-up clear signal from the inverter 306.

FIG. 20B shows the details of the sequence counter 126 and the counter controller 136 of the circuit system shown in FIG. 11. In the drawing, reference numerals 308, 310 and 312 designate synchronous counters to be utilized as the 10-stage synchronous counters through "nand" circuits 314 and 316, and an "or" circuit 318. These circuit components constitute the sequence counter 126 in FIG. 11, and each output from the 10-stage is applied to the sequence decoder 128 (details of which will be explained in reference to FIG. 20C) through buffers 320 322 and 324, or inverter buffers 326 and 328, and is utilized in the sequence decoder 128 for producing required sequence control signals. Each of the counters 308, 310 and 312 is so connected that a count pulse may be applied to an 'enable' terminal ENA thereof, and a reset pulse may be applied to a reset terminal R thereof. A clock input terminal CLK thereof is utilized for changing over the counting conditions. One example of these counters 308, 310 and 312 is a counter manufactured and sold by RCA Co., U.S.A. designated by a model C-MOS CD4520.

"Or" circuits 330, 332 and "and" circuits 334, 336 constitute the logic circuit for count control of the above-mentioned counters 308, 310 and 312, and "or" circuit 338 constitute, together with an "or" circuit 340 in FIG. 20A, a logic circuit for reset control of the counters 308, 310 and 312. These circuit groups constitute the counter controller 136 in FIG. 11.

The abovementioned counters 308, 310 and 312, at the time of turning on of the power source, are reset by application of the power-up clear signal from the inverter 306 shown in FIG. 20A through the "or" gate 338.

Next, FIG. 20C shows the details of the sequence decoder 128 of the circuit system in FIG. 11.

In the drawing, a "nor" circuit 342 and a "nand" circuit 344 constitute a logic circuit for obtaining a high level signal during counting of "0" to "7" by the counters 308, 310 and 312. An output from the "nand" circuit 344 is utilized for obtaining a sample and hold instruction signal SHS (FIG. 17) to the abovementioned sample and hold circuit 120 (FIG. 16). A "nand" circuit 346 and a "nor" circuit 348 constitute a logic circuit for obtaining the 173rd count output of the counters 308, 310 and 312. An output from the "nor" circuit 348 is utilized in the sequence mode C3 for regulating the timing for termination of the data take-in for the 64 image elements corresponding to the standard sight P. A "nand" circuit 350 and a "nor" circuit 352 constitute a logic circuit for obtaining 110th count output of the counters 308, 310 and 312. An output from the "nor" circuit 352 is utilized in the sequence mode C3 for regulating the timing for starting of the data take-in for the 64 image elements corresponding to the standard sight P. A "nand" circuit 354 and a "nor" circuit 356 constitute a logic circuit for obtaining 174th count output of the counters 308, 310 and 312. An output from the "nor" circuit 356 is utilized in the sequence mode C3 for regulating the timing for terminating the data take-in to the shift register 66. A "nand" circuit 358 and a "nor" circuit 360 constitute a logic circuit for obtaining 306th count output of the counters 308, 310 and 312. An output from the "nor" circuit 360 is utilized in the sequence mode C3 for regulating the timing for starting the data take-in to the shift registers 68 and 70 shown in FIG. 11. A "nand" circuit 362 and a "nor" circuit 364 constitute a logic circuit for obtaining the 450th count output of the counters 308, 310 and 312. An output from the "nor" circuit 364 is utilized in the sequence mode C3 for regulating the timing for terminating the data take-in to the shift register 68. A "nand" circuit 366 and a "nor" circuit 368 constitute a logic circuit for obtaining the 515th count output of the counters 308, 310 and 312. An output from the "nor" circuit 368 is utilized in the sequence mode C3 for regulating the timing for termination of the output take-in from the line sensor 24. A "or" circuit 370, a "nand" circuit 372 and a "nor" circuit 374 constitute a logic circuit for obtaining the 126th count output of the counters 308, 310 and 312. An output from the "nor" circuit 374 is utilized in the sequence mode C3 for regulating the timing for commencing the data take-in for the 32 image elements corresponding to the standard sight P, when the number of the image elements to be set in the standard sight P is changed over to ½, i.e., 32 image elements. "Nand" circuits 376, 378 and a "nor" circuit 380 constitute a logic circuit for obtaining the 134th count output of the counters 308, 310 and 312 together with the abovementioned "or" circuit 370. An output from the "nor" circuit 380 is utilized in the sequence mode C3 for regulating the timing for starting the data take-in for 16 image elements corresponding to the standard sight P, when the number of the image element to be set in the standard sight P is changed over to ¼, i.e., 16 image elements. A "nand" circuit 382 and a "nor" circuit 384 constitute a logic circuit for obtaining the 149th count output of the counters 308, 310 and 312 together with the "or" circuit 370 and the "nand" circuit 378. An output from the "nor" circuit 384 is utilized in the sequence mode C3 for regulating the timing for termination of the data take-in for the 32 image elements, when the number of the image element to be set in the standard sight P is changed over to 32 image elements. A "nand" circuit 386 and a "nor" circuit 388 constitute a logic circuit for obtaining the 157th count output of the counters 308, 310 and 312 together with the "or" circuit 370 and the "nand" circuit 378. An output from the "nor" circuit 388 is utilized in the sequence mode C3 to regulate the timing for termination of the data take-in for the 16 image elements, when the number of the image element to be set in the standard sight P is changed over to 16 image elements. "And" circuits 399, 392 and an "or" circuit 394 constitute the logic circuit for obtaining a high level signal during counting of "16" to "47" of the counters 308, 310 and 312. An output from the "or" circuit 394 is utilized in the sequence mode C4 to regulate the time in 32-bit at the time of reading out stored data in the shift register 66, when the number of image element to be set in the standard sight P is 32 image elements. (Incidentally, the output from the "or" circuit 394 is applied to the gate circuit 74 in FIG. 11). "And" circuits 396, 398 and an "or" circuit 400 constitute a logic circuit for obtaining a high level signal during counting of "24" to "39" of the counters 308, 310 and 312. An output from the "or" circuit 400 is utilized in the sequence mode C4 to regulate the time in 16-bit at the time of reading out the stored data in the shift register 66. (Incidentally, the output from the "or" circuit 400 is applied to the gate circuit 74 in FIG. 11.) An inverter 402 and an "and" circuit 404 constitute a logic circuit for obtaining, in the sequence mode C4 in particular, a high level signal during counting of "0" to "63" of the counters 308, 310 and 312. An output from the "and" circuit 404 is utilized in the sequence mode C4 to define the time in 64-bit at the time of reading out the stored data in the shift register 66. Incidentally, this "and" circuit 404 corresponds to the control signal for placing the abovementioned shift registers 66 and 68 in the circulating mode. An "and" circuit 406 is for obtaining the 64th count output of the counters 308, 310 and 312 in the sequence mode C4 in particular. An output from the "and" circuit 406 is used for obtaining the latch pulse to the latch circuits 78 and 86 shown in FIG. 14(D). An "and" circuit 408 is for obtaining the 65th count output of the counters 308, 310 and 312 in the sequence mode C4. An output from the "and" circuit 408 is utilized for obtaining pulses to carry out shifting of the contents of the shift registers 68, 70 for 1 bit, and counting up of the shift quantity counter 84. An inverter 410 and an "and" circuit 412 constitute a logic circuit for obtaining "0" count output of the counters 308, 310 and 312 in the sequence mode C5 in particular. An output from the "and" circuit 412 is utilized in the sequence mode C5 for obtaining a signal to produce a set value output about the minimum permissible coincided number (in this embodiment, it is "58") from the data controller 82 in FIG. 11 (the details of which will be explained later in reference to FIG. 20F). An "and" circuit 414 is for obtaining the 1st count output of the counters 308, 310 and 312 in the sequence mode C5 in particular. An output from the "and" circuit 414 is utilized in the sequence mode C5 as the control signal for producing from the switch register 94 (the details of which will be explained in reference to FIG. 20H) in FIG. 11 a set value output for the permissible difference to be the standard in detecting whether the difference between the data for the focus detection results detected between two subsequence two operating cycles is above a constant value, or not (in the present embodiment, it is "8"). An "and" circuit 416 is for obtaining the 2nd count output of the counters 308, 310 and 312 in the sequence mode C5 in particular. An output from this "and circuit 416 is utilized in the sequence mode C5 as the control signal for producing from the switch register 94 a set value output about the permissible variation width so as not to respond to small just focus position variations at the time of just focus detection (in the present embodiment, it is "2").

By the abovementioned group of circuits, the sequence decoder 128 in FIG. 11 is constructed.

In the following, details of the data take-in controller 130, the data processing controller 132 and the data output controller 134 of the circuit system in FIG. 11 will be explained in reference to FIG. 20D.

In the drawing, a J-K type flip-flop 418 is compulsorily reset in the sequence modes other than C3 by receiving in its reset terminal an output from the inverter 298 which has received the A4 output from the counter 256 in FIG. 20A. In the sequence mode C3, it is set in synchronism with the clock pulse of 400 KHz by receiving into its J-input an output from the "nor" circuit 352 in FIG. 20C, and is reset in synchronism with the clock pulse of 400 KHz by receiving into its K-input an output from the "nor" circuit 356 in FIG. 20C, the output Q of which assumes a high level during taking of the data for the 64 image elements corresponding to the standard sight P.

A J-K flip-flop 420 is compulsorily reset in the sequence modes other than C3 by receiving in its reset terminal an output from the inverter 298 in FIG. 20A. In the sequence mode C3, it is set in synchronism with the clock pulse of 400 KHz by receiving in its J-input an output from the "nor" circuit 360 in FIG. 20C, and is reset in synchronism with the clock pulse of 400 KHz by receiving in tis K-input an output from the "nor" circuit 364 in FIG. 20C, the output Q of which assumes a high level during taking of the data for the 144 image elements corresponding to the reference sight Q. The outputs Q of the flip-flops 418 and 420 are applied to "and" circuits 422, 424, respectively, with the clock pulse of 400 KHz as one input. From these "and" circuits 422, 424, respectively, with the clock pulse of 400 KHz as one input. From these "and" circuits 322, 424, the clock pulse of 400 KHz is produced as the outputs during the outputs Q of the flip-flops 418, 420 assuming the high level. The output from the "and" circuit 422 is applied to the shift register 66 as the drive clock pulse through the "or" circuit 426. Also, the output from the "and" circuit 424 is applied to the shift register 68 as the drive clock pulse through the "or" circuit 428, and is applied to the shift register 70 as the drive clock pulse therefor through an "or" circuit 430.

A J-K type flip-flop 432 receives an output from the inverter 254 in FIG. 20A in its reset terminal, and an output from the "nor" circuit 368 in FIG. 20C in its J-input. It is operated in synchronism with the clock pulse of 400 KHz by grounding its K-input, and is set at the termination of taking the image signal data from the line sensor 24.

D-type flip-flops 434, 436 and an "and" circuit 438 constitute the pulse output circuit to carry out pulse output during 1 clock of the clock pulse CP (50 KHz) by receiving therein the output Q from the flip-flop 432. An output pulse from this pulse output circuit is utilized as the pulse for resetting the counters 308, 310 and 312 in FIG. 20B, and for stepping forward of the counter 256 in FIG. 20A from the A4 output to A5 output (i.e., from the sequence mode C3 to C4). At the time of turning on of the power source, an output from the inverter 306 in FIG. 20 is applied to the flip-flops 432, 434, and 436 as the set signal.

"And" circuits 440, 442, 444 and an "or" circuit 446 constitute a logical circuit for defining the timing for starting the data take-in for the image elements corresponding to the standard sight P in the sequence mode C3. "And" circuits 448, 450, 452 and an "or" circuit 454 constitute a logical circuit for defining the timing for termination of the data take-in for the image element corresponding to the standard sight P in the sequence mode C3. Incidentally, these logical circuits function to change over the timings for commencement and termination of the data take-in for the image elements corresponding to the standard sight P in the sequence mode C3 in accordance with the image element numbers to be set in the standard sight P which can be changed over to 64 image elements, or 32 image elements, or 16 image elements by the sight change-over switch circuit 138 in FIG. 11 (the details of which will be explained in reference to FIG. 20E).

A J-K type flip-flop 456 is controlled in synchronism with the clock pulse of 400 KHz, the output Q of which assumes the high level in the sequence mode C3 during the data taken-in for the image elements corresponding to the standard sight P by receiving in its J-input an output from the "or" circuit 446, and in its K-input an output from the "or" circuit 454. Incidentally, the output Q of the flip-flop 456 is applied, as the two-value state detection instruction signal, to the two-value state detection circuit 102 in FIG. 11 (the details of which will be explained in FIG. 20E), and is applied to the peak detection circuit 116 (FIG. 16) as the peak detection instruction signal PDS (FIG. 17) through an output terminal $OT_6$.

A J-K type flip-flop 458 is controlled in synchronism with the clock pulse of 400 KHz, the output Q of which assumes the high level during a period until the image signal output corresponding to the standard sight P begins to produce, after the start pulse ST is applied to the line sensor 24, by receiving in its J-input an output from the inverter 254 in FIG. 20A, and in its K-input an output from the "or" circuit 446. Incidentally, the output Q of the flip-flop 458 is applied to the peak detection circuit 116 as the peak reset signal PRS (FIG. 17), and is also utilized, on the other hand, for resetting of the flip-flops for memorizing the detection results in the two-value state detection circuit 102. Incidentally, the abovementioned flip-flops 456, 458 are compulsorily brought into a reset condition in the sequence modes other than C3 by receiving in its reset terminal an output of the inverter 298 in FIG. 20A.

An "and" circuit 460 receives the A4 output of the counter 256 in FIG. 20A and the output from the "nand" circuit 344 in FIG. 20C, the output from which is applied in the sequence mode C3 to the sample and hold circuit 120 (FIG. 16) as the sample and hold instruction signal SHS (FIG. 17) through an output terminal $OT_8$.

By the abovementioned group of circuits, the data take-in controller 130 in FIG. 11 is constructed.

"And" circuit 462 produces an output pulse synchronized with the clock pulse $\overline{CP}$ (50 KHz) while the output from the "and" circuit 404 in FIG. 20C takes the high level. An output from this "and" circuit 462 is utilized in the sequence mode C4 as the clock pulse of 50 KHz (FIG. 14(C)) for one circulation of each content of the shift registers 66 and 68. An "and" circuit 464 produces a pulse output synchronized with the clock pulse $\overline{CP}$ while the output from the "and" circuit 406 in FIG. 20C assumes the high level. An output from this "and" circuit 464 is utilized for obtaining the latch pulse (FIG. 14(D)) to the latch circuit 78 in FIG. 11. Incidentally, the output from the "and" circuit 464 performs discrimination of a carry output from the operational circuit 80 (the details of which will be explained in FIGS. 20G and 20H) in the gate circuit 114 in FIG. 11, based on which result the carry output is applied to the latch circuit 78 as the latch pulse. An "and" circuit 466 produces a clock pulse output synchronized with the clock pulse $\overline{CP}$ while the output from the "and" circuit 408 in FIG. 20C takes the high level. An output from this "and" circuit 408 in FIG. 20C takes the high level. An output from this "and" circuit 466 is utilized as the pulse for effecting shifting for one bit of the contents of the shift registers 58, 70 shown in FIG. 14(E) and for effecting the count up of the counter 84. A D-type flip-flop 468 operates in synchronism with the clock pulse CP (50 KHz), and produces a pulse output during 1 clock of the clock pulse CP by receiving in its D-input the output from the "and" circuit 408 in FIG. 20C. The output Q from the flip-flop 468 is applied as a reset pulse to the counters 308, 310 and 312 in FIG. 20B through the "or" circuit 340 in FIG. 20A and the "or" circuit 338 in FIG. 20B, and is also applied as a reset pulse to the coincided bit counter 76 in FIG. 11. This corresponds to the control pulse shown in FIG. 14(F). Although not mentioned in the explanations for FIG. 11, the output Q of the flip-flop 468 is applied to the counter 256 in FIG. 20A by means of the "and" circuit 294 in FIG. 20A when the counted number by the shift quantity counter 84 in FIG. 11 reaches "81", whereby the counter 256 is counted up by one, and the output therefrom changes from A5 to A6. As the result, the sequence mode changes from C4 to C5. Accordingly, the output from the "and" circuit 294 at this time corresponds to the count up pulse shown in FIG. 14(G).

By the abovementioned group of circuits, the data processing controller 132 in FIG. 11 is constructed.

A reference numeral 470 designates an "and" circuit to produce an output pulse synchronised with the clock pulse CP while the output from the "and" circuit 412 in FIG. 20C takes the high level. 472 refers to an "and" circuit to produced a clock pulse output synchronous with the clock pulse $\overline{CP}$ while the output from the "and" circuit 414 in FIG. 20C takes the high level. 474 refers to an "and" circuit to produce a clock pulse output synchronous with the clock pulse $\overline{CP}$ while the output from the "and" circuit 416 in FIG. 20C takes the high level. Outputs from these "and" circuits 470, 472 and 474 are applied as storobing signals to the output regulating circuit 104 in FIG. 11 (the details of which will be explained in reference to FIG. 20H). A D-type flip-flop 476 operates in synchronism with the clock pulse CP, the output Q of which assumes the high level during 1 clock of the clock pulse CP by receiving in its D-input the output from the "and" circuit 416 in FIG. 20C. The output Q from this flip-flop 476 is utilized as the strobing signal to the latch circuits 88, 100 in FIG. 11 (the details of which will be explained in reference to FIGS. 20G and 20H, respectively) and as a reset signal to the counter 256 in FIG. 20A. A "nor" circuit 478 and an inverter 480 in FIG. 20B are for controlling the data selector 90 in FIG. 11 (the details of which will be explained in reference to FIG. 20G). An inverter 482 is for controlling the data selector 92 in FIG. 11 (the details of which will be explained in reference to FIG. 20G). Further, a "nor" circuit 484 is for driving the data controller 82 in FIG. 11 (the details of which will be explained in reference to FIG. 20F).

By the abovementioned group of circuits, the data output controller 134 in FIG. 11 is constructed.

Incidentally, the signal processing system in FIG. 11 is so constructed that the switch register 94 may be controller by the control signals from the data output controller 134. In this embodiment, however, this switch register 94 is controlled by an output signal from the sequence decoder 128 as has been explained in reference to FIG. 20C.

FIG. 20E shows the details of the shift registers 66, 68 and 70, the exclusive "nor" logical circuit 72, the gate circuit 74, the coincided bit number counter 76, the two-value state detection circuit 102 and the sight change-over switch circuit 138.

In the drawing, IT$_7$ refers to an input terminal, to which two-value data from the two-value circuit 64 (FIG. 16) are applied, and a reference numeral 486 designates a circulation type shift register of 64-bit construction, which corresponds to the shift register 66 in FIG. 11. A numeral 488 refers to a circulation type shift register of 64-bit construction same as above, which corresponds to the shift register 68 in FIG. 11. 490, 492 and 494 designate serial type shift registers of 8-bit, 8-bit and 64-bit constructions, respectively. They constitute the shift register 70 of 8-bit construction in FIG. 11 by their serial connection. For the shift registers 486, 488, 494 as well as the shift registers 490 and 492, there may be utilized as an example those shift registers of 64-bit and 8-bit constructions manufactured and sold by RCA Corp., U.S.A. under model numbers C-MOS CD4031 and C-MOS CD4014.

496 refers to an exclusive "nor" logical circuit which corresponds to the exclusive "nor" logical circuit 72 in FIG. 11. 498 refers to an "and" circuit which corresponds to the gate circuit 74 in FIG. 11. 500 designates a binary counter of 7-bit construction which corresponds to the coincided bit number counter 76 in FIG. 11. For the counter 500, there may be used as one example a binary counter manufactured and sold by RCA Corp., U.S.A. under a model C-MOS CD4024. 502 refers to an "or" circuit to apply a reset signal to the counter 500. The output Q from the flip-flop 468 in FIG. 20D is applied to the "or" circuit 502.

"And" circuits 504, 506 and 508, inverters 510, 512 and J-K flip-flops 514, 516 constitute a circuit for detecting "all 1" or "all 0" of the two-value data corresponding to the standard sight P out of the output data from the two-value circuit 64 which are applied thereto through the input terminal IT$_7$. The flip-flop 514 maintains its reset condition by the operation of the "and" circuit 504 without being set, when the two-value data corresponding to the standard sight P is "all 0". On the other hand, the flip-flop 516 maintains its reset state by the operation of the inverter 510 and "and" circuit 506 without being set, when the two-value data corresponding to the standard sight P is "all 1". On account of this, by taking the logic product ("and" logic) of the output Q from the flip-flops 514 and 516, it becomes possible to detect whether the two-value data corresponding to the standard sight P is "all 0" or "all 1". When the two-value data corresponding to the standard sight P is all "0" or all "1", the output from the inverter 512 becomes high. The abovementioned circuits correspond to the two-value state detection circuit 102 in FIG. 11. The abovementioned flip-flops 514 and 516 are operated, at the time of the data take-in, by the clock pulse (CLK) similar to the clock pulse for driving the shift registers 486 through 492, and are reset by the output Q of the flip-flop 458 in FIG. 20D.

518, 520 and 522 all designate constantly closed type switches. They constitute the sight change-over switch circuit 138 in FIG. 11, and the number of image elements to be set in the standard sight P can be changed over in three ways of 64, 32 and 16 by combination of the on-off operations of these switches 518, 520 and 522.

"And" circuits 524, 526 and 528 and an "or" circuit 530 constitute a logical circuit to define the output timing of the "and" circuit 498 in accordance with the image element number set by the switches 518, 520 and 522 and the outputs from the "and" circuit 404 and "or" circuits 394, 400 shown in FIG. 20C. This logical circuit is included in the abovementioned data processing controller 132. Incidentally, the abovementioned "and" circuit 498 is applied with the clock pulse CP of 50 KHz besides the output from the "or" circuit 530 and the exclusive "nor" logical circuit 496.

Next, FIG. 20F shows the details of the latch circuits 78, 86 the data controller 82 and the shift quantity counter 84 in the circuit system in FIG. 11.

In the drawing, 532 and 534 designate latch circuits of 4-bit construction to latch the output from the counter 500 in FIG. 20E. These latch circuits constitute the latch circuit 78 in FIG. 11. A reference numeral 536 designates a binary counter of 7-bit construction to count up pulses by an output pulse from the "and" circuit 466 in FIG. 20D. This binary counter corresponds to the shift quantity counter 84 in FIG. 11. Numerals 538 and 540 refer to latch circuits of 4-bit construction to latch the output from the counter 536. These latch circuits constitute the latch circuit 86 in FIG. 11. At the time of turning on of the power source, these latch circuits 538 and 540 are applied with the output from the inverter 306 in FIG. 20A as the reset signal. For the latch circuits 532, 534, 538 and 540, there can be used as one example a latch circuit of 4-bit construction manufactured and sold by RCA Corp., U.S.A. under a mode No. C-MOS CD4035. Also, for the counter 536, there can be used as one example a binary counter of 7-bit construction manufactured and sold by RCA Corp., U.S.A., under a model No. C-MOS CD4024. 542 refers to an "and" circuit for applying a latch pulse to each of the latch circuits 532, 534, 538 and 540. This "and" circuit corresponds to the gate circuit 114 in FIG. 11. By the latch pulse of the "and" circuit 542, the abovementioned latch circuits 532 and 534 latch the output from the counter 500, and the latch circuits 538 and 540 latch the output from the counter 536. Incidentally, the "and" circuit 542 is applied with the carry output from the operational circuit 80 (the details of which will be explained in reference to FIG. 20H), besides the output from the "and" circuit 464. Inverters 544, 546 and 548 and a "nor" circuit 550 constitute a logical circuit to detect "81" count of the counter 536. An output from this "nor" circuit 548 is applied to the "and" circuit 294 in FIG. 20A, which in turn applies a pulse to the counter 256 when the output Q of the flip-flop 468 in FIG. 20D takes the high level in the state of the output from the "nor" circuit being at the high level, thereby counting up by one pulse from the output A5 to A6 (i.e., from the sequence mode C4 to C5). 552 refers to a logical gate circuit which, on the basis of the output A5 of the counter 256 in FIG. 20A, permits the output data of the counter 500 in FIG. 20E to pass therethrough. 554 refers to a switch register which, in response to a signal from the driver 560 to receive therein the output from the "and" circuit 412 in FIG. 20C, produces data about the minimum permissible coincided number ("58") preset by combination of on-off operations of each switch. 556 designates a switch register which, in response to a signal from the driver 562 receiving therein the output from the "nor" circuit in FIG. 20B, produces data about the bit number (i.e., the central bit number) representing the position of particular 64 image elements within the reference sight Q to be the standard in determining the just focus of the photo-taking lens L, which are preset by combination of the on-off operations of each switch. 558 refers to a "nor" logical gate circuit to produce each output from the logical gate circuit 552 and the switch registers 554 and 556 under the "nor" condition, i.e., by supplemental number conversion. By the abovementioned group of circuits, the data controller 82 in FIG. 11 is constructed.

FIG. 20G shows the details of the latch circuit 88 and the data selectors 90 and 92 in the circuit system of FIG. 11.

In the drawing, 564 and 566 are both latch circuits of 4-bit construction, which constitute the latch circuit 88 in FIG. 11. For the latch circuits 564 and 566, there can be used, for example, a latch circuit of 4-bit construction manufactured and sold by RCA Corp., U.S.A. under a model No. C-MOS CD4031. At the time of turning on of the power source, these latch circuits 564 and 566 are applied with the output from the inverter 306 in FIG. 20A as the reset signal. 568 and 570 are both data selectors of 4-bit construction to select the output data from the latch circuits 532, 534 and the latch circuits 538, 540 in FIG. 20F. These selectors constitute the data selector 90 in FIG. 11. The selecting operations of the data selectors 568 and 570 are controlled by the outputs from the "nor" circuit 478 and the inverter 480 in FIG. 20B. 572 and 574 designate data selectors of 4-bit construction to select the data output from the "nor" logical gate circuit 558 and the latch circuits 564 and 566 in FIG. 20F. These data selectors constitute the data selector 92 in FIG. 11. The selecting operations of the data selectors 572 and 574 are controlled by the output from the inverter 482 in FIG. 20B and the "and" circuit 414 in FIG. 20C. For the data selectors 568 to 574, there may be used as one example a data selector of 4-bit construction manufactured and sold by RCA Corp., U.S.A. under a model No. C-MOS CD4019.

In the system shown in FIG. 11, the latch circuit 88 is so constructed that it may directly latch the output from the latch circuit 86. In this embodiment, however, the output from the latch circuit 86 (designated by 538 and 540 in FIG. 20F) selected by the data selector 90 (568, 570) is so made as to be latched in response to the output Q of the flip-flop 476 in FIG. 20D. 576 and 578 designate parallel adders of 4-bit construction for adding the outputs from the data selectors 568, 572 and the data selectors 570, 574, respectively. These adders 576 and 578 constitute the operational circuit 80 in FIG. 11 together with other circuits to be explained in reference to FIG. 20H. For these adders 576 and 578, there may be used as one example a 4-bit parallel adder manufactured and sold by RCS Corp., U.S.A. under a model No. C-MOS CD4008.

Finally, FIG. 20H shows the details of the operational circuit 80, the switch register 94, the digital comparator 96, the just focus detection circuit 98, the latch circuit 100, the output regulating circuit 104 and the display circuit 106 in the circuit system of FIG. 11.

In the drawing, a reference numeral 580 designates a logical circuit which functions as the addition circuit to add "1" to the output from the adders 576 and 578 when the carry signal output is produced from the adders 576 and 578 in FIG. 20G. This logical gate circuit 580 consists of six "and" circuits, seven exclusive "or" circuits, and one inverter, as shown in the drawing. 582 designates a logical gate circuit to reverse the output from the abovementioned logical gate circuit 580 when no carry signal output is produced from the adders 576 and 578. As shown, this logical gate circuit 582 consists of seven exclusive "or" circuit. These logical gate circuits 580 and 582 constitute the operational circuit 80 in FIG. 11 together with the adders 576 and 578. 584 refers to a switch register which, in response to a signal from the driver 588 receiving therein the output from the "and" circuit 414 in FIG. 20C, produces a data output ("8") for the permissible difference preset by combination of the on-off operations of each switch. 586 designates a switch register which, in response to a signal from the driver 590, produces a data output ("2") about the abovementioned permissible variation width preset by combination of the on-off operations of each switch. These switch registers constitute the switch register 94 in FIG. 11. 592 and 594 refer to magnitude comparators of 4-bit construction for effecting discrimination of magnitude between the output data of the switch registers 584 and 586 and the output data from the logical gate circuit 582. These magnitude comparators constitute the digital comparator 96 in FIG. 11. For the magnitude comparators 592 and 594, there may be used for example a magnitude comparator of 4-bit construction manufactured and sold by RCA Corp., U.S.A. under a model No. C-MOS CD4063. A "nor" circuit 596, an inverter 598, and "and" circuits 600, 602 constitute the logical gate circuit for detecting the focus adjustment state of the photo-taking lens on the basis of the carry output from the adders 576, 578 and the outputs from the logical gate circuits 580, 582. This logical gate circuit corresponds to the just focus detection circuit 98 in FIG. 11. 604, 606 and 608 designate 4-bit latch circuits to latch the output from the logical gate circuit 582 and an output from a logical gate circuit consisting of the "nor" circuit 596, the inverter 598, and "and" circuits 600, 602. These latch circuits constitute the latch circuit 100 in FIG. 11. For these latch circuits, there may be used for example a 4-bit latch circuit manufactured and sold by RCA Corp., U.S.A. under a mode No. C-MOS CD4035. At the time of turning on of the power source, these latch circuits 604, 606 and 608 are applied with the output from the inverter 306 in FIG. 20A as the reset signal. D-type flip-flops 610, 612, 614, 616, and 618, an "and" circuit 620, a "nor" circuit 622, and an inverter 624 constitute a logical circuit for producing an output signal indicating that the system does not perform the normal just focus detection. The output Q of the flip-flop 610 represents the "just focus lock" state, the output Q of the flip-flop 612 represents the "defference large" state, the output Q of the flip-flop 614 the "coincided bit number small" state, and the output Q of the flip-flop 616 the "two-value in appropriate" state. The flip-flop 618 holds the respective states of the outputs Q of the flip-flops 610 to 616 under the "or" condition, and the output Q thereof is used for displaying the foolproof. The flip-flops 610 and 616 are applied with the output from the "and" circuit 474 in FIG. 20D as the strobing signal. The flip-flop 612 is applied with the output from the "and" circuit 472 in FIG. 20D as the strobing signal. The flip-flop 614 is also applied with the output from the "and" circuit 470 in FIG. 20D as the strobing signal. At the time of turning on of the power source, the output from the inverter 306 in FIG. 20A is applied as the reset signal to these flip-flops 610 to 618. The logical circuit of the abovementioned construction corresponds to the output regulating circuit 104 in FIG. 11. An "and" circuit 626 receives the output from the "nor" circuit 622 and the output from the flip-flop 476 in FIG. 20D, and applies the latch signal to the latch circuits 604, 606, and 608. This corresponds to the gate circuit 112 in FIG. 11. 628 designates a display element array consisting of a first display section 628A which performs display of the focus adjusting state of the photo-taking lens L, i.e., each of the just focus, front focus and rear focus states, and a second display section 628B which performs display of a discrepancy from the normal just focus position of the photo-taking lens L in the binary display on the basis of the outputs from the latch circuits 604 and 606. 630 refers to a display of the "just focus lock" on the basis of the output Q of the flip-flop 610, a display element 630B which performs display of the "difference large" based on the output Q of the flip-flop 612, a display element 630C which performs display of the "coincided bit number small" based on the output from the flip-flop 614, a display element 630D which performs the "two-value inappropriate" based on the output of the flip-flop 616, and a display element 630E which performs the display on the basis of the output from the flip-flop 618 that the system does not perform the normal focus detection. These display element arrays 628 and 630 constitute the display circuit 106 in FIG. 11. OTG$_1$ designates a group of output terminals to produce the output from the latch circuit 608, i.e., the output data about the focus adjusting state of the photo-taking lens L. OTG$_2$ refers to a group of output terminals to produce the outputs from the latch circuits 604 and 606, i.e., the output data about the discrepancy of the photo-taking lens L from the normal just focus position. The output signals from these groups of the output terminals OTG$_1$ and OTG$_2$ are applied to the motor control circuit 108 (the details of which will be explained in reference to FIG. 21 in later paragraphs).

In the foregoing explanations in reference to FIGS. 20A through 20H, there may be used as one example of the D-type flip-flop and J-K type flip-flop in particular a D-type flip-flop of RCA Corp., U.S.A. under a model No. C-MOS CD4013, and a J-K type flip-flop of RCA Corp., U.S.A. under a model No. C-MOS CD4027.

Incidentally, the construction of the system shown in FIG. 20 shows an example of a case wherein the C-MOS structure is particularly adopted for ready understanding and simplicity in the explanations. However, in the practice of the system shown in FIG. 11, it is of course possible that the entire system can be constructed with LSI (large Scaled Integrated Circuit) except for a part of the switches. As for the switch registers, they can be intersified to fixed data ROM (Read Only Memory) in constructing them with LSI, when a certain constants are empirically determined. Accordingly, it is not particularly limited to the construction of the switches. Further, each of the gate circuits used for explanation of the logics can also adopts various structures from the logical standpoint. Accordingly, once the expected objective is achieved relative to the functions of the inputs and outputs, variations may be easily conceived by those skilled in the art.

Therefore, the construction shown in FIG. 20 is not particularly specific and absolute for the purpose of the present invention.

Figure 21A:
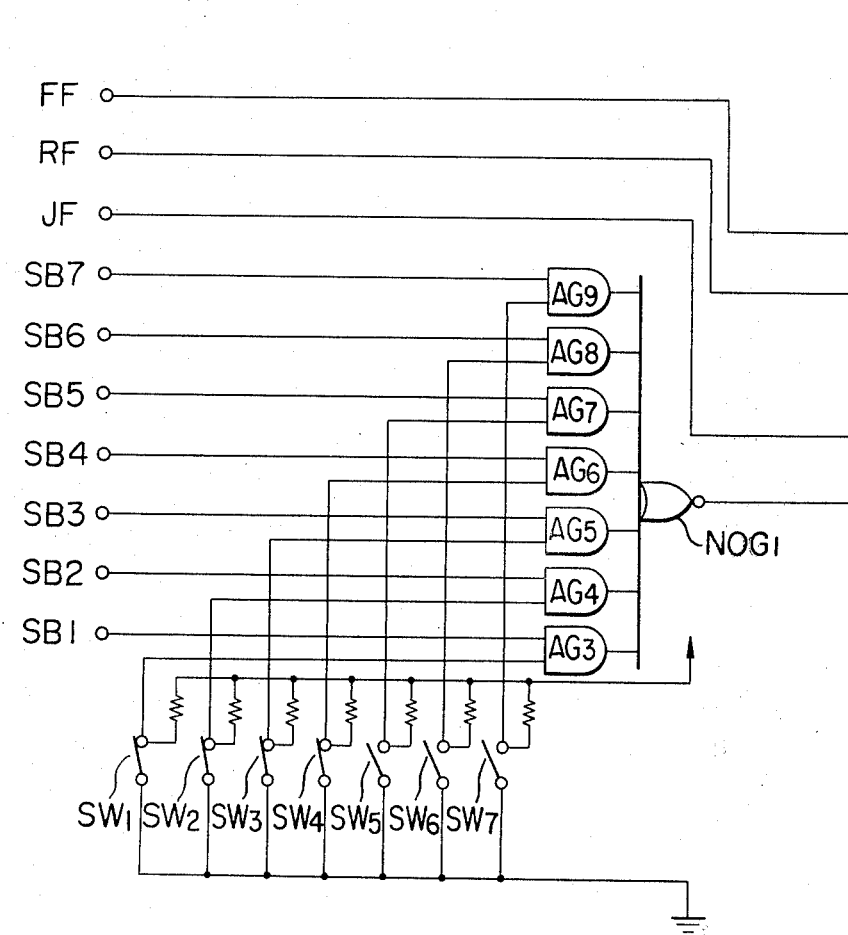
FIG. 21 shows circuit connections of an embodiment of motor control circuit in the circuitry of FIG. 11.
Figure 21:
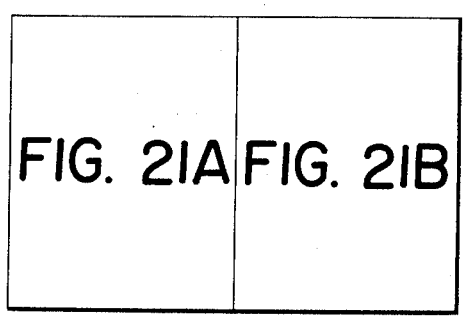
Figure 21B:
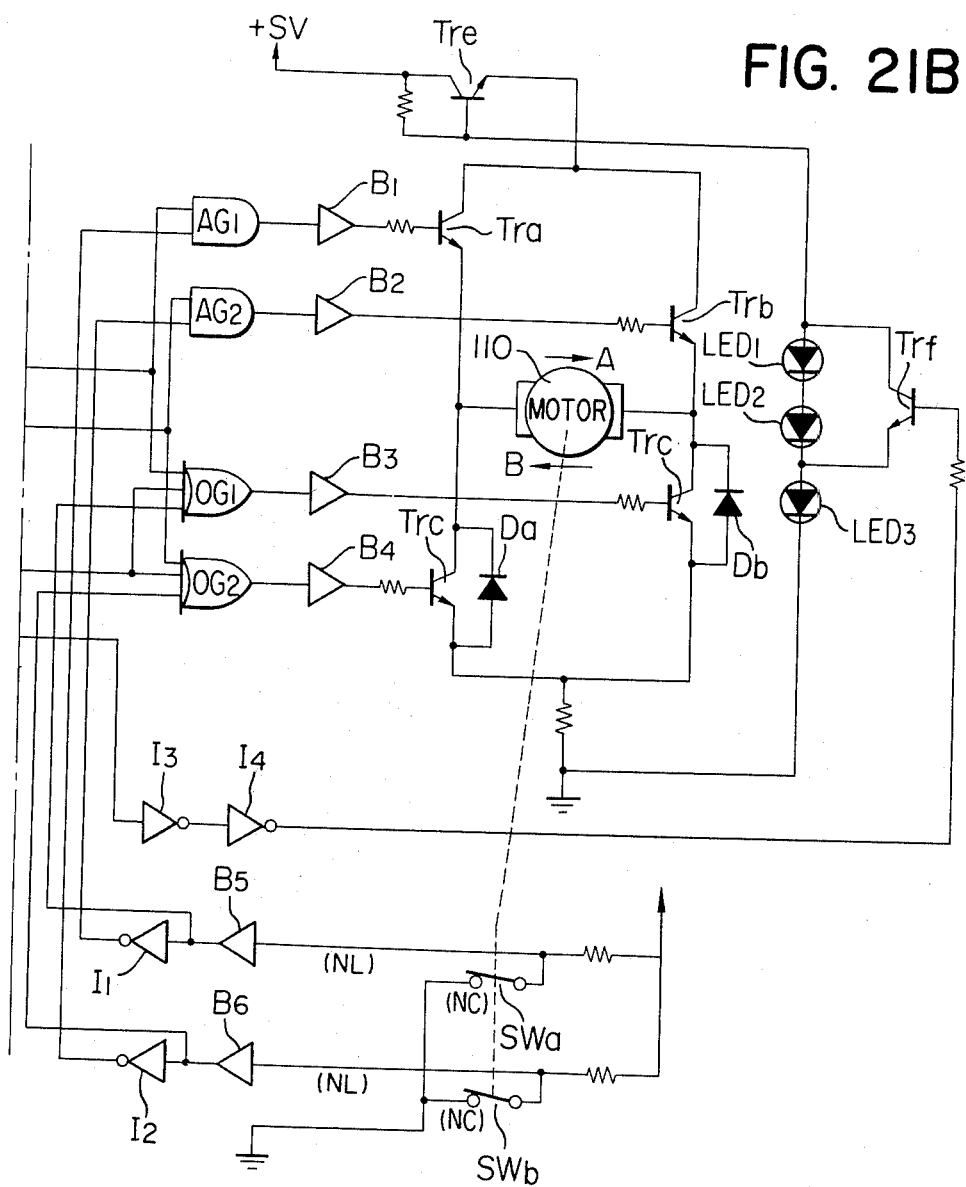

FIG. 21 shows the details of the motor control circuit 108 in the circuit system of FIG. 11.

In the drawing, Tra, Trb, Trc and Trd designate transistors to perform switching and interruption of supply current to the motor 110, and Tre and Trf are transistors of a circuit to reduce the operating speed. Da and Db refer to diodes, LEDa, LEDb and LEDc designate light emitting diodes to obtain a speed reduction indication and a base potential of the transistor Tre. The main part of the control circuit is constructed with the logical circuit such as shown in the drawing, which applies a control signal to each base of the transistors Tra through Trf so as to control the servo-motor 110 in the mode of its forward rotation, reverse rotation, stoppage, and speed reduction. In other words, to terminals FF, RF and JF, there is applied a signal representing the focus adjusting state of the photo-taking lens L from the group of output terminals $OTG_1$ in FIG. 20H, i.e., a signal representing each state of the "front focus", "rear focus", and "just focus" (still in other words, this is the output from the latch circuit 608 in FIG. 20H). These signals applied as the input to the terminals FF, RF and JF are respectively applied to "and" circuits $AG_1$, $AG_2$ and "or" circuits $OG_1$, $OG_2$. The outputs from these "and" circuits $AG_1$, $AG_2$ and the "or" circuits $OG_1$, $OG_2$ are respectively applied to the bases of the transistors Tra, Trb, Trc and Trd through the buffer circuits $B_1$, $B_2$, $B_3$ and $B_4$, whereby the on-off operations of the transistors Tra to Trd are controlled.

That is to say, when a "front focus" signal input "1" is introduced from the terminal FF, the outputs from the "and" circuit $AG_1$ and the "or" circuit $OG_1$ become "1", whereby the transistors Tra and Trd are turned on. At this time since the outputs from the "and" circuit $AG_2$ and the "or" circuit $OG_2$ and "0", the transistors Trb and Trc become turned off. In this consequence, drive current flows in the arrow direction A from (+) terminal of the power source to the motor 110 through the transistors Tre→Tra→Trd, in the sequence mentioned, and the photo-taking lens L moves from the "nearest" position to the "infinite" position position by the rotation of the motor 110. When the lens L reaches the just focus position, a "just focus" signal "1" enters from the terminal JF, which signal the outputs from the "or" circuits $OG_1$ and $OG_2$ become "1", and the transistors Trc and Trd are turned on, whereby the drive current of the servo-motor 110 flows to the earth through the transistors Tra and Trc, and, at the same time, an inverse electromotive force induced by rotation of the motor 110 flows in the arrow direction B through the closed circuit of the diode Db the transistor Trc, and the motor 110 is abruptly stopped. When a "rear focus" signal "1" is input from the terminal RF, the outputs from the "and" circuit $AG_2$ and the "or" circuit $OG_2$ become "1", contrary to the case of the abovementioned "front focus" state, whereby the transistors Trb and Trc are turned on, and the transistors Tra and Trd are turned off. Accordingly, the drive current flows to the motor 110 in the arrow direction B to cause the lens L to move from the "infinite" position to the "nearest" position. When the lens L arrives at the just focus position, the "just focus" signal "1" enters from the terminal JF and the motor 110 is stopped as mentioned above.

Switches SWa and SWb are constantly closed type switches associated with the photo-taking lens L. The switch SWa is turned off (open) when the lens L moves in the direction of from the "infinite" position to the "nearest" position, and reaches the "nearest" position. The switch SWb is turned off (open) when the lens L moves in the direction of from the "nearest" position to the "infinite" position, and arrives at the infinite position. Therefore, these switches SWa and SWb play a role of limitters. In other words, if it is assumed that the just focus signal cannot be obtained for some reason or others, when the lens L is moving in the direction of the "infinite" position with the "front focus" signal "1" from the terminal FF, the lens L finally reaches the infinite position, and the switch SWb is turned off to render the output from the buffer circuit $B_6$ to be "1". As the result, the output of the "or" circuit $OG_2$ becomes "1", and the output of the inverter $I_2$ becomes "0"$_x$ with the consequence that the output of the "and" circuit $AG_1$ becomes "0". Accordingly, the transistors Tra and Trb are turned off, and the transistors Trc and Trd are turned on, whereby the drive current of the motor 110 is interrupted, and a braking force is applied by the inverse electromotive force of the motor 110, and the motor 110 rapidly stops. Also, if it is assumed that the just focus signal cannot be obtained for some reason or others, when the lens L is moving in the direction of the "nearest" position with the "rear focus" signal "1" from the terminal RF (i.e., the transistors Trb and Trc are turned on), the lens L finally reaches the "nearest" point, and the switch SWa is turned off, and the output of the buffer circuit $B_5$ becomes "1". As the result, the output of the "or" circuit $OG_1$ becomes "1", and the output of the inverter $I_1$ becomes "0" with the consequence that the output of the output of the "and" circuit $AG_2$ becomes "0", and the transistors Tra and Trb are turned off, and the transistors Trc and Trd are turned on same as the abovementioned, whereby the drive current of the motor 110 is interrupted, and a braking force is applied by the inverse electromotive force of the motor 110 and the motor 110 rapidly stops.

$SB_1$ to $SB_7$ designate input terminals for introducing thereinto input signals representing discrepancy of the photo-taking lens L from the normal just focus position from the groups of output terminals $OTG_2$ in FIG. 20H (i.e., these are the binary outputs from the latch circuits 604, 606 in FIG. 20H). The binary signal inputs introduced through these input terminals $SB_1$ to $SB_7$ are applied to the "and" circuits $AG_3$ to $AG_9$. $SW_1$ to $SW_7$ designate switches for setting the limit of the speed reduction of the motor 110, i.e., to what extent of a range of discrepancy with respect to the discrepancy of the photo-taking lens L from the just focus position the motor 110 can be operated at a reduced speed. The on-off signals of these switches $SW_1$ to $SW_7$ ("0" denotes the "on" operation, and "1" denotes the "off" operation) are applied to the "and" circuits $AG_3$ to $AG_9$. Incidentally, the switches $SW_1$ to $SW_7$ are used in such a manner that they may be sequentially turned on (close) from the switches of lower position (i.e., from the switch $SW_1$) in accordance with a desired limit of the speed reduction. The outputs of the abovementioned "and" circuits $AG_3$ and $AG_9$ are applied to a "nor" circuit $NOG_1$. An output from the "nor" circuit $NOG_1$ is applied to the base of the transistor Trf through the inverters $I_3$ and $I_4$ for the buffers.

According to such construction, when the lower four switches $SW_1$ to $SW_4$ out of the switches $SW_1$ to $SW_7$ are closed as illustrated in the drawing, the outputs from the "and" circuits $AG_3$ to $AG_6$ are compulsorily set at "0" irrespective of what state the signal inputs to be introduced through the terminals $SB_1$ to $SB_4$ assume. Accordingly, the output from the "nor" circuit $NOG_1$ depends on the outputs from the "and" circuits $AG_7$ to $AG_9$. Therefore, when the outputs from the latch circuits 604 and 606 are the binary codes in a range of from "1000000" to "1111000" (where the leftmost bit is LSB (Least Significant Bit)), that is, when the discrepancy of the photo-taking lens L is in the range of from "1" to "15" in terms of the image element number in the line sensor 24, all the "and" circuits $AG_7$ and $AG_9$ take the "0" output with the consequence that the output from the "nor" circuit $NOG_1$ becomes "1". Accordingly, the transistor Trf is turned on to short the light emitting diodes $LED_1$ and $LED_2$, and the transistor Tre lowers its base potential, whereby the output current thereof reduces, and the drive current of the motor 110 is reduced to render the motor 110 to operate at a reduced speed. In this case, display is done by turning on of the light emitting diode $LED_3$ alone to the effect that the motor 110 is operating at a reduced speed.

On the other hand, when the outputs from the latch circuits 604 and 606 are above "0000100", i.e., when the discrepant quantity of the photo-taking lens L is "16" (for image element) and above, either of the "and" circuits $AG_7$ to $AG_9$ produces the output "1", and the output from the "nor" circuit $NOG_1$ becomes "0". Accordingly, the base potential of the transistor Tre is maintained at a high potential with the transistor Trf being turned off, on account of which the output current therefrom becomes large, and the motor 110 operates at a high speed. In this case, the high speed operation of the motor 110 is displayed by turning on of the light emitting diodes $LED_1$ to $LED_3$.

The foregoing explanations are for the first embodiment of the present invention. In this connection, it is to be noted that various modifications are possible besides the embodiment shown in FIGS. 11 to 21. Therefore, in the following, several other embodiments of the present invention will be explained with respect to the main points of difference from the constructions shown in FIGS. 11 through 21.

In the system shown in FIGS. 11 to 21, it is so constructed that the sequence modes unconditionally shift from C0 to C5, and returns to C0. For example, as the result of detection of the two-value state by the two-value state detection circuit 102 in the sequence mode C3, even if the two-value signals corresponding to the standard sight P are all found to be "0" or "1", the detected result at this time is evaluated at the final sequence mode C5, on the basis of which the output regulation is effected by the output regulating circuit 104. In contrast to such construction, it may be feasible to construct the system in such a manner that, when it is previously known that no accurate detected result can be obtained, even if the two-value image data obtained in the sequence mode 3 are data-processed in the subsequent sequence mode C4, e.g., if the two-value signals corresponding to the standard sight P are all "0" or "1" as mentioned above, the sequence mode may be immediately returned to the initial sequence mode C0 without executing the data-processing by shifting the sequence mode from C3 to C4. In other words, in the other embodiment of the present invention, there is established a sequence mode C3' subsequent to the sequence mode C3 to evaluate the image data which are quantized in the sequence mode C3 and taken thereinto. On the basis of the result of data evaluation in this sequence mode C3', judgement is made as to whether the sequence mode be returned to C0 or forwarded to C4.

Figure 23:
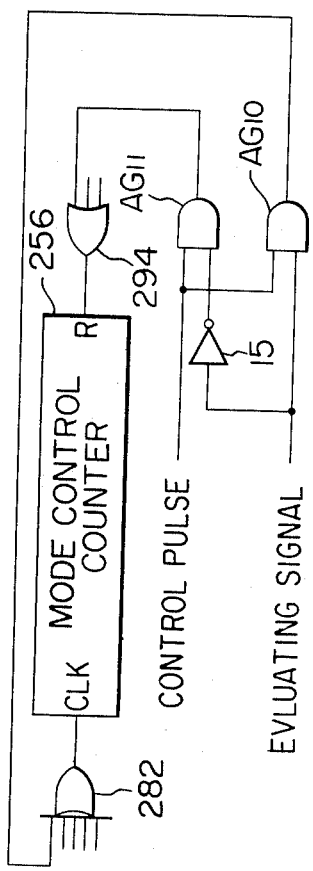
FIG. 23 shows circuit connections of a modification to the essential parts of the digital circuitry in FIG. 20.

FIG. 23 is a partial circuit diagram showing one example, wherein the above-described improvement is incorporated in the circuit shown in FIG. 20A. According to this circuit construction, when the evaluated signal in the sequence mode C3' is introduced into one of the inputs of an "and" circuit $AG_{10}$ and the output from the inverter $I_5$ is introduced into one of the inputs of an "and" circuit $AG_{11}$, if the result of evaluation indicates that the data processing can be effected in the sequence mode C4, a count up pulse is applied to the clock input terminal CK of the counter 256 for mode control (corresponding to the counter 52 in FIG. 11) from the "and" circuit $AG_{10}$ through the "or" circuit 282, and, if the result of the evaluation indicates that no data processing is required to be done, a reset pulse is applied to the reset terminal R of the counter 256 from the "and" circuit $AG_{11}$ through the "or" circuit 294 so as to return to the sequence mode C0.

In this case, the output from the threshold level setting circuit is required to be sampled and held by the sample and hold circuit 120 in the sequence mode C3'.

Figure 22:
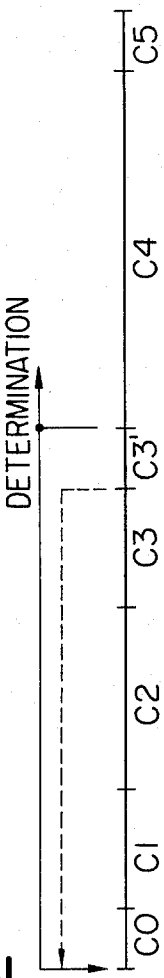
FIG. 22 shows a modification for the control of operational modes settable in the circuitry of FIG. 11.

The system shown in FIGS. 11 to 21 is so constructed that the peak value of the image signal corresponding to the standard sight P is detected by the peak detection circuit 116 at the time of reading of the image signals from the line sensor 24, the threshold level SH to be the standard for quantizing the image signals is determined by the threshold level setting circuit on the basis of the detected peak value, and the thus determined threshold level SH is stored in the sample and hold circuit 120. On account of this, no threshold level SH is not yet stored in the sample and hold circuit 120 at the initial operating cycle, so that appropriate two-value data cannot be obtained at this initial operating cycle. For such point of problem there can be adopted such measures that, for example, a circuit to detect that the operating cycle of the system is the first one (first stage detection circuit) and an "and" circuit to find out a logic product of an output from this first stage detection circuit, A4 output from the counter 256 (i.e., representing the sequence mode C3); and the counter control pulse are provided, and then, by applying the output from this "and" circuit to the abovementioned "or" circuit 294, the counter 256 is reset after completion of the sequence mode C3 in the initial operating cycle as shown by a dash line in FIG. 22 to return the sequence mode to C0.

Figure 24:
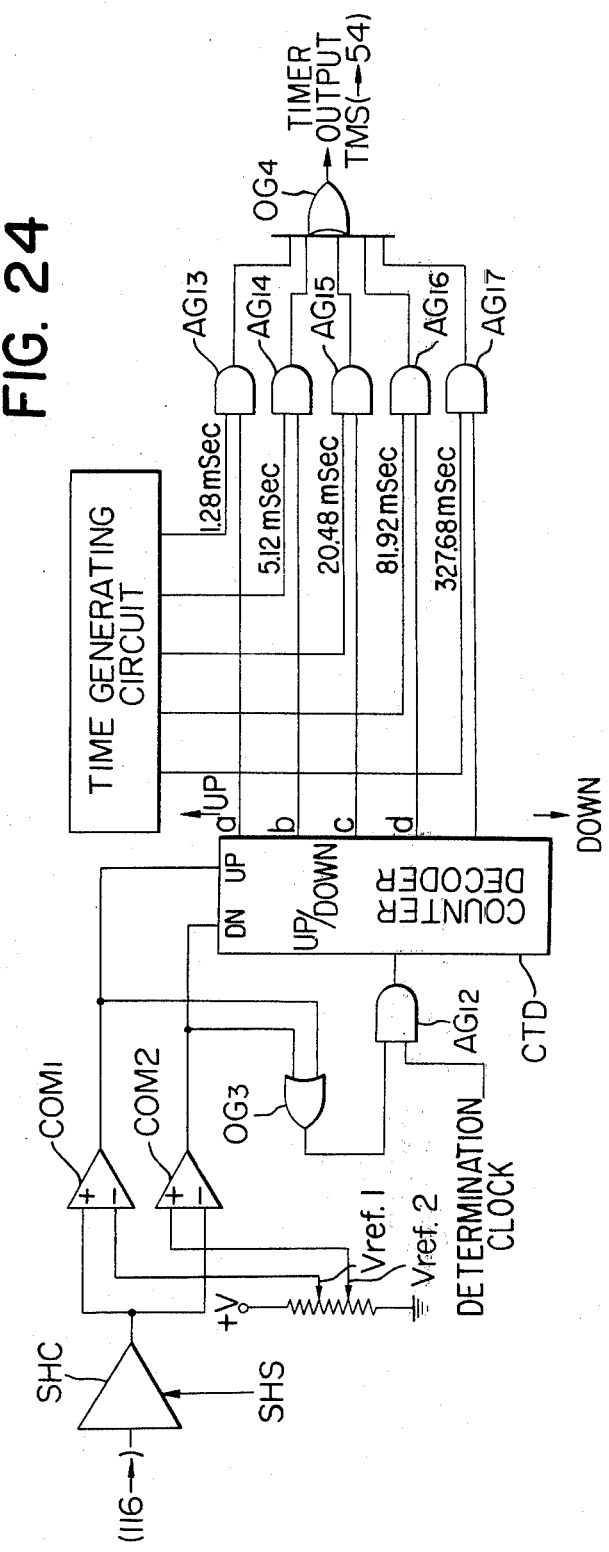
FIG. 24 shows another embodiment of timer circuit.

In the following, explanations will be given as to the other embodiment of the timer circuit 124 shown in FIGS. 11 and 18. In the above-described embodiment, the operating time of the timer (a time in the sequence mode C2) was set on the basis of the output from the light metering circuit 122. In this other embodiment shown in FIG. 24, the operating time of the timer as preset is changed over in stagewise in accordance with the level of the image signals obtained in the sequence mode C3. In more detail, the peak value of the image signals corresponding to the standard sight P obtained from the peak detection circuit 116 in the sequence mode C3 is taken into a sample and hold circuit SHC immediately prior to termination of this sequence mode C3 (this sample and hold circuit SHC has the same construction as the sample and hold circuit 120 in FIG. 11, to which a sample and hold instruction signal SHS shown in FIG. 19 is applied as is the case with the sample and hold circuit 120), and the output from this sample and hold circuit SHC at this time is compared with the upper limit level $V_{ref.1}$ and the lower limit level $V_{ref.1}$ as preset by the comparators $COM_1$ and $COM_2$. When the output from the sample and hold circuit SHC is above the upper limit level $V_{ref.1}$, an output "1" is produced from a comparator $COM_1$, an output "0" is produced from a comparator $COM_2$, and a counter decoder CTD, to which these outputs are introduced as inputs is set in a UP count mode. In this instance, when a determination clock signal is introduced into the counter decoder CTD through the "and" circuit $AG_{12}$, the counter decoder CTD performs counting in the UP direction for 1 bit, whereby a short time out of various output times from a time generating circuit TGC is selected by any of the "and" circuits $AG_{13}$ to $AG_{17}$. Accordingly, a short integration time is obtained for a timer output TMS through the "or" circuit $OG_4$.

When the output from the sample and hold circuit SCH is in the middle of the upper limit level $V_{ref.1}$ and the lower limit level $V_{ref.1}$, an output "0" is produced from both comparators $COM_1$ and $COM_2$, and the output from the "or" circuit $OG_3$ becomes "0", whereby introduction into the counter decoder CTD of the determination clock signal input from the "and" circuit $AG_{12}$ is hindered, and the counter decoder CTD maintains its current state.

When the output from the sample and hold circuit SHC is below the lower limit level $V_{ref.1}$, the output from the comparator $COM_1$ becomes "0", and the output from the comparator $COM_2$ becomes "1", whereby the counter decoder CTD is set in a DOWN count mode, and the timer output TMS takes a long integration time. The abovementioned determination is effected at the termination of the sequence mode C3, wherein, when the peak level of the image signals corresponding to the standard sight P exceeds the upper limit level as preset, or becomes lower than the lower limit level, the preset integration time is regarded as inappropriate, so that it is possible to return the sequence mode to C0 without effecting the sequence mode C4, while the set time of the timer is being changed. That is, the inappropriateness of the integration time in this case may be handled in the same manner as in the abovementioned inappropriateness in the two-value, i.e., the sequence mode C3' is provided after the sequence mode C3 to effect various operations in this sequence mode C3' such as sample and hold of the peak value data, determination of the integration time, determination of the two-value state, and so forth, depending on which there may be conducted controls, depending on necessity, for returning the sequence mode to C0, or shifting the sequence mode to C4.

As stated above, when the integration time is established stepwisely, in particular, when it is 10 m sec. to 8.3 m sec. or below in the on-and-off cycle of light such as fluorescent light illumination, etc., there takes place such possibility that the integration time to be obtained at the time of repetition of the operating cycle of the sequence modes C0 to C5, at every sequence mode C2. On account of this, there occurs necessity for taking a time integral multiple of 10 m sec. for both the repetitive cycle of the sequence loop based on the inappropriate signals such that the sequence modes shift in the order of C0→C1→C2→C3→C3'→C0→C1→C2→C3→C3' and the regular sequence loop in which the sequence modes shift from C0 to C5. Accordingly, the time in each of the sequence modes C0 to C5 should be properly selected so as to satisfy this condition.

In the following other embodiment will be described in relation to control of the photo-taking lens L. In the above-described embodiment, the sequence of the signal processing system is conducted in such a manner that the operations in the sequence modes C0 to C5 are repeatedly performed irrespective of the driving condition of the photo-taking lens. However, when the integration time becomes long, and the lens 22 at the side of the reference sight moves, the image on the line sensor 24 moves during the integration time, which is problematical. For solution of such problem, there may be adopted such a construction that the sequence is once stopped at the stage of the detection result of the focus adjustment state having been obtained, during which the photo-taking lens L is moved. And the operating time of the photo-taking lens L is at this time may be determined in accordance with the discrepant quantity of the photo-taking lens L up to the focal point based on the result of detection of the focus adjustment state.

Figure 25:
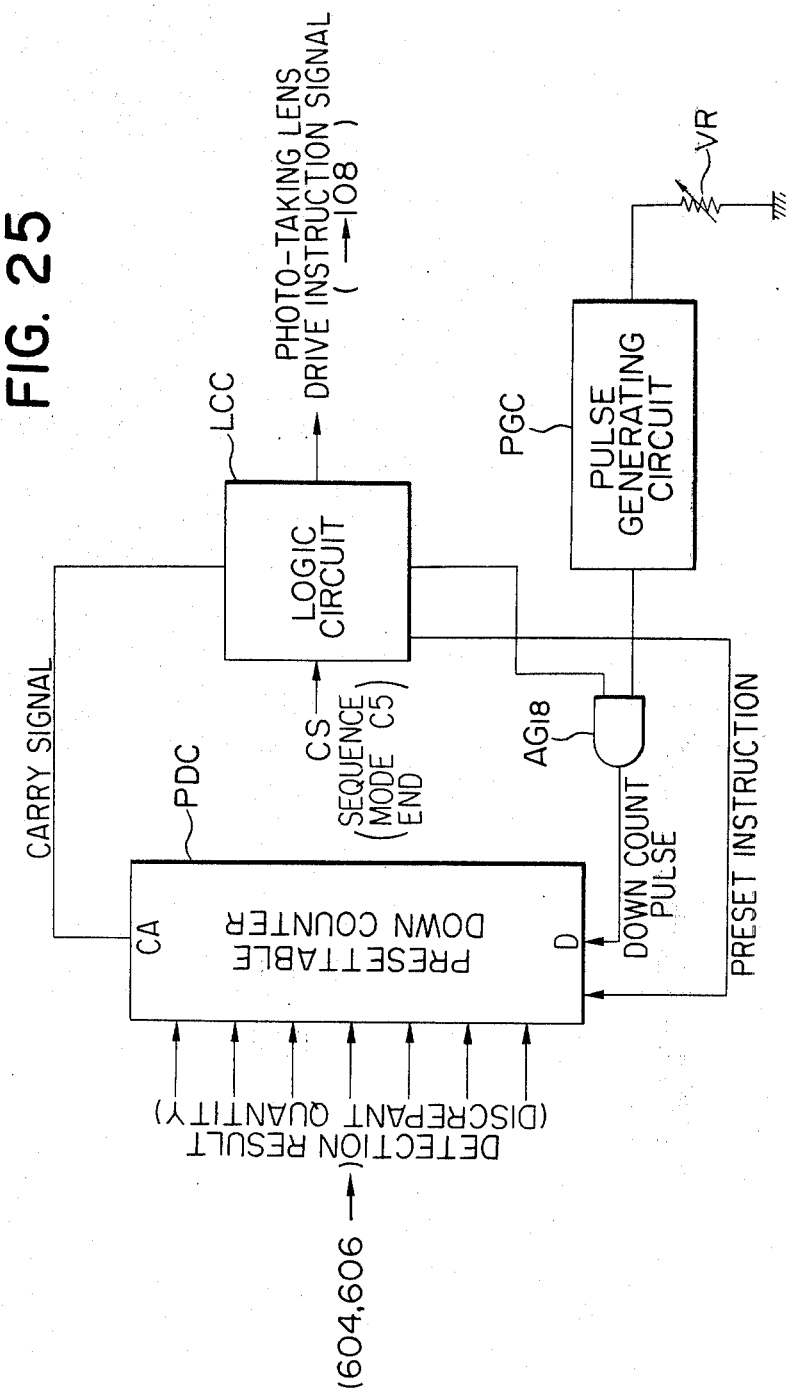

FIG. 25 shows the concrete construction for this embodiment. That is, at the time instant when the sequence mode C5 is completed, and the detection results are produced as the outputs from the latch circuits 604, 606 in FIG. 20H, a control signal CS is applied to a logical circuit LCC, from which a preset instruction is imparted to a presettable down counter PDC to preset the discrepant quantity based on the detection result to the counter PDC. Subsequently an instruction output for opening the "and" circuit $AG_{18}$ is produced for imparting an output pulse from the pulse generating circuit PGC to a down count terminal D of the counter PDC. At the same time, a drive instruction signal is given to the motor control circuit 108 to drive the lens driving motor 110. During this period, the counter PDC continues its down count, and, when its content becomes "0", a carry signal output is produced from an output terminal CA by the subsequence count pulse. The logical circuit LCC which has received this carry signal immediately releases the drive instruction to the motor control circuit 108 to stop the photo-taking lens L. The moving quantity of the photo-taking lens L at this time corresponds to the discrepant quantity based on the result of the detection, and it is necessary to closely adjust frequency of the pulse to be produced as an output from the pulse generating circuit PGC so that the final moving position of the lens may come to the just focus position or in its vicinity. It is of course possible that, in place of the pulse generating circuit PGC, a frequency dividing circuit which divides a system clock and produces the divided clock as the output is used. In this manner, after the photo-taking lens L is driven, the sequence mode is returned to C0 to effect the subsequent operations.

In the following still another embodiment of controlling the photo-taking lens L will be described. In the above-mentioned embodiment, the lens 22 at the side of the reference sight is interlocked with the photo-taking lens L for operation. The control of the photo-taking lens can also be done by such a construction that the lens 22 at the side of the reference sight is fixed at a position corresponding to infinite distance or a position corresponding to the nearest distance, and the switch circuit in the data controller 82 in FIG. 11, i.e., a set value of the switch register 556 in FIG. 20F is made the numerical data representing the position corresponding to the infinite distance or the position corresponding to the nearest distance on the line sensor 24 and the discrepant quantity of the object to the infinite distance position or the nearest distance position is produced as an output from the latch circuits 604 and 606 in FIG. 20H in terms of a quantity purely corresponding to the object distance, and this output is converted by a D-A converter to be compared with an output from a potentiometer which detects the position of the photo-taking lens L.

Figure 26:
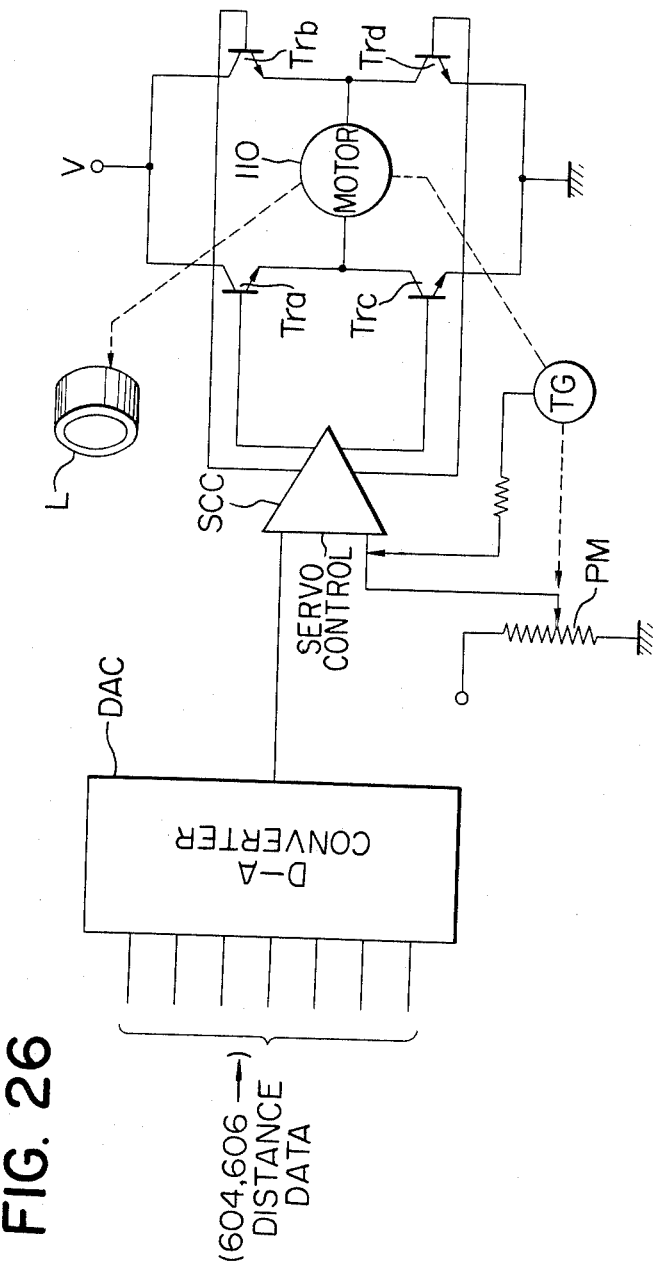
Figure 27:
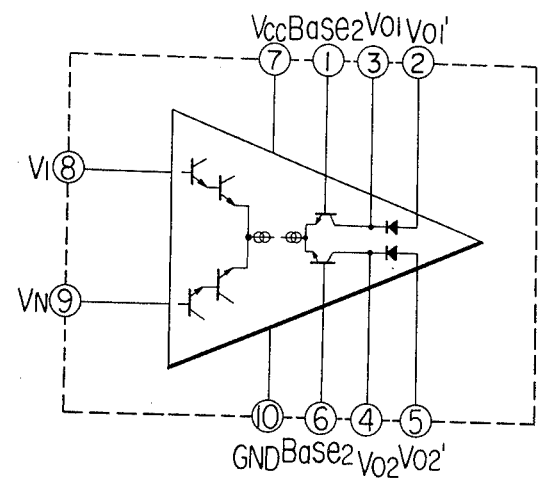
FIG. 27 shows a circuitry of the servo control circuit of FIG. 26.

FIG. 26 shows an example of concrete construction for the above. That is, distance data outputs from the latch circuits 606 and 604 are converted to analog quantities by the D-A converter DAC, and the analog quantities are made one input to the servo control circuit SCC. On the other hand, an analog quantity showing the lens position from the potentiometer PM interlocked with the photo-taking lens L is made the other input to the servo control circuit SCC. From the servo control circuit SCC, a signal to instruct the forward or reverse rotation is given to the transistors Tra to Trd for the motor control. In the meantime, a tacho-generator TG is interlocked with the motor 110, and an output therefrom is added as an supplementary quantity to the output from the potentiometer PM to prevent the overshoot. The motor 110 is so adjusted that it may drive the potentiometer PM together with the photo-taking lens L so that the output from the potentiometer PM may coincide with the output from the D-A converter DAC. In the servo control circuit SCC, however, the motor 110 is stopped when the output of the D-A converter DAC coincides with the output of the potentiometer. For the servo control circuit SCC, theremay be used as one example "MPC590G" of Nippon Electric Company, Japan as shown in FIG. 27, or an equivalent construction.

Figure 28:
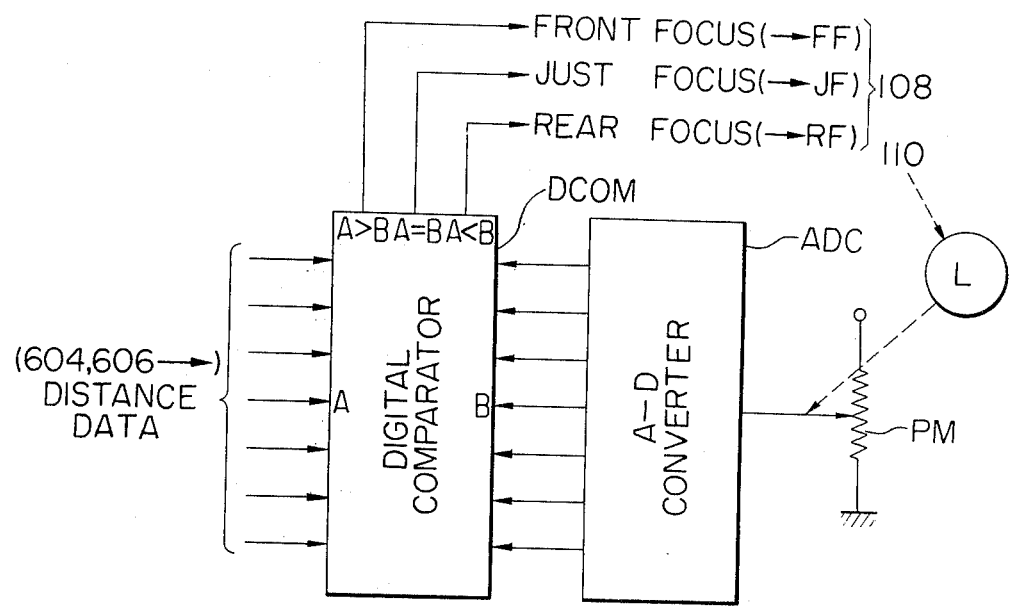

Regarding control of the photo-taking lens L, a still further embodiment will be described in the following. In the embodiment explained in reference to FIG. 26, output data representing the object distance are produced from the latch circuits 604, 606 and the data are converted into an analog quantity, while the data for the position of the photo-taking lens L is also obtained in an analog quantity, both analog quantities being compared for controlling the motor 110. Besides this, it is also possible that, for example, digital data obtained by A-D conversion of the output from the potentiometer to detect the position of the photo-taking lens are digitally compared with the output data from the latch circuits 604 and 606 to thereby control the photo-taking lens FIG. 28 shows an example of the concrete construction for the above. That is, the output from the potentiometer PM interlocked with the photo-taking lens L is A-D converted by the A-D converter ADC to thereby obtain the data on the photo-taking lens position in a digital quantity which is made B-input to the digital comparator DCOM. On the other hand, the distance output data of the latch circuits 604, 606 obtained from the result of the range finding is made A-input to the digital comparator DCOM as a target value. An output relative to magnitude of both A and B inputs are obtained from the digital comparator DCOM in such state, and, when A is larger than B (A>B), it is the front focus state, when A is equal to B (A=B), it is the just focus state, and when A is smaller than B (A<B), it is the rear focus state. These outputs may be applied to the motor control circuit in FIG. 21 through the respective terminals FF, RF and JF as the control signals for the front focus, the just focus and the rear focus. As the result, the motor 110 drives the photo-taking lens L and the potentiometer PM, thereby adjusting to coincide the A-D converted balue of the output from the potentiometer PM by the A-D converter ADC with the distance data as the target value with the consequence that the photo-taking lens L stops at a time instant when the A=B output of the digital comparator DCOM is obtained. Incidentally, the A B output and A B output of the digital comparator DCOM can of course be used properly as the front focus signal and the rear focus signal depending on the lens position and the manner of setting the target value.

In the embodiment shown in FIG. 28, potentiometer PM and the A-D converter ADC are used for replacing the lens position with the digital value. It is also possible that, as shown in FIG. 29, an encoder ECD and a brush BR movable in association with the photo-taking lens L are combined for direct detection of the lens position.

Figure 29:
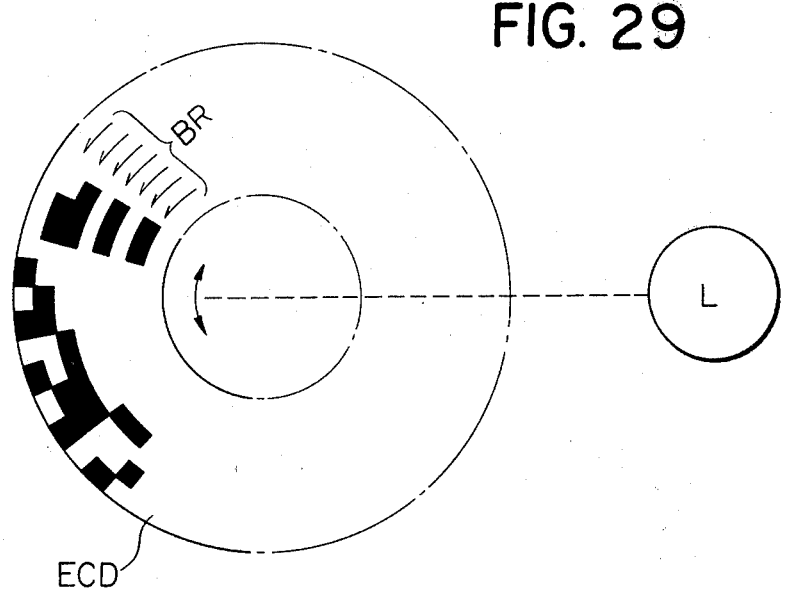
FIG. 29 is a model showing an embodiment of lens position detector.

In the embodiments shown in FIGS. 26, 28 and 29, the standard position of the photo-taking lens L is set at a position corresponding to the infinite distance or a position corresponding to the nearest position. When the photo-taking lens L is at this standard position, the standard position data "0" is obtained from the potentiometer PM in the embodiment of FIG. 26, from the A-D converter ADC in the embodiment of FIG. 28, and from the brush BR in the embodiment of FIG. 29, and is compared with the distance data by means of the servo control circuit SCC and the digital comparator DCOM.

Incidentally, in the embodiment of FIG. 28, a subtraction circuit may of course be used in place of the digital comparator DCOM. In this instance, however, there is required a logical circuit to detect the state of the front focus or rear focus in accordance with presence or absence of the carry and to use the subtraction result "0" as the just focus signal. In this case, a certain definite value and below from the subtraction result is detected and this can be used as the speed reduction signal for the motor control circuit in FIG. 21. It is also possible that the just focus lock operation can be effected by addition of a logical circuit which continues to produce the just focus signal until the subsequence subtraction result exceeds a certain definite value, once the subtraction result becomes "0". Concrete example of such construction will be shown in FIG. 30. The embodiment shown in FIG. 30 indicates a case wherein a constant of the just focus lock and a constant of the speed reduction limit of the servomotor 110 are made equal each other. In the illustration, distance output data from the latch circuits 604, 606 are applied as an input X to the subtraction circuit SUB, and lens position data from the A-D converter ADC in FIG. 28 are applied as an input Y thereto. The subtraction circuit SUB produces IX-YI as an output with 7-bit parallel data, and produces a carry output signal "1" from the carry terminal CA, when the carry is generated. The carry signal from the subtraction circuit SUB is applied to the "and" circuit $AG_{20}$ and also applied to the "and" circuit $AG_{19}$ through the inverter $I_6$. The 7-bit parallel data for the IX-YI from the subtraction circuit SUB is applied to the "nor" circuit $NOG_2$. The "nor" circuit $NOG_2$ produces "1" when the 7-bit parallel data are all "0". While this output "1" is applied to the "or" circuit $OG_5$, it is also applied to the "and" circuits $AG_{19}$ and $AG_{20}$ through the inverter $I_7$. As is apparent from the above, the output "1" from the "or" circuit $OG_5$ represents the "just focus", the output "1" from the "and" circuit AG$_{19}$ represents the "front focus", and the output "1" from the "and" circuit AG$_{20}$ represents the "rear focus". Accordingly, by application of the outputs from these "or" circuit OG$_5$, and the "and" circuits AG$_{19}$ and AG$_{20}$ to the terminals JF, FF, and RF of the motor control circuit (108) in FIG. 21, the focus adjustment of the photo-taking lens L can be done properly.

On the other hand, the parallel data for IX-YI from the subtraction circuit SUB are also applied to the input A of a digital comparator DCOM', the input B of which is applied with the just focus lock from the constant generating circuit CGC and the constant for the speed reduction limit of the motor 110. The "A>B" output of the digital comparator DCOM' is applied to the reset input R of the R-S type flip-flop FL, the set input S of which receives the output from the "nor" circuit NOG$_2$. While the output Q of the flip-flop FL is given to the terminal JF of the motor control circuit (108) through the "or" circuit OG$_5$, the output Q "1" of this flip-flop FL represents the "just focus lock" and this output is used as the signal for maintaining stoppage of the motor 110 in the motor control circuit (108) same as the just focus signal. On the other hand, the "A B" output from the digital comparator DCOM' is applied to the base of the transistor Trf for the speed reduction in the motor control circuit (108) in FIG. 21, so that, when the output data of the subtraction circuit SUB are below the output data of the constant generating circuit CGC, the motor 110 is operated at a reduced speed.

Concerning control of the photo-taking lens L, there is shown other embodiment in the following. This embodiment is so constructed that the lens 22 at the side of the reference sight is fixed to obtain a signal corresponding to the distance, and, at the same time, the output from the potentiometer interlocked with the photo-taking lens L is A-D converted and is applied to the input B of the operational circuit 80 (the adders 576, 578 in FIG. 20G) through the data selector 92 (the data selectors 572, 574 in FIG. 20G) in place of the fixed numerical data to be the standard in determining the just focus of the photo-taking lens L as set in the switch circuit (i.e., the switch register 556 in FIG. 20F) in the data controller 82 shown in FIG. 11. According to this embodiment, the digital circuit system shown in FIG. 20 and the motor control circuit shown in FIG. 21 can be employed as they are.

Figure 31:
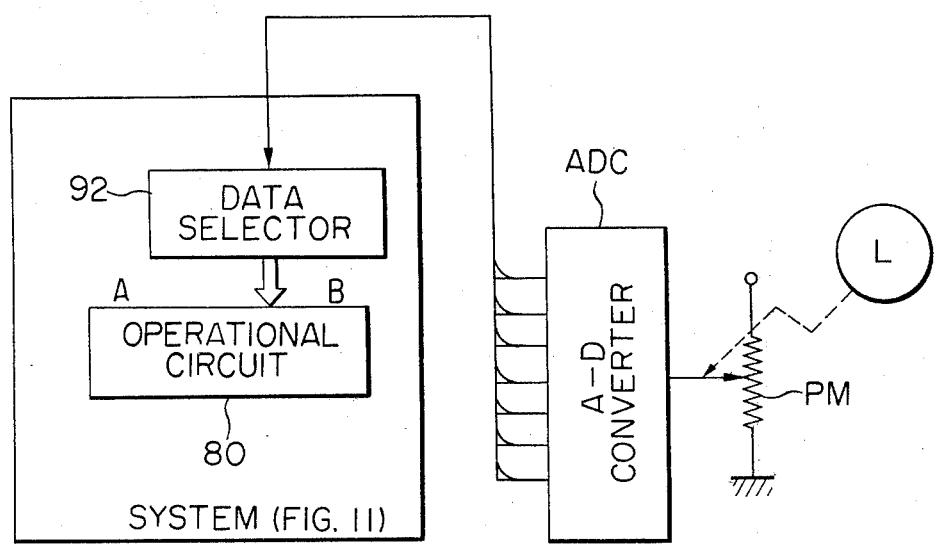

FIG. 31 shows the actual construction of the above. That is, the output from the potentiometer PM interlocked with the photo-taking lens L is A-D converted by the A-D converter ADC to obtain the digital value for the photo-taking lens position, and this digital value is applied as it is to the input B of the operational circuit 80 through the data selector 92 in place of the fixed numerical data to be the standard in determining the just focus of the photo-taking lens L as established in the switch circuit of the data controller 82 as mentioned above. As the result, a relationship of the lens position to the object distance is operated, based on which operational result the signals for the front focus, rear focus and just focus can be found by the construction shown in FIG. 30 and the same principle. The point of difference from the construction in FIG. 30 is that, while the construction in FIG. 30 subjects the photo-taking lens position to A-D conversion and always takes the converted result therein, the construction shown in FIG. 31 takes the lens position data only once during a series of operations wherein the sequence of the system shifts from C0 to C5.

In the following, other embodiment of the present invention will be explained.

Figure 32:
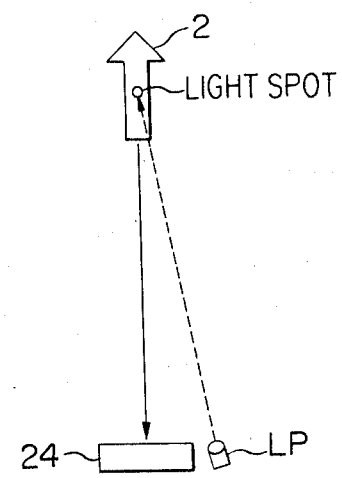
FIG. 32 is a model showing that the light point is formed on the object.
Figure 33:
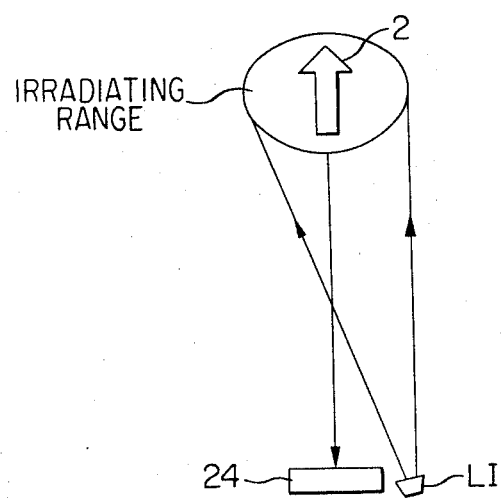
FIG. 33 shows a model illuminating the whole object.

Regarding the image of the object at the time of the range finding, brightness of the object constitutes the important factor so far as the present invention detects an optical object for range finding. In contrast to this, in the above-described embodiment, there has been exemplified such a construction that the dynamic range of the line sensor may be enlarged by making variable the integration time in the line sensor in accordance with brightness of the object, or by stagewisely changing over the integration time preset on the basis of the analog image signals as obtained. Even with such construction, it is still not possible to lengthen the integration time limitlessly in view of a problem of the dark current the line sensor itself possesses, a problem of S/N to the dark current, and further a problem of time period, during which the range finding result can be obtained. For solving such problems, there may be adopted such a construction that, when the object is very dark, a light spot is formed on the object, or the entire object is illuminated. Further details will be given in reference to the drawing. FIG. 32 shows a case of forming the light spot on the object, and FIG. 33 shows a case of illuminating the entire object. Formation of the light spot on the object as shown in FIG. 32 is done by projecting thinly constricted light beam onto the object 2 from a light projector LP to thereby positively form a target thereon. This is particularly advantageous when no surplus power supply can be expected, or for an object having low contrast. The embodiment of illuminating the entire object as shown in FIG. 33 makes it possible to illuminate the entire object 2 from the illuminating section LI. This can be adopted in changing an object which lacks brightness to a bright one. While this construction is effective when surplus power supply can be expected, it has such a problem that no effective range finding can be effected when the object has no contrast at all. In practice, therefore, the embodiment shown in FIG. 32 is more preferable.

The positive formation of the light spot on the object, or illumination of the entire object as mentioned above are effective in case the distance to the object is short, and they cannot be used when the distance upto the object is long. Considering that the range finding device of the present invention is used for focussing in photographic cameras, etc., in case a flush photographing is carried out in the dark where the focusing is difficult by naked eyes or by use of an optical range finding meter, and moreover the object is at the near distance side where the range finding result acts very stringently, it is sufficient that the range finding may be done within an effective distance of the flush photographing. From such standpoint, the embodiments shown in FIGS. 32 and 33 can be effectively used. Also, formation of the light spot on the object and illumination of the object as a whole can be done only during integration of the image signal by the line sensor, whereby the electric power to be consumed in the light projector LP or the illuminating section LI can be remarkably reduced in comparison with a case where the light is always projected. For this purpose, the light projector LP or the light illuminating section LI may be driven in accordance with the sequence signal only during a period when the sequence modes C1, C2 in the series of sequence operations of the system are carried out, or only during the period of the sequence mode C2 in particular.

Further, for operating the light projector LP or the illuminating section LI, a photographer may set a condition, under which the light projector, etc. may be manually operated in the dark room, or the operating condition may be set when there is no sufficient time to the long time side of the integration time to be set in the line sensor, i.e., when no sufficient information for the object can be obtained even by the long integration time.

As mentioned above, it is quite effective to expand the operational range of the range finding device to provide with a projector which can be realized without adding various kinds of parts.

In the above explained embodiments, phototaking lens L is driven by servo motor, however, this can be manually done. For this purpose, on the basis of each signal of the front and rear pins, respectively, directional indication is made, and the phototaking lens L can be moved manually.

Figure 34:
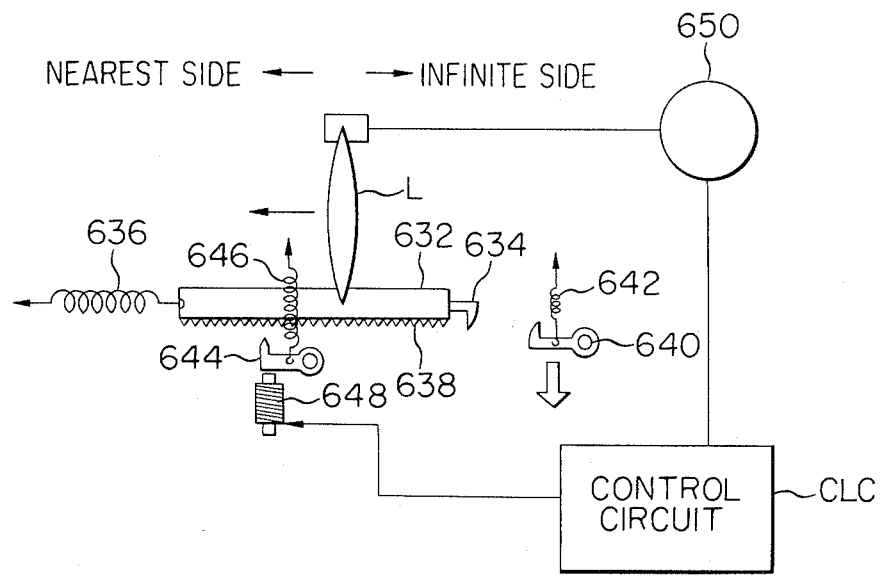
FIG. 34 is a model showing another example relating focus control of the phototaking lens.

There is other driving system using spring. Positional data on the line sensor 24, which is to be a basis of judging focusing position of the phototaking lens L and set in the switch circuit of data controller 82 in FIG. 11, is made as numerical data representing infinite or near positions and range signal is obtained so as to drive the phototaking lens L by the spring in response to said range signal. In this system, during the repetitive operations of the sequence of the system from C0 to C5, upon detection of the range information, the output of the range detection complete signal is generated, and according to this signal, the phototaking lens L, which has been set at a retreated position further from the infinite position, is moved manually or by spring toward the position corresponding to said signal and simultaneously this position of the lens is detected and when the lens arrives at the position corresponding to said range information the movement of the lens is stopped by a clamp structure, etc., and thus the lens L is correctly positioned at the focussed position by a series of processing. According to this method, once the range is detected, sequential operations for range finding can be stopped which enables to save power consumption. The practical structure thereof is as shown in FIG. 34.

The phototaking lens L is preset at a position further retreated from the infinite position by engaging pawl 634 provided at the lens carrier 632 with trigger 640. Under this condition, latch pawl 644 is disengaged from latch teeth 638 of lens carrier 632 by attracting latch pawl 644 by magnet 648, and when range signal is obtained, automatically or manually on the basis of the indication representing that the range signal has been obtained, the trigger 640 is moved in the arrow direction against the spring 642, and the phototaking lens L is moved together with lens carrier 632 by spring 636 toward the near position. At this time, signal from the lens position detector 650 is applied to control circuit CLC, and at the moment when the lens position corresponding to the range information is detected, the latch pawl 644 is engaged with latch teeth 638 by spring by giving attraction-release signal so as to stop the movement of the lens L. This stopped position of the lens L corresponds to the focussed position. As the control circuit CLC or lens position detector 650, the structure shown in FIGS. 26, 28, 29 and 30 except the parts relating to motor 110 is applicable as it is, and as attraction-release signal for magnet 648, focussing signal or motor stop signal is used.

Figure 35:
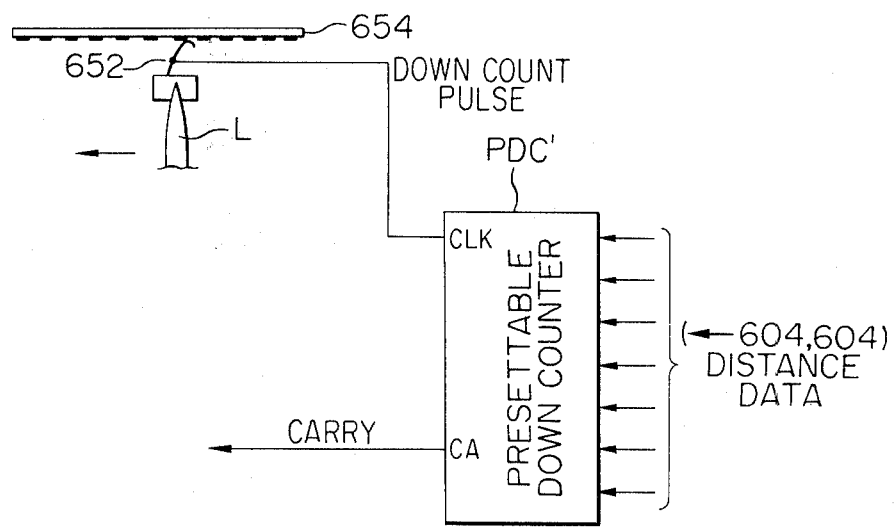
FIG. 35 is a model of a modification of the structure of FIG. 34.

The structure shown in FIG. 35 is also applicable, in which, while the lens L is moved from the preset position to the near position, brush 652 of the lens L slides on comb-like electrode 654 so that the movement of the lens L is detected as pulse number, and the range information from the latch circuit 604, 606 of FIG. 20H is preset in presettable downcounter PDC' and when the lens L begins to move, counter PDC' starts to downcount by pulse signals from the brush 652, and by the carrier output of the counter PDC', attraction-release signal is given to magnet 648.

The described structure is advantageously used with a simple structure for still cameras which does not always require range finding.

Figure 36:
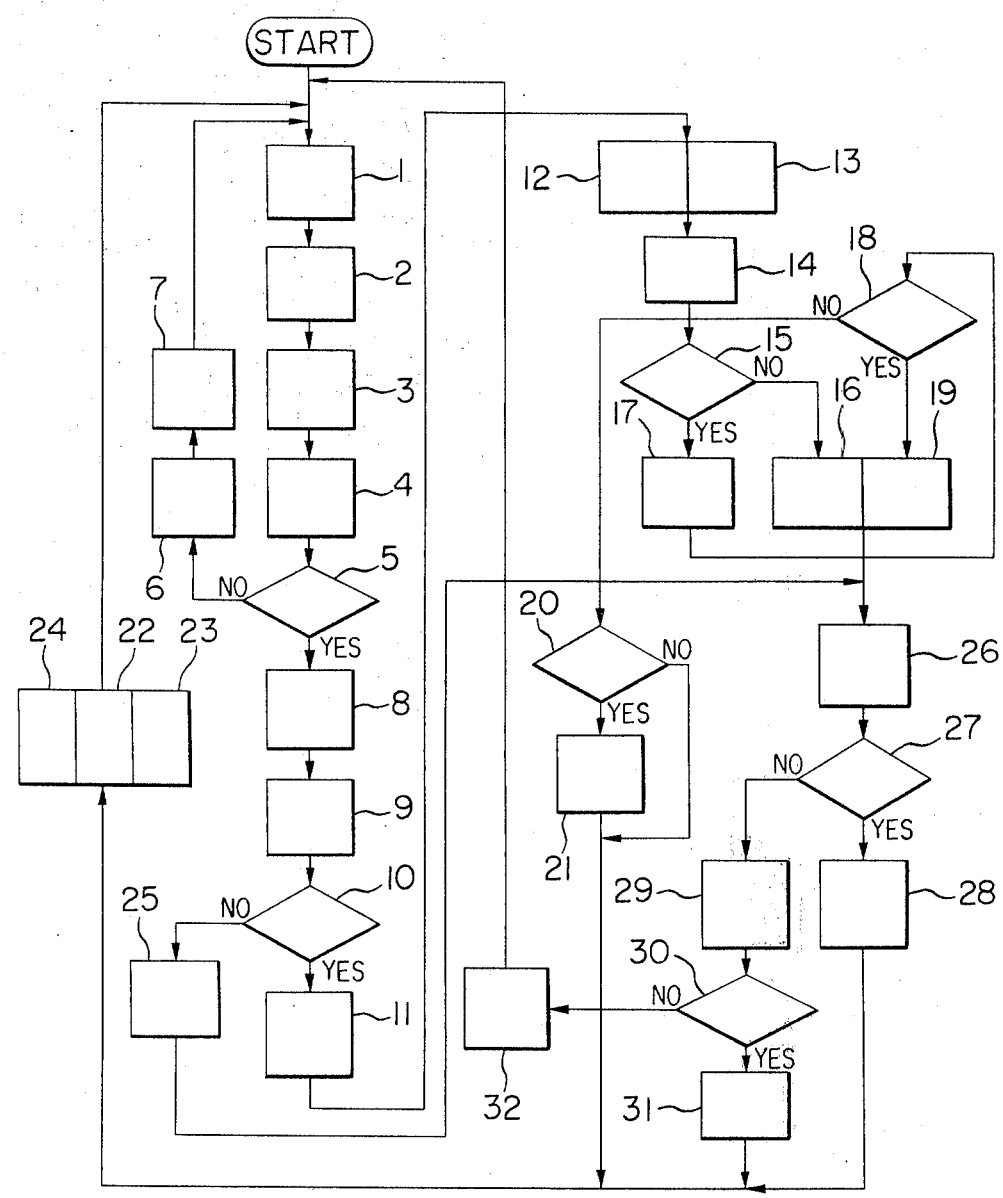
FIG. 36 shows a flow chart of the control of a camera utilizing the present device in the focus adjustment of camera.

When the range finding device of this invention is applied for the focus detection of cameras, etc., there is no assurance that the range finding is always successful. In considering the failure of range finding, there has been proposed to automatically set the phototaking lens L at the position of pan-focus position (hyper-focus position) corresponding to a stop value, for example f8, which is used most frequently, or in case especially of strobo-phototaking, to automatically set the lens L at a position corresponding to a predetermined distance, for example, 2–3 meters, which is within the range enabling strobo-phototaking. For attaining such functions, control flow as shown in the flow chart of FIG. 36 is processed, and the system shown in FIG. 11 to FIG. 21 should be modified to some extent. The embodiment shown in FIG. 36 uses CCD photo-sensor (hereinafter this is referred to CCD), as a line sensor, which is able to circulate output signal by feeding back to the input of analogue shift register through buffer circuit, etc. the transfer output from signal transfer analogue shift register. In the following explanation, each number corresponds to respective numbers designated for each block shown in FIG. 36.

(1) elimination of signals stored in CCD.
(2) count of the time set or to be set in CCD.
(3) circulating read-out of image signals from CCD.
(4) determination of threshold level for quantization of image signal on the basis of the level of image element signals and judgement of either proper or improper of the integrated time.
(5) is the set integrated time proper?
(6) memory of the information representing improper of the integrated time.
(7) alteration of the integrated time.
(8) clear the memorized information representing improper of the integrated time.
(9) read-out of the image signal from CCD and quantization thereof and memory of the quantized data.
(10) is quantization properly made?
(11) processing the quantized data which has been memorized.
(12) detection of the maximum bit numbers of coincidence when comparing quantization data of standard field to that of reference field, and memory that bit numbers.
(13) detection and memory of the location in the reference field producing said maximum coincidence bit numbers.
(14) compare said maximum coincidence bit numbers to a preset allowable minimum coincidence bit numbers.

(15) are said maximum coincidence bit numbers larger than or equal to the allowable minimum coincidence bit numbers?

(16) memory the information of difference between these coincidence bit numbers.

(17) compare position data obtained in the preceding cycle to position data obtained in the present cycle.

(18) is difference between two position data in (17) equal to or larger than allowable difference?

(19) memory the difference in (18).

(20) is difference between said position data larger than allowable fluctuation?

(21) memory the position data obtained in the present cycle as effective data.

(22) output the memorized position data.

(23) indication of the completion of range detection.

(24) clear various caution information.

(25) memory the information of improper of quantization.

(26) get information of the use or non-use of strobo.

(27) is preparation for strobo phototaking ready?

(28) set the fixed position data, for example, 2-3 meters suitable for strobo phototaking.

(29) get stop value information.

(30) is set stop value larger than a predetermined stop value, for example, f8?

(31) get data regarding pan-focus position corresponding to predetermined stop value (f8):

(32) memory caution information.

For realizing said flow, it is necessary to adapt conventional electronic device such as for example microprocessor for the system shown in FIGS. 11 and 20, and it is realized by slightly modifying the sequence of the system shown in FIGS. 11 and 20.

It is noted that the control flow of FIG. 36 is only one example, and the other various modifications are possible to correspond to the required functions.

What is claimed is:

1. A range detecting device for detecting the range of an object, comprising:

(A) signal integration and storing type image sensing means including a plurality of sensing elements arranged to receive first and second detection images of said object to provide an image element signal for each image element of the first and second detection images;

(B) means for producing a specific level on the basis of the levels of the image element signals on M successive image elements of the first detection image;

(C) integration state detection means for detecting, on the basis of said specific level produced by said specific level producing means, whether or not the signal integration time of the sensing means is proper, said integration state detection means providing a characteristic output when it detects that the signal integration time of the sensing means is improper;

(D) integration control means for controlling integration of the signals in the image sensing means which correspond to each image element of the first and second detection images, said integration control means being responsive to said characteristic output of said integration state detection means and automatically changing the signal integration time of the image sensing means on the basis of the characteristic output of the integration state detection means;

(E) quantization means for quantizing the image element signal generated for each image element by said image sensing means;

(F) circuit means for receiving quantized data from said quantization means and detecting, on the basis of said quantized data, the relative positional difference between said M successive image elements of the first detection image and M successive image elements of the second detection image corresponding to the M successive image elements of the first detection image so as to provide data on the range of the object;

(G) quantization state detection means for detecting whether or not all of the quantized data on said M successive image elements of the first detection image are one and the same data, said quantization state detection means providing a characteristic output when it detects that all of the quantized data on the M successive image elements of the first detection image are one and the same data; and (H) control means for controlling at least one of the outputs of the device and the operation of the device on the basis of the characteristic output of said quantization state detection means.

2. A range detecting device according to claim 1, wherein said quantization means converts the image element signal generated for each image element by said image sensing means into binary data of "1" or "0", on the basis of a predetermined threshold level; and said quantization state detection means detects whether or not the binary data on said M successive image elements of the first detection image are all "1" or all "0".

3. A range detecting device according to claim 2, further comprising threshold level determination means coupled to said specific level producing means for determining the threshold level on the basis of a specific level produced by said specific level producing means; said quantization means converting the image element signal generated for each element into binary data on the basis of the threshold level determined by said threshold level determination means.

4. A range detecting device according to claim 3, wherein said specific level producing means is a peak detection means for providing as the specific level a peak level of the image element signals on the M successive image elements of the first detection image; and said threshold level determination means is so arranged as to determine said threshold level by multiplying a constant level less than 1 to the peak level provided by said peak detection means.

5. A range detecting device according to claim 4 wherein said constant value is 0.8.

6. A range detecting device according to claim 1, further comprising:

means for providing a warning indication to indicate that the range detecting operation of the device cannot be performed properly; and means responsive to the characteristic output of said quantization state detection means to activate said warning means so as to provide said warning indication.

7. A range detecting device according to claim 1, wherein said control means regulates the output of the device in response to the characteristic output of the quantization state detection means.

8. A range detecting device according to claim 1 or 7, wherein said control means returns the operation mode of the device to an initial mode in a series of operations for range detection.

9. A range detecting device for detecting the range of an object, comprising:
(A) image sensing means including a plurality of sensing elements arranged to receive first and second detection images of said object to provide an image element signal for each image element of the first and second detection images;
(B) quantization means for quantizing the image element signal generated for each image element by said image sensing means;
(C) circuit means for receiving the quantized data from said quantization means and detecting, on the basis of said quantized data, the relative positional difference between M successive image elements of the first detection image and M successive image elements of the second image corresponding to the M successive image elements of the first detection image so as to provide data on the range of the object, said circuit means including:
similarity detection means for detecting, on the basis of the quantized data, the similarity of each of different sets of M successive image elements of the second detection image to the M successive image elements of the first detection image; and
maximum similarity detection means for detecting maximum similarity within the detected similarities detected by said similarity detection means so as to determine said M successive image elements of the second detection image corresponding to the M successive image elements of the first detection image;
(D) evaluating means for evaluating the maximum similarity detected by said maximum similarity detection means, said evaluating means comparing the maximum similarity with a predetermined constant value to provide a characteristic output when the maximum similarity detected by said maximum similarity detection means is smaller than said predetermined value; and
(E) control means for controlling the output of the device on the basis of the state of comparison output of the evaluating means so as to regulate the output of the device in response to the characteristic output of said evaluating means.

10. A range detecting device according to claim 9, further comprising:
means for providing a warning indication; and
means responsive to the characteristic output of said evaluating means to activate said warning means so as to provide the warning indication.

11. A range detecting device according to claim 9, wherein said similarity detection means includes:
a coincidence detecting circuit for detecting on an element-by-element basis the coincidence of the quantized data on the M successive image elements of the first detection image with the quantized data on each set of M successive image elements of the second detection image; and
a counter circuit for obtaining the degree of similarity of each set of the M successive image elements of the second detection image to the M successive image elements of the first detection image by counting the coincidence output of said coincidence detecting circuit,
said maximum similarity detection means including a memorizing circuit for memorizing the maximum count of said counting circuit within the count on each set of M successive image elements of the second detection image so as to determine said M successive image elements of the second detection image corresponding to the M successive image elements of the first detection image,
said evaluation means evaluating the maximum similarity by comparing the maximum count memorized in said memorizing circuit with said predetermined constant value.

12. A range detecting device according to claim 11, wherein said constant value is slightly less than M.

13. A range detecting device according to claim 12, wherein said constant value is obtained by multiplying 0.9 to M.

14. In a range detecting device for detecting the range of an object, comprising:
(A) signal integration and storing type image sensing means including a plurality of sensing elements arranged to receive first and second detection images of said object to provide an image element signal for each image element of said first and second detection images;
(B) integration control means for controlling, on the basis of the brightness of the object, a period for integration of the signals in the image sensing means which correspond to each image element of the first and second detection images; and
(C) circuit means for receiving the image element signals from said image sensing means and detecting, on the basis of said image element signals, the relative positional difference between M successive image elements of said first detection image and a set of M successive image elements among a plurality of different sets of M successive image elements of said second detection image corresponding to said M successive elements of said first detection image so as to provide data for the range of the object, the improvement comprising:
(D) means for forming additionally a limited target of radiation on said object, said target forming means being arranged in such a manner that the target forming means is operated only during a period corresponding to a period in which the integration of the signals in the image sensing means is effected to a substantial extent and that, when the target forming means is operated, first and second images of said limited target of radiation are respectively included within said M successive image elements of the first detection image and said one set of M successive image elements of the second detection image corresponding to the M successive image elements of the first detection image on said image sensing means;
whereby when said target forming means is operated, said circuit means provides said range data by detecting the relative positional difference between M successive image elements of the first detection image including the first radiation target image and a set of M successive image elements of the second detection image including the second radiation target image and corresponding to the M successive image elements of the first detection image including said first radiation target image.

15. In a range detecting device for detecting the range of an object, comprising:
(A) signal integration and storing type image sensing means including a plurality of sensing elements arranged to receive first and second detection images of said object to provide an image element signal for each image element of the first and second detection images;

(B) integration control means for controlling, on the basis of the brightness of the object, a period for integration of the signals in the image sensing means which correspond to each image element of the first and second detection images;

(C) quantization means for quantizing the image element signal generated for each image element by said image sensing means; and (D) circuit means for receiving quantized data from said quantization means and detecting the relative positional difference, on the basis of said quantized data, between M successive image elements of the first detection image and M successive image elements of the second image corresponding to the M successive image elements of the first detection image so as to provide data regarding the range of the object, the improvement comprising:

(E) means for forming additionally a limited target of radiation on said object, said target forming means being arranged in such a manner that the target forming means is operated only during a period corresponding to a period in which the integration of the signals in the image sensing means is effected to a substantial extent and that, when the target forming means is operated, first and second images of said limited target of radiation are respectively included within said M successive image elements of the first detection image and said one set of M successive image elements of the second detection image corresponding to the M successive image elements of the first detection image on said image sensing means;

whereby when said target forming means is operated, said circuit means provides said range data by detecting the relative positional difference between M successive image elements of the first detection image including the first radiation target image and a set of M successive image elements of the second detection image including the second radiation target image and corresponding to the M successive image elements of the first detection image including said first radiation target image.

16. A distance detecting device for detecting the distance of an object, comprising:

(A) signal integration and storing type image sensing means including a plurality of sensing elements arranged to receive first and second detection images of said object to provide an image element signal for each image element of said first and second detection images;

(B) quantization means for receiving and quantizing the image element signal generated for each image element of the first and second detection images to provide quantized data on each image element;

(C) storing means for storing the quantized data on M successive image elements of the first detection image and the quantized data on successive image elements, the image element number of which is greater than said number M, of the second detection image;

(D) detection means for detecting, on the basis of the stored quantized data stored in said storing means, the relative positional difference between said M successive image elements of the first detection means and a set of M successive image elements of the second detection image corresponding to the M successive image elements of the first detection image so as to provide data on the object distance;

(E) peak detection means for receiving from said sensing means the image element signals on said M successive image elements of the first detection image and for detecting a peak level of the received image element signals; and (F) integration time control means for controlling signal integration time of said sensing means on the basis of the peak level detected by said peak detection means.

17. A distance detecting device according to claim 16, wherein said integration time control means includes:
means for comparing the peak level with first and second reference levels; and
means for determining the signal integration time on the basis of comparison result of said comparison means.

18. A distance detecting device according to claim 17, wherein said integration time determination means includes:
a memory circuit for memorizing data on said signal integration time on the basis of the comparison result of said comparison means; and
an integration time determining circuit for determining the signal integration time on the basis of the data memorized in said memory circuit.

19. A distance detecting device according to claim 16, wherein said quantization means is so arranged as to quantize the image element signal generated for each image element on the basis of the peak level detected by said peak detection means.

20. A distance detecting device according to claim 19, wherein said quantization means includes:
means for determining a threshold level for the signal quantization on the basis of the peak level detected by said peak detection means; and
means for comparing the image element signal generated for each image element with the threshold level determined by said threshold level determination means to provided the quantized data on each image element.

21. A distance detecting device according to claim 16, further comprising:
quantization state detection means for detecting whether or not all of the quantized data on said M successive image elements of the first image are one and the same data, said quantization state detection means providing a characteristic output when it detects that all of the quantized data on the M successive image elements of the first detection image are one and the same data; and
control means responsive to the characteristic output of said quantization state detection means to control at least one of the outputs of the device and the operation of the device.

22. A distance detecting device according to claim 21, wherein said control means regulates the output of the device in response to the characteristic output of the quantization state detection means.

23. A distance detecting device according to claim 21 or 22, wherein said control means returns the operation mode of the device to an initial mode in a series of operations for range detection.

24. A distance detecting device according to claim 21, further comprising:
   means for providing a warning indication; and
   means responsive to the characteristic output of said quantization state detection means to activate said warning means so as to provide the warning indication.

25. A distance detecting device according to claim 21, wherein said quantization means converts the image element signal generated for each image element by said image sensing means into binary data of "1" or "0", on the basis of a predetermined threshold level; and said quantization state detection means detects whether or not the binary data on said M successive image elements of the first detection image are all "1" or "0".

26. A distance detecting device according to claim 25, wherein said quantization means includes:
   means for determining a threshold level for the signal quantization on the basis of the peak level detected by said peak detection means; and
   means for comparing the image element signal generated for each image element with the threshold level determined by said threshold level determination means to provide the binary data on each image element.

27. In a device for detecting distance of an object comprising:
   (A) signal integration and storing type image sensing means including a plurality of sensing elements arranged to receive first and second detection images of said object to provide an image element signal for each image element of said first and second detection images;
   (B) quantization means receiving and quantizing the image element signal generated for each image element of the first and second detection images to provide quantized data on each image element;
   (C) storing means for storing the quantized data on M successive image elements of the first detection image and the quantized data on successive image elements, the image element number of which is greater than said number M, of the second detection image;
   (D) detection means for detecting, on the basis of the stored quantized data stored in said storing means, the relative positional difference between said M successive image elements of the first detection means and a set of M successive image elements of the second detection image corresponding to the M successive image elements of the first detection image so as to provide data on the object distance, the improvement comprising:
   (E) light receiving means for measuring brightness of the object; and
   (F) means for controlling signal integration time of said image sensing means on the basis of the object brightness measured by said light receiving means.

28. In a range detecting device for detecting the range of an object, comprising:
   (A) image sensing means including a plurality of sensing elements arranged to receive first and second detection images of an object field including at least a portion of said object and to provide an image element signal for each image element of said first and second detection images; and
   (B) circuit means for receiving the image element signals from said image sensing means and detecting, on the basis of said image element signals, the relative positional difference between M successive image elements of said first detection image and M successive image elements of said second detection image corresponding to said M successive elements of said first detection image so as to provide data on the range of the object, the improvement comprising:
   (C) manually operable means for causing said circuit means to change said number M, said operable means being operable at the will of an operator of the device from outside of the device.

29. In a device for detecting the distance of an object, comprising:
   (A) image sensing means including a plurality of sensing elements arranged to receive first and second detection images of an object field including at least a portion of said object and to provide an image element signal for each image element of said first and second detection images;
   (B) quantization means receiving and quantizing the image element signal generated for each image element of the first and second detection images to provide quantized data on each image element;
   (C) storing means for storing the quantized data on M successive image elements of the first detection image and the quantized data on successive image elements, the image element number of which is greater than said number M, of the second detection image;
   (D) detection means for detecting, on the basis of the stored quantized data stored in said storing means, the relative positional difference between said M successive image elements of the first detection means and a set of M successive image elements of the second detection image corresponding to the M successive image elements of the first detection image so as to provide data on the object distance, the improvement comprising:
   (E) manually operable means for causing said detecting means to change said number M, said operable means being operable at the will of an operator of the device from outside of the device.

30. In a range detecting device for detecting the range of an object, comprising:
   (A) image sensing means including a plurality of sensing elements arranged to receive first and second detection images of said object and to provide an image element signal for each image element of said first and second detection images; and
   (B) circuit means for receiving the image element signals from said image sensing means and detecting, on the basis of said image element signals, the relative positional difference between M successive image elements of said first detection image and M successive image elements of said second detection image corresponding to said M successive elements of said first detection image so as to provide data on the range of the object, the improvement comprising:
   (C) indication means to provide a sensible indication which can be sensed by an operator of the device; and
   (D) means for activating said indication means until said circuit means provides an effective data on the object range so as to provide a sensible warning indication.

31. In a device for detecting distance of an object, comprising:

(A) image sensing means including a plurality of sensing elements arranged to receive first and second detection images for said object and to provide an image element signal for each image element of said first and second detection images;

(B) quantization means for receiving and quantizing the image element signal generated for each image element of the first and second detection images to provide quantized data on each image element;

(C) storing means for storing the quantized data on M successive image elements of the first detection image and the quantized data on successive image elements, the image element number of which is greater than said number M, of the second detection image;

(D) detection means for detecting, on the basis of the quantized data stored in said storing means, the relative positional difference between said M successive image elements of the first detection means and a set of M successive image elements of the second detection image corresponding to the M successive image elements of the first detection image so as to provide data on the object distance, the improvement comprising:

(E) indication means to provide a sensible indication which can be sensed by an operator of the device; and (F) means for activating said indication means until said detection means provides an effective data on the object distance so as to provide a sensible warning indication.

32. A system for focusing an objective lens means onto an object, comprising:

(A) means for detecting the range of the object, said range detection means providing data on the object range in a digital word;

(B) means for moving said objective lens means from a predetermined position on an optical axis thereof along the optical axis in a predetermined direction, said moving means including means for storing a force for moving said objective lens means from said predetermined position in said predetermined direction, said force storing means being arranged to store the force therein when the objective lens means is set to the predetermined position;

(C) manually releasable latching means for retaining said objective lens means at said predetermined position against the force stored in said force storing means, said objective lens means being moved from said predetermined position in said predetermined direction by the force stored in the force storing means when the latching by said latching means is released;

(D) means for producing electrical pulses in association with the movement of the objective lens means from said predetermined position, the number of said pulses being indicative of the moving amount of the objective lens means from the predetermined position;

(E) means receiving the object range data from said range detection means and the electrical pulses from said pulse producing means to detect whether the objective lens means has reached a focused position to the object, said focus detection means including pulse count means for counting said electrical pulses produced from the pulse producing means and providing a characteristic output when it detects that the objective lens means has reached said focused position, said pulse count means including a presettable down-counter adapted to have preset therein the range data provided by said range detection means and being operative to count down in response to the electrical pulses produced from said pulse producing means, said counter providing a carry output as said characteristic output; and (F) means responsive to the characteristic output of said focus detection means to stop said objective lens means at said focused position.

33. A range detection system for detecting the range of an object, comprising:

(A) means for receiving first and second detection images of said object and for providing image signals on said first and second detection images;

(B) means for detecting, on the basis of the image signals provided by said image receiving means, the range of said object, said range detection means detecting the object range by detecting, on the basis of said image signals, the relative positional difference between corresponding image portions of said first and second detection images and providing data on the object range;

(C) means for controlling the operation for the range detection of said range detection means, said control means being operable for causing the range detection means to repeat the range detecting operation at a predetermined cycle;

(D) means for memorizing the range data provided by said range detection means at the termination of each cycle of range detecting operation of the range detection means;

(E) means for comparing, at the termination of each range detecting operation cycle of said range detection means, the range data newly provided by the range detection means at the termination of a new operation cycle with the former range data provided by the range detection means at the termination of the former operation cycle and memorized in said memory means, said comparison means detecting the difference between said newly provided range data and said former range data and providing a characteristic output when said difference is greater than a predetermined value; and (F) means responsive to the characteristic output of said comparison means to invalidate said newly provided range data.

34. A range detection system according to claim 33, wherein said comparison means includes:

a difference detection circuit receiving said newly provided range data and said former range data memorized in said memory means and detecting the difference between both range data;

a constant value producing circuit for producing said predetermined value; and a comparison circuit receiving the difference detected by said difference detection circuit and the predetermined value produced from said constant value producing circuit and comparing the difference with the predetermined value, said comparison circuit providing said characteristic output when it detects that the difference is greater than the predetermined value, and said characteristic output indicating that said newly provided range data is abnormally greater than said former range data memorized in said memory means.

35. A focus detection system for detecting the focus of an adjustable objective lens means onto an object, comprising:
(A) means for detecting deviation of the adjusted position of said objective lens means from an in-focus position, at which the objective lens means is properly focused onto the object, said deviation detection means providing data on said deviation in a digital word;
(B) means for controlling the operation for deviation detection of said deviation detection means, said control means being operable for causing the deviation detection means to repeat the deviation detecting operation at a predetermined cycle;
(C) means for detecting, on the basis of the deviation data provided by said deviation detection means, whether or not said objective lens means is set to said in-focus position, said in-focus detection means providing an in-focus signal when it detects that the objective lens means is set to the in-focus position;
(D) means for comparing, at the termination of each cycle of the deviation detecting operation of said deviation detection means, the deviation data with a pre-determined value, said comparison means providing a characteristic output when it detects that the deviation data is smaller than said predetermined value; and
(E) means responsive to the in-focus signal provided by said in-focus detection means and the characteristic output of said comparison means to invalidate the deviation data provided by said deviation detection means, said invalidating means, when it receives the in-focus signal from the in-focus detection means, invalidating the deviation data provided by the deviation detection means at the termination of next operation cycle in response to the characteristic output of the comparison means.

36. In a range detecting device for detecting the range of an object, comprising:
(A) signal integration and storing type image sensing means including a plurality of sensing elements arranged to receive first and second detection means of said object to provide an image element signal for each image element of said first and second detection images;
(B) integration control means for controlling, on the basis of the brightness of the object, a period for integration of the signals in the image sensing means which correspond to each image element of the first and second detection images; and
(C) circuit means for receiving the image element signals from said image sensing means and detecting, on the basis of said image element signals, the relative positional difference between M successive image elements of said first detection image and a set of M successive image elements among a plurality of different sets of M successive image elements of said second detection image corresponding to said M successive elements of said first detection image so as to provide data for the range of the object, the improvement comprising:
(D) means for illuminating said object, said illuminating means being arranged to be operative only during a period in which the integration of the signals in the image sensing means is effected to a substantial extent.

37. In a range detecting device for detecting the range of an object, comprising:
(A) signal integration and storing type image sensing means including a plurality of sensing elements arranged to receive first and second detection images of said object to provide an image element signal for each image element of the first and second detection images;
(B) integration control means for controlling integration of the signals in the image sensing means which correspond to each image element of the first and second detection images; and
(C) quantization means for quantizing the image element signal generated for each image element by said image sensing means, the improvement comprising:
(D) means for illuminating said object, said illuminating means being arranged to be operative only during a period when the integration of the signals in the image sensing means is effected to a substantial extent.

38. In a focusing system for focusing an adjustable objective lens means onto an object, the combination comprising:
(A) means for receiving first and second detection images of said object and for providing image signals on said first and second detection images;
(B) means for detecting, on the basis of the image signals provided by said image receiving means, the range of said object, said range detection means detecting the object range by detecting, on the basis of said image signals, the relative positional difference between corresponding image portions of said first and second detection images and providing data on the object range;
(C) means for moving said objective lens means from a predetermined position on an optical axis thereof along the optical axis in a predetermined direction, said moving means including means for storing a force forming said objective lens means from said predetermined position in said predetermined direction, said force storing means being arranged to store the force therein when the objective lens means is set to the predetermined position;
(D) manually releasable latching means for retaining said objective lens means at said predetermined position against the force stored in said force storing means, said objective lens means being moved from said predetermined position in said predetermined direction by the force stored in the force storing means when the latching by said latching means is released;
(E) means for producing electrical pulses in association with movement of the objective lens means from said predetermined position, the number of said pulses being indicative of the amount of movement of the objective lens means from the predetermined position;
(F) means for receiving the object range data from said range detection means and the electrical pulses from said pulse producing means to detect whether the objective lens means has reached a focused position to the object, said focusing detection means including pulse count means for counting said electrical pulses produced from the pulse producing means and providing a characteristic output when it detects that the objective lens means has reached said focused position, said count means including a presettable down-counter adapted to have preset therein the range data provided by said range detection means and being operative to count down in response to the electrical pulse produced from said pulse producing means, said counter providing a carry output as said characteristic output; and (G) means responsive to the characteristic output of said focus detection means to stop said objective lens means at said focused position.

39. In a focus detection system for detecting the focus of an adjustable objective lens means onto an object, the combination comprising:

(A) means for receiving first and second detection images of said object and for providing image signals on said first and second detection images;

(B) means for detecting, on the basis of the image signals provided by said image receiving means, the range of said object, said range detection means detecting the object range by detecting, on the basis of said image signals, the relative positional difference between corresponding image portions of said first and second detection images and providing data on the object range;

(C) means operatively associated with said objective lens means for providing data on an adjusted position of the lens means along an optical axis thereof;

(D) means for detecting, on the basis of the object range data provided by said range detection means and the data on the adjusted position of the lens means provided by said position data providing means, deviation of the adjusted position of said objective lens means from an in-focus position, at which the lens means is properly focused onto the object, said deviation detection means providing data on said deviation;

(E) means for controlling the operation for deviation detection of said deviation detection means, said control means being operable for causing the deviation detection means to repeat the deviation detecting operation at a predetermined cycle;

(F) means for detecting, on the basis of the deviation data provided by said deviation detection means, whether or not said objective lens means is set to said in-focus position, said in-focus detection means providing an in-focus signal when it detects that the objective lens means is set to the in-focus position;

(G) means for comparing, at the termination of each cycle of the deviation detecting operation of said deviation detection means, the deviation data with a predetermined value, said comparison means providing a characteristic output when it detects that the deviation data is smaller than said predetermined value; and (H) means responsive to the in-focus signal provided by said in-focus detection means and the characteristic output of said comparison means to invalidate the deviation data provided by said deviation detection means, said invalidating means, when it receives the in-focus signal from the in-focus detection means, invalidating the deviation data provided by the deviation detection means at the termination of next operation cycle in response to the characteristic output of the comparison means.

40. A range detecting device according to claim 4, wherein said integration state detection means is so arranged as to detect whether the peak level provided by said peak detection means is within a predetermined range of signal level and to provide said characteristic output when it detects that the peak level is out of said predetermined range of signal level.

* * * * *

UNITED STATES PATENT OFFICE
CERTIFICATE OF CORRECTION

Patent No. 4,305,657  Dated December 15, 1981

Inventor(s) MAKOTO MASUNAGA, ET AL.

It is certified that error appears in the above-identified patent and that said Letters Patent are hereby corrected as shown below:

Column 1, line 7, "connected" should read --concerned--;
line 12, "water" should read --meter--;
line 20, "device" should read --devices--.

Column 5, line 34, "correspond" should read --corresponds--.

Column 6, line 38, "range" should read --image--;
line 46, "control" should read --cancel--.

Column 7, line 2, "formation" should read --information--.

Column 8, line 56, "20H" should read --20F--.

Column 10, line 64, "parallelly" should read --in parallel--;
line 66, delete "will be made".

Column 11, line 35, "image" should read --images--.

Column 12, line 43, "preperly" should read --properly--;
line 61, "signal" should read --sight--.

Column 13, line 34, "is the" should read --is in the--.

Column 16, line 57, insert --a-- before "digital".

Column 18, line 46, "maximum of" should read --maximum value of--.

Column 24, line 67, "date" should read --data--.

Column 25, line 57, delete "the" before "exactly"; insert --the-- before "same".

UNITED STATES PATENT OFFICE
CERTIFICATE OF CORRECTION

Patent No. 4,305,657             Dated December 15, 1981

Inventor(s) MAKOTO MASUNAGA, ET AL.

It is certified that error appears in the above-identified patent and that said Letters Patent are hereby corrected as shown below:

Column 27, line 57, "element" should read --elements--.

Column 29, line 63, "but" should read --bit--.

Column 30, line 62, delete "a"; insert --such-- before "that".

Column 32, line 20, "Vs. $R_2/(R_1+R_2)$" should read $$--Vs \cdot R_2/(R_1+R_2)--.$$

Column 34, line 4, "$V_{RG} \cdot R_4/(R_4+R_5)$" should read $$--V_{RG} \cdot R_4/(R_4+R_5)--.$$

line 16, "above-describe" should read
--above-described--;

line 22, "$V_{RG}.R_4/(R_4+R_5)$ should read $$--V_{RG} \cdot R_4/(R_4+R_5)--.$$

line 36, "20H" should read --20F--;
line 39, "20D" should read --20C--;
line 41, "20E" should read --20D--; "20H" should
read --20F--;
line 44, "20H should read --20F--.

line 17, "20D" should read --20F--.

UNITED STATES PATENT OFFICE
CERTIFICATE OF CORRECTION

Patent No. 4,305,657  Dated December 15, 1981

Inventor(s) MAKOTO MASUNAGA, ET AL.

It is certified that error appears in the above-identified patent and that said Letters Patent are hereby corrected as shown below:

Column 36, line 24, "20D" should read --20C--;
  line 40, "20C" should read --20B--;
  line 41, "320" should read --320,--;
  line 64, "20C" should read --20B--.

Column 37, line 55, "element" should read --elements--;
  line 63, "element" should read --elements--.

Column 38, line 52, "20F" should read --20D--;
  line 58, "20H" should read --20F--.

Column 39, line 9, "20D" should read --20B--;
  line 19, "20C" should read --20B--;
  line 30, "tis" should read --its--;
  line 50, "20C" should read --20B--.

Column 40, line 16, "20E" should read --20D--;
  line 27, "20E" should read --20D--;
  line 50, "20C" should read --20B--.

Column 41, line 4, "FIGS." should read --FIG.--;
    "20G" should read --20F--; delete "and"; delete "20H";
  line 42, "produced" should read --produce--;
  line 49, "storobing" should read --strobing--;
  line 51, "20H" should read --20F--;
  line 59, "20G" should read --20E--; "20H" should read --20F--;
  line 63, "20G" should read --20F--;
  line 66, "20G" should read --20F--;
  line 68, "20F" should read --20D--.

UNITED STATES PATENT OFFICE
CERTIFICATE OF CORRECTION

Patent No. 4,305,657　　　　　　　　　Dated　December 15, 1981

Inventor(s) MAKOTO MASUNAGA, ET AL.

It is certified that error appears in the above-identified patent and that said Letters Patent are hereby corrected as shown below:

Column 42, line 5, "controller" should read --controlled--;
　　　　　　line 10, "20E" should read --20D--.

Column 43, line 2, "20D" should read --20B--;
　　　　　　line 20, "20F" should read --20D--;
　　　　　　line 25, "20E" should read --20D--;
　　　　　　line 29, "20D" should read --20C--;
　　　　　　line 54, "20H" should read --20F--;
　　　　　　line 60, "20D" should read --20C--.

Column 44, line 18, "20G" should read --20E--;
　　　　　　line 32, "20F" should read --20D--;
　　　　　　line 39, "20F" should read --20E--;
　　　　　　line 42, "20B" should read --20E--;
　　　　　　line 52, "20F" should read --20D--;
　　　　　　line 54, "20D" should read --20C--;
　　　　　　line 60, "20H" should read --20F--;
　　　　　　line 62, "RCS" should read --RCA--;
　　　　　　line 64, "FIG." should read --FIGS.--;
　　　　　　　　insert --20E and-- after "FIG.";
　　　　　　　　"20H" should read --20F--;
　　　　　　　　"shows" should read --show--;

Column 45, line 5, "20G" should read --20E--;
　　　　　　lines 58/59, "defference large" should read
　　　　　　　　　--difference large--.
　　　　　　line 66, "20D" should read --20C--;
　　　　　　line 68, "20D" should read --20C--.

Column 46, line 2, "20D" should read --20C--;
　　　　　　line 10, "20D" should read --20C--;
　　　　　　line 46, "20H" should read --20F--.

UNITED STATES PATENT OFFICE
CERTIFICATE OF CORRECTION

Patent No. 4,305,657    Dated December 15, 1981

Inventor(s) MAKOTO MASUNAGA, ET AL.

It is certified that error appears in the above-identified patent and that said Letters Patent are hereby corrected as shown below:

Column 47, line 21, "20H" should read --20F--;
          line 24, "20H" should read --20F--;
          line 45, delete "position" (third occurrence).

Column 48, line 10, "limitters" should read --limiters--;
          line 45, "20H" should read --20F--;
          line 47, "20H" should read --20F--.

Column 50, line 39, insert a comma after "problem".

Column 51, line 20, "SCH" should read --SHC--.

Column 52, line 3, "other" should read --another--;
          line 46, insert --the-- before "frequency";
          line 66, "20F" should read --20D--.

Column 53, line 5, "20H" should read --20F--;
          line 10, insert --a-- before "concrete";
          line 32, "theremay" should read --there may--;
          line 36, insert --the-- before "control";
          line 50, "lens" should read --lens L.--.

Column 54, line 4, "balue" should read --value--;
          line 46, "Concrete" should read --A concrete--.

UNITED STATES PATENT OFFICE
CERTIFICATE OF CORRECTION

Patent No. 4,305,657　　　　　　　　　Dated December 15, 1981

Inventor(s) MAKOTO MASUNAGA, ET AL.

It is certified that error appears in the above-identified patent and that said Letters Patent are hereby corrected as shown below:

Column 56, line 3, "other" should read --another--;
　　　　　　line 49, "flush" should read --flash--;
　　　　　　line 55, "flush" should read --flash--.

Signed and Sealed this

Twenty-first Day of September 1982

[SEAL]

Attest:

GERALD J. MOSSINGHOFF

Attesting Officer　　Commissioner of Patents and Trademarks

UNITED STATES PATENT AND TRADEMARK OFFICE
CERTIFICATE OF CORRECTION

PATENT NO. : 4,305,657

DATED : December 15, 1981

INVENTOR(S) : MAKOTO MASUNAGA, ET AL.

It is certified that error appears in the above-identified patent and that said Letters Patent is hereby corrected as shown below:

Column 35, line 17, "20D" should read --20F--;
line 24, "20D" should read --20F--.

Signed and Sealed this

Seventh Day of June 1983

[SEAL]

Attest:

DONALD J. QUIGG

Attesting Officer

Acting Commissioner of Patents and Trademarks